(12) United States Patent
Miyajima et al.

(10) Patent No.: US 7,764,030 B2
(45) Date of Patent: Jul. 27, 2010

(54) CONTROL DEVICE FOR THREE-PHASE BRUSHLESS MOTOR

(75) Inventors: Masayasu Miyajima, Tokyo (JP); Jun Suzumura, Tokyo (JP); Toshiyuki Oonishi, Tokyo (JP); Katsumi Ohata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 220 days.

(21) Appl. No.: 11/959,213

(22) Filed: Dec. 18, 2007

(65) Prior Publication Data

US 2009/0001912 A1    Jan. 1, 2009

(30) Foreign Application Priority Data

Jun. 27, 2007  (JP)  ............ P2007-169032

(51) Int. Cl.
*H02P 6/16* (2006.01)
(52) U.S. Cl. ............ 318/400.04; 318/400.01; 318/700; 388/819; 388/820; 388/928
(58) Field of Classification Search ............ 318/400.01, 318/400.04, 700, 615, 667; 388/923–934
See application file for complete search history.

(56) References Cited

U.S. PATENT DOCUMENTS

| | | | | | |
|---|---|---|---|---|---|
| 5,206,567 | A | * | 4/1993 | Sakurai et al. | 318/400.34 |
| 5,430,362 | A | * | 7/1995 | Carr et al. | 318/779 |
| 5,650,779 | A | * | 7/1997 | Sugden | 341/9 |
| 5,652,494 | A | * | 7/1997 | Sugden | 318/701 |
| 5,834,911 | A | * | 11/1998 | Kimura | 318/400.11 |
| 6,081,087 | A | * | 6/2000 | Iijima et al. | 318/400.13 |
| 6,249,095 | B1 | * | 6/2001 | Takura | 318/400.01 |
| 6,445,155 | B1 | * | 9/2002 | Williams et al. | 318/727 |
| 6,836,090 | B2 | * | 12/2004 | Sugiyama et al. | 318/437 |
| 7,184,927 | B2 | * | 2/2007 | Anghel et al. | 318/400.04 |
| 7,202,622 | B2 | * | 4/2007 | Eskritt et al. | 318/400.24 |
| 2008/0272723 | A1 | * | 11/2008 | Rudel et al. | 318/400.39 |

FOREIGN PATENT DOCUMENTS

JP   2002-199775 A   7/2002
JP   2005-137141 A   5/2005

* cited by examiner

*Primary Examiner*—Rita Leykin
(74) *Attorney, Agent, or Firm*—Sughrue Mion, PLLC

(57) ABSTRACT

A control apparatus for a three-phase brushless motor, in which a control circuit includes time interval calculation means (133 in FIG. 4). The time interval calculation means (133) is endowed with at least one time interval calculation mode. In the time interval calculation mode, pluralities of time intervals which correspond to an addition section obtained by adding up two or more Q continuous sections are calculated on the basis of two position detection signals which lie at both the ends of the addition section, among position detection signals successively generated. The control circuit determines pluralities of energization switching timings on the basis of the pluralities of time intervals. The control apparatus for the three-phase brushless motor can decrease the deviations of the energization switching timings attributed to the errors of the mounting positions of position sensors or to the errors of the magnetized positions of a rotor, without requiring any complicated adjustment.

13 Claims, 17 Drawing Sheets

CONTROL DEVICE FOR THREE-PHASE BRUSHLESS MOTOR

BACKGROUND OF THE INVENTION

1. Field of the Invention

This invention relates to a control device for a three-phase brushless motor.

2. Description of the Related Art

A three-phase brushless motor has a plurality of stator coils arranged around a rotor which is configured of permanent magnets. The number N of the stator coils is equal to the number of slots between the respectively adjacent stator coils, and it is also called the "slot number". A switch circuit for switching energizations is connected to the N stator coils. The switch circuit switches the energizations for the respective stator coils in accordance with the rotation of the rotor. This switch circuit changes-over energization switching timings for the N stator coils, on the basis of position detection signals which a position detection signal generation device generates. The position detection signal generation device includes three position sensors, and the position detection signals are successively generated in correspondence with the rotational positions of the rotor by the three position sensors.

In a case where errors have developed in the mounting positions of the three position sensors, positional deviations occur in the position detection signals. Besides, in a case where errors have developed in the magnetized positions of the rotor or a position detecting rotor, positional deviations similarly occur in the position detection signals. The positional deviations of the position detection signals afford deviations to the energization switching timings of the stator coils based on the switch circuit, they incur unnecessary rotational frequency fluctuations in the three-phase brushless motor, and they afford unnecessary demagnetizations to the rotor.

Patent Document JP2002-199775A discloses a prior-art technique wherein an EEPROM is disposed in a control device for a three-phase brushless motor, and timing data which stipulate the switch timings of a switch circuit in correspondence with the errors of the mounting positions of position sensors are stored in the EEPROM. With the prior-art technique, the timing data stored in the EEPROM are adjusted, thereby to adjust the energization switching timings of stator coils and to exclude the errors of the mounting positions of the position sensors.

In the prior-art technique disclosed in Patent Document, however, complicated adjustments are required for the adjustments of the timing data recorded in the EEPROM, and a productivity lowers. Besides, since the timing data correspond to the errors of the mounting positions of the position sensors, they cannot cope with the case where the errors have developed in the magnetized positions of the rotor or the position detecting rotor.

SUMMARY OF THE INVENTION

This invention has for its object to propose a control device for a three-phase brushless motor, in which the deviations of the energization switching timings of stator coils attendant upon the positional deviations of position detection signals can be decreased without requiring complicated adjustments.

A control device for a three-phase brushless motor according to this invention consists in a control device for a three-phase brushless motor, including the three-phase brushless motor in which a plurality of stator coils are arranged around a rotor, a switch circuit which changes-over energizations for the respective stator coils, a position detection signal generation device which includes three position sensors and which generates position detection signals successively in correspondence with rotational positions of the rotor, and a control circuit which receives the position detection signals and which calculates pluralities of energization switching timings for the respective stator coils, so as to control the switch circuit. In the control device, the position detection signals are successively generated with sections located between the respectively adjacent position detection signals. The control circuit includes time interval calculation means, at least an one time interval calculation mode is given to said time interval calculation means, and in the one time interval calculation mode, pluralities of time intervals are calculated on the basis of two position detection signals which lie at both ends of an addition section obtained by adding up two or more continuous ones of the sections, among the position detection signals successively generated. The control circuit determines the pluralities of energization switching timings on the basis of the pluralities of time intervals.

In the control device for the three-phase brushless motor according to this invention, the control circuit includes time interval calculation means, the one time interval calculation mode is given to said time interval calculation means, and in the one time interval calculation mode, the pluralities of time intervals are calculated on the basis of the two position detection signals which lie at both ends of the addition section obtained by adding up the two or more continuous ones of the sections, among the position detection signals successively generated. The control circuit determines the pluralities of energization switching timings on the basis of the pluralities of time intervals. Therefore, the deviations of the energization switching timings attributed to the errors of the mounting positions of the position sensors or to the errors of the magnetized positions of the rotor can be decreased without making any complicated adjustment.

The other objects, features, aspects and advantages of this invention will become more apparent from the following description taken with reference to the drawings.

DESCRIPTION OF THE PREFERRED EMBODIMENTS

Now, embodiments of this invention will be described with reference to the drawings.

Embodiment 1

Figure 1:
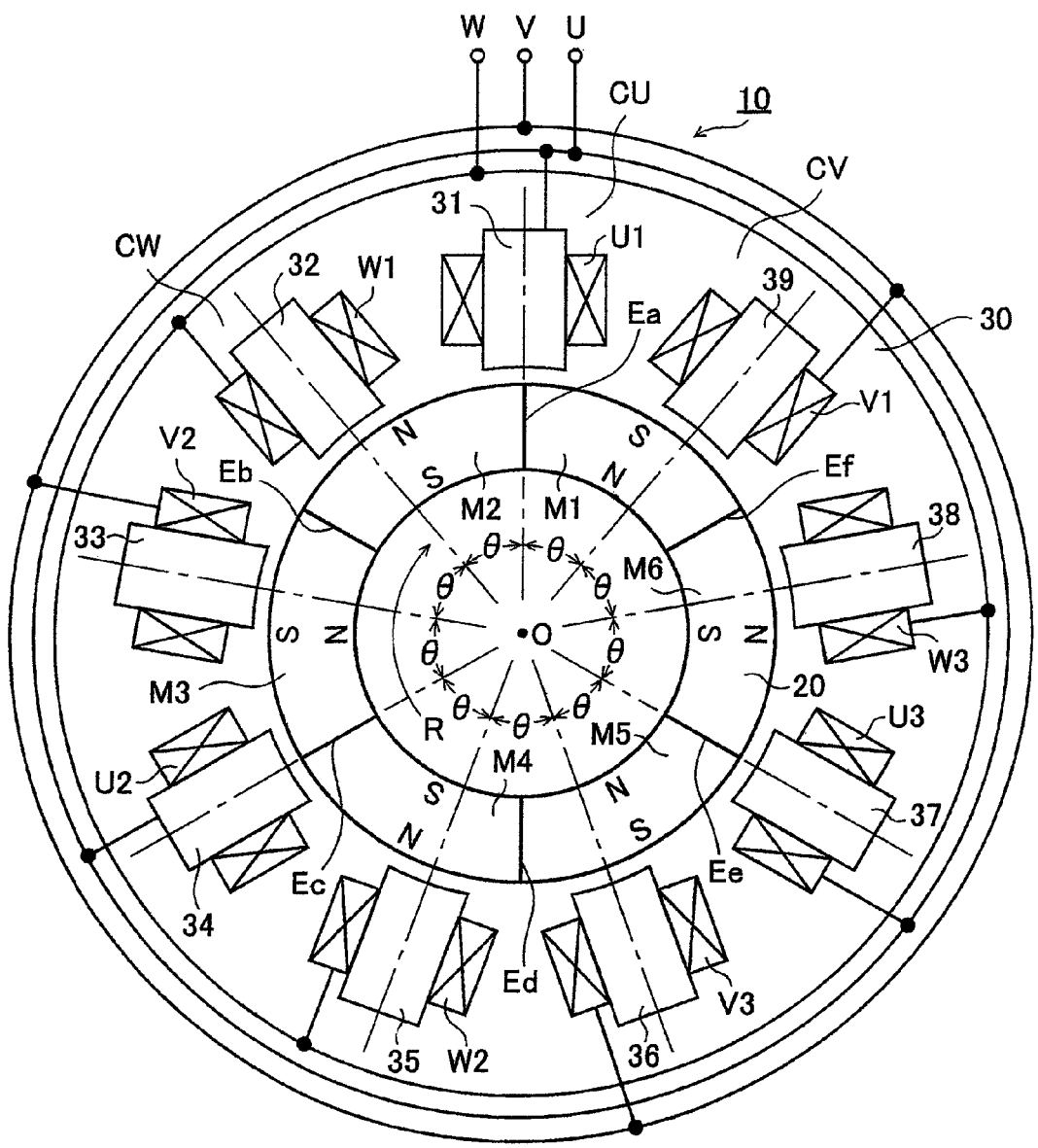
FIG. 1 is a diagram for explaining the configuration of a three-phase brushless motor in Embodiment 1 of a control device for the three-phase brushless motor according to this invention.
Figure 2:
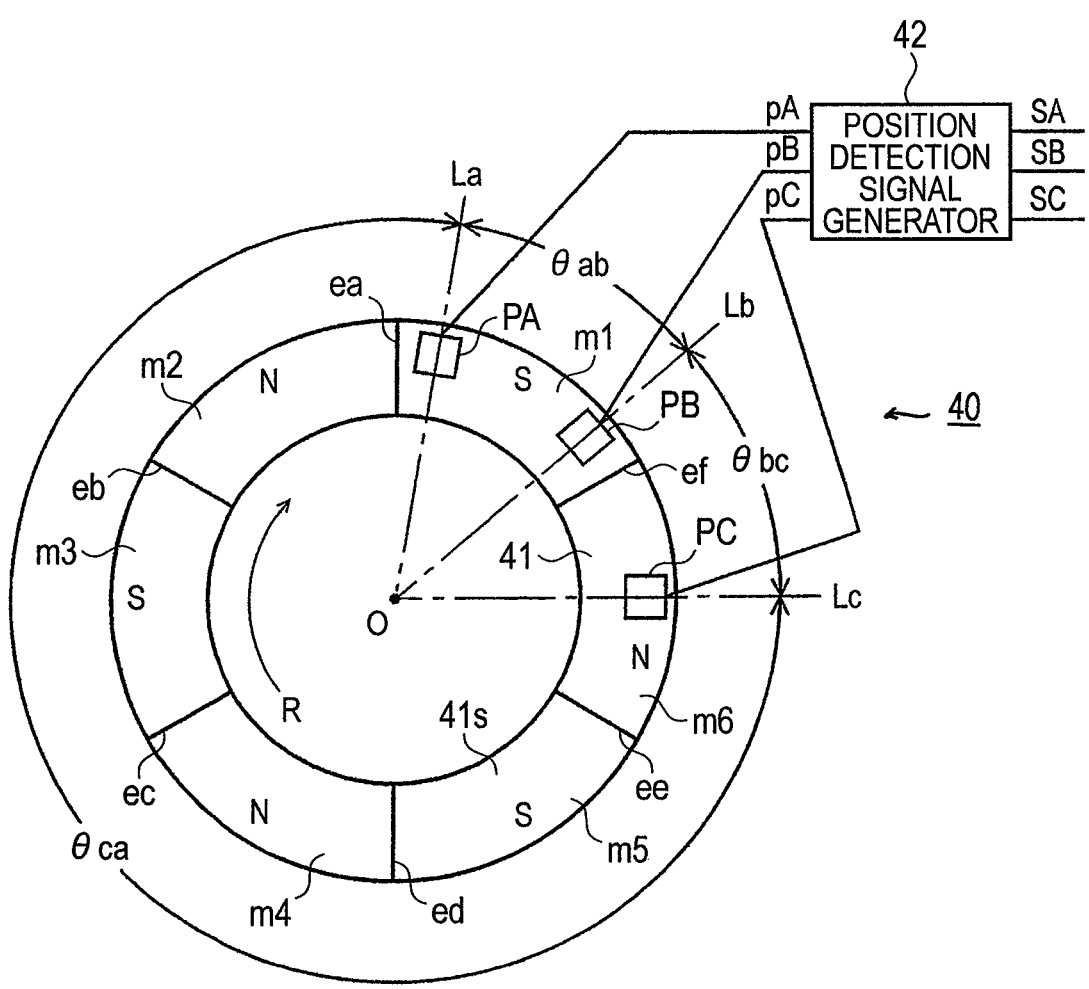
FIG. 2 is a diagram for explaining the configuration of a position detection signal generation device in Embodiment 1.
Figure 3:
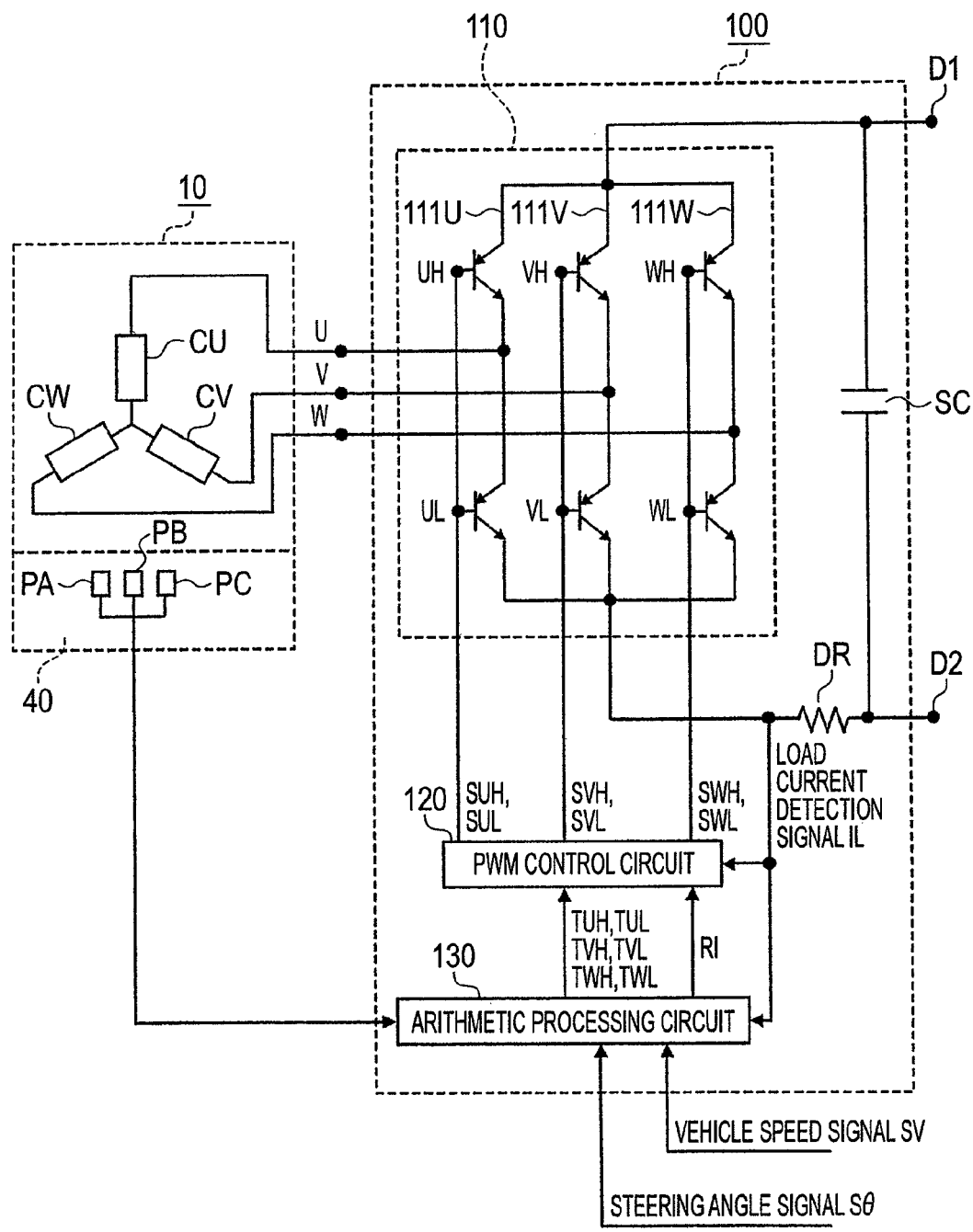
FIG. 3 is an electric circuit diagram showing a control circuit in Embodiment 1.
Figure 4:
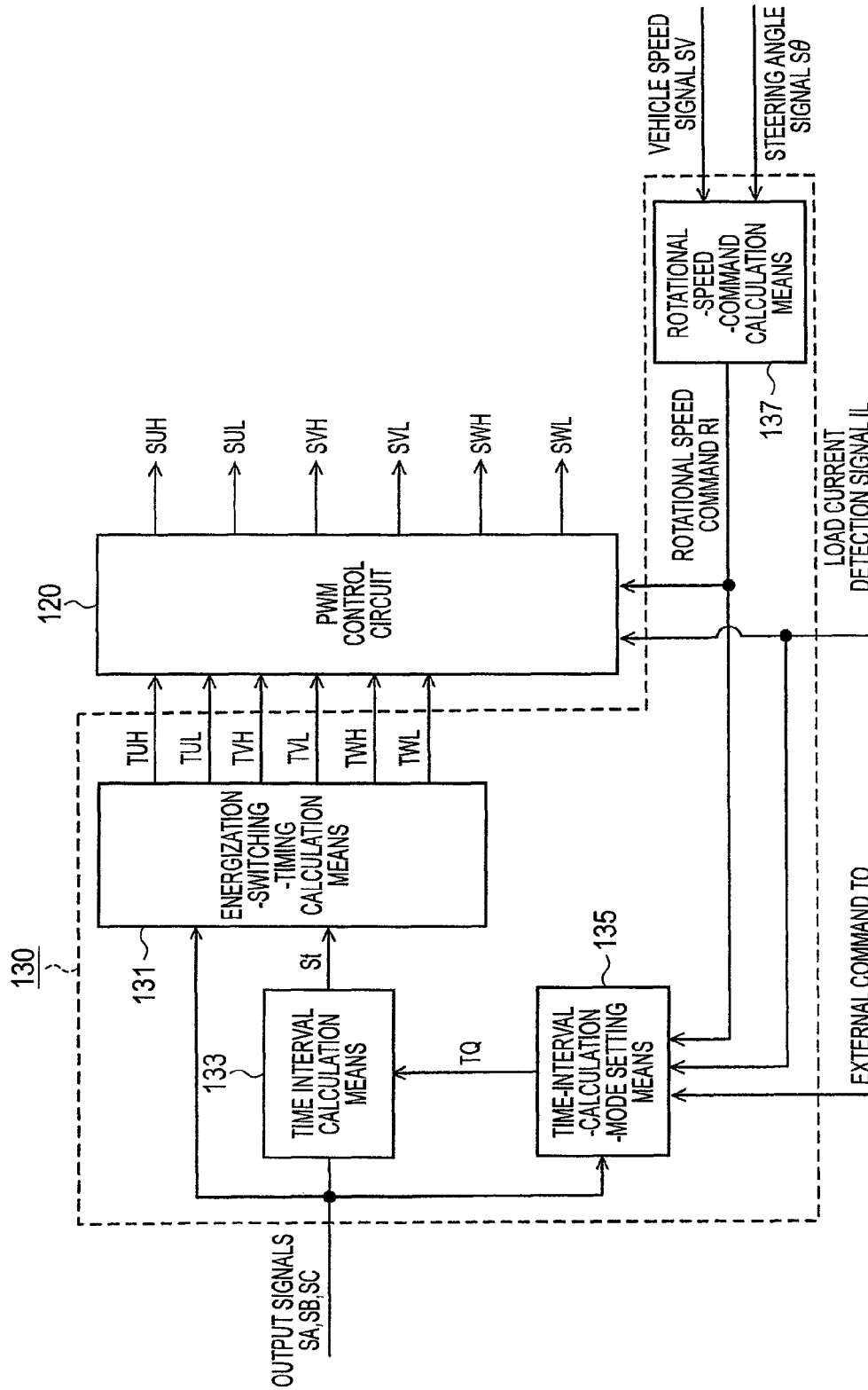
FIG. 4 is a block diagram showing an arithmetic processing circuit in Embodiment 1.
Figure 5:
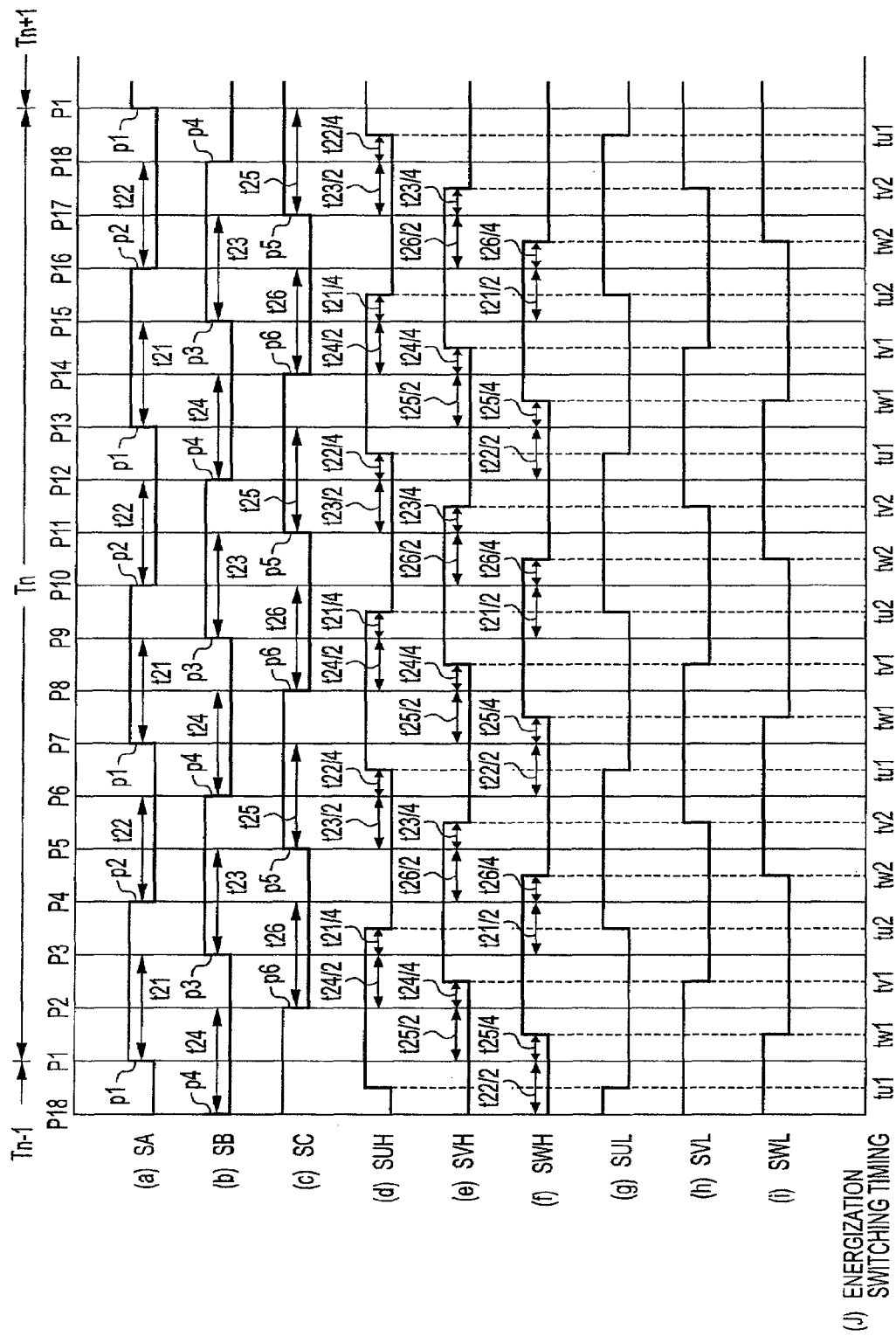
FIG. 5 is a timing chart for explaining the operation of Embodiment 1.

FIG. 1 is a diagram for explaining the configuration of a three-phase brushless motor in Embodiment 1 of a control apparatus for the three-phase brushless motor according to this invention. FIG. 2 is a diagram for explaining the configuration of a position detection signal generation device in the three-phase brushless motor in Embodiment 1. FIG. 3 is an electric circuit diagram showing the control apparatus for the three-phase brushless motor in Embodiment 1. FIG. 4 is a block diagram showing the internal configuration of an arithmetic processing circuit in the control apparatus for the three-phase brushless motor in Embodiment 1. FIG. 5 is a timing chart for explaining the operation of Embodiment 1.

The control apparatus for the three-phase brushless motor in Embodiment 1 includes the three-phase brushless motor 10, and a control circuit 100 therefor. The three-phase brushless motor 10 is utilized for, for example, a vehicular power steering control apparatus. Concretely, a hydraulic pressure is generated by the three-phase brushless motor 10, and an assist torque for a steering wheel for a vehicle is generated on the basis of the hydraulic pressure.

Although the three-phase brushless motor 10 has been well known, it will be outlined with reference to FIGS. 1 and 2. The three-phase brushless motor 10 is a three-phase brushless motor of M poles and N slots, and concretely, it is a three-phase brushless motor of M=6 and N=9, namely, 6 poles and 9 slots. This three-phase brushless motor 10 includes a rotor 20, a stator 30, and the position detection signal generation device 40.

The rotor 20 is assumed to rotate in the direction of an arrow R indicated in FIG. 1. The rotor 20 has six permanent magnets M1-M6 arranged at equal intervals on an identical circumference about the center axis O of the three-phase brushless motor 10. Errors sometimes develop in the arrangement of the permanent magnets M1-M6, and errors occur in magnetized positions in that case. Each of the permanent magnets M1-M6 is configured in the shape of a circular arc with an angular range of 60 degrees, and the permanent magnets M1-M6 are arranged so as to adjoin one another on the circumference. These permanent magnets M1-M6 are magnetized in the radial directions of the rotor 20, respectively. The three permanent magnets M1, M3 and M5 are magnetized so as to have S-poles at their outer peripheries and N-poles at their inner peripheries, whereas the remaining three permanent magnets M2, M4 and M6 are magnetized in polarities opposite to those of the permanent magnets M1, M3 and M5, so as to have N-poles at their outer peripheries and S-poles at their inner peripheries.

Six edges Ea-Ef are respectively formed between the adjacent ones of the permanent magnets M1-M6. The edge Ea is formed between the two adjacent permanent magnets M1 and M2. Likewise, the edges Eb-Ef are respectively formed between the two adjacent permanent magnets M2 and M3, between those M3 and M4, between those M4 and M5, between those M5 and M6, and between those M6 and M1.

The stator 30 is arranged outside the outer circumference of the rotor 20. The stator 30 includes nine stator poles 31-39, and nine stator coils U1-U3, V1-V3 and W1-W3. The stator coils U1-U3 are connected in parallel with one another, and they constitute a U-phase coil CU. The stator coils V1-V3 are connected in parallel with one another, and they constitute a V-phase coil CV. The stator coils W1-W3 are connected in parallel with one another, and they constitute a W-phase coil CW. The U-phase coil CU, V-phase coil CV and W-phase coil CW are respectively connected to a U-terminal, V-terminal and W-terminal.

As is well known, the stator coils U1-U3, V1-V3 and W1-W3 are respectively fed with energization currents. The stator 30 generates a driving magnetic field by the energization currents fed to the stator coils U1-U3, V1-V3 and W1-W3, thereby to endow the rotor 20 with a driving force in the direction of the arrow R. The energization currents which are fed to the stator coils U1-U3, V1-V3 and W1-W3 are respectively switched by the control circuit 100, so as to endow the rotor 20 with driving forces which correspond to the rotational positions thereof. The energization currents which are fed to the stator coils U1-U3, V1-V3 and W1-W3 are switched and controlled into both positive and negative polarities at respectively designated energization switching timings by the control circuit 100.

The stator coils U1-U3, V1-V3 and W1-W3 are arranged at angular intervals θ equal to one another, on an identical circumference about the center axis O. Also the stator poles 31-39 are arranged at the angular intervals θ equal to one another. The stator coils U1-U3 are respectively wound round the stator poles 31, 34 and 37. These stator coils U1-U3 are arranged at angular intervals of 120 degrees from one another. The stator coils V1-V3 are respectively wound round the stator poles 39, 33 and 36, and the stator coils W1-W3 are respectively wound round the stator poles 32, 35 and 38. Also the stator coils V1-V3 and the stator coils W1-W3 are arranged at angular intervals of 120 degrees from one another, respectively.

Since the three-phase brushless motor 10 has the nine slots, the angular interval θ is 40 degrees. Since, however, the rotor 20 has the six poles, the stator coils U1-U3, V1-V3 and W1-W3 need to switch the energizations each time the rotor 20 rotates an angle θe=20 degrees.

The position detection signal generation device 40 is assembled in the three-phase brushless motor 10. As shown in FIG. 2, the position detection signal generation device 40 includes a position detecting rotor 41, three position sensors PA, PB and PC, and a position detection signal generator 42. The position detecting rotor 41 is directly connected to the rotor 20 of the three-phase brushless motor 10, and it is driven at the same rotational speed and in the same rotational direction as those of the rotor 20. This position detecting rotor 41 is configured as an annular magnet plate, and it is arranged around the center axis O with this center axis O as a center. More specifically, the position detecting rotor 41 has pairs of magnetic pole faces which oppose in a direction perpendicular to the drawing sheet of FIG. 2, and one magnetic pole face in one of the pairs is indicated at reference sign 41s. This position detecting rotor 41 has six permanent magnets m1-m6 arranged at equal intervals from one another on an identical circumference around the center axis O. Errors sometimes develop also in the arrangement of the permanent magnets m1-m6, and errors occur in magnetized positions in this case. Each of the permanent magnets m1-m6 is configured in the shape of a circular arc with an angular range of 60 degrees, and the permanent magnets m1-m6 are arranged so as to adjoin one another on the circumference. The permanent magnets m1-m6 of the position detection signal generation device 40 are respectively magnetized in the direction parallel to the center axis O of the position detecting rotor 41. The three permanent magnets m1, m3 and m5 are magnetized so as to have S-poles at the magnetic pole faces 41s and N-poles at the other magnetic pole faces opposing to the magnetic pole faces 41s. The remaining three permanent magnets m2, m4 and m6 are magnetized in polarities opposite to those of the permanent magnets m1, m3 and m5, so as to have N-poles at the magnetic pole faces 41s and S-poles at the other magnetic pole faces opposing to the magnetic pole faces 41s.

Six edges ea-ef are respectively formed between the adjacent ones of the permanent magnets m1-m6. The edge ea is formed between the two adjacent permanent magnets m1 and m2. Likewise, the edges eb-ef are respectively formed between the two adjacent permanent magnets m2 and m3, between those m3 and m4, between those m4 and m5, between those m5 and m6, and between those m6 and m1.

The edges ea-ef are respectively formed at the same angular positions as those of the edges Ea-Ef around the center axis O. The edge ea is formed on an extension surface which is obtained by extending the edge Ea in parallel with the center axis O. Likewise, also the edges eb-ef are respectively formed on extension surfaces which are obtained by extending the corresponding edges Eb-Ef in parallel with the center axis O.

The position sensors PA, PB and PC oppose to the magnetic pole faces 41s of the position detecting rotor 41 through minute gaps. These position sensors PA, PB and PC are arranged on a common circuit board. The position sensor PA is arranged on an extension line La which extends radially from the center axis O. Likewise, the position sensors PB and PC are respectively arranged on extension lines Lb and Lc which extend radially from the center axis O. "θab" is let denote the angle between the extension lines La and Lb, "θbc" the angle between the extension lines Lb and Lc, and "θca" the angle between the extension lines Lc and La. Each of the angles θab and θbc is designed to become equal to the angle θ, and the angle θca is (240+θ) and is designed to equivalently become equal to the angle θ. In some cases, however, a situation where the contained angles somewhat deviate from the angle θ occurs on account of the errors of the mounting positions of the position sensors PA, PB and PC.

The position sensors PA, PB and PC are respectively configured by employing, for example, Hall elements. These position sensors PA, PB and PC generate sensor outputs pA, pB and pC, respectively, as magnetic fluxes from the individual permanent magnets m1-m6 of the position detecting rotor 41 change with the rotation of this position detecting rotor 41. The position detection signal generator 42 receives the sensor outputs pA, pB and pC, and it generates an output signal SA corresponding to the position sensor PA, an output signal SB corresponding to the position sensor PB, and an output signal SC corresponding to the position sensor PC. The output signal SA corresponding to the position sensor PA contains a plurality of position detection signals p1 and p2 which correspond to the respective edges ea-ef. Likewise, the output signal SB corresponding to the position sensor PB contains a plurality of position detection signals p3 and p4 which correspond to the respective edges ea-ef. Besides, the output signal SC corresponding to the position sensor PC contains position detection signals p5 and p6 which correspond to the respective edges ea-ef. The position sensors PA, PB and PC are arranged at angular intervals of 40 degrees from one another, and the permanent magnets m1-m6 are arranged at angular intervals of 60 degrees from one another. As a result, the position detection signals p1-p6 are generated at intervals of the angle θe=20 degrees from one another. The errors of the mounting positions of the position sensors PA, PB and PC, and the errors of the magnetized positions of the permanent magnets m1-m6 of the position detecting rotor 41 incur deviations in the generation timings of the position detection signals p1-p6.

Incidentally, part of the rotor 20 can also be used as the position detecting rotor 41 without especially disposing this position detecting rotor 41. In this case, the position sensors PA, PB and PC are respectively arranged so as to oppose to the outer peripheral surface of the rotor 20 through minute gaps, and the position detection signal generator 42 generates the output signals SA, SB and SC in correspondence with the rotation of the rotor 20.

In FIG. 5, (a) shows the output signal SA corresponding to the position sensor PA, in FIG. 5, (b) shows the output signal SB corresponding to the position sensor PB, and in FIG. 5, (c) shows the output signal SC corresponding to the position sensor PC. A timing axis (an axis of abscissas) shown at the uppermost part of FIG. 5 indicates rotational positions P1-P18 at the time when the rotor 20 performs one revolution in the direction of the arrow R indicated in FIG. 1. A period Tn indicated in FIG. 5 corresponds to one revolution of the rotor 20, and periods Tn−1 and Tn+1 correspond to periods before and after the period Tn, respectively. In the period Tn of one revolution of the rotor 20, the output signal SA contains the three position detection signals p1 and the three position detection signals p2. The rotational position P1 is a position at which the edge ea opposes to the position sensor PA, and the position detection signal p1 is generated at this rotational position P1. The rotational position P4 is a position at which the edge eb corresponds to the position sensor PA, and the position detection signal p2 is generated at this rotational position P4. Likewise, the rotational positions P7 and P13 are positions at which the edges ec and ee oppose to the position sensor PA, respectively, and the position detection signals p1 are respectively generated at these rotational positions P7 and P13. Besides, the rotational positions P10 and P16 are positions at which the edges ed and ef oppose to the position sensor PA, respectively, and the position detection signals p2 are respectively generated at these rotational positions P10 and P16.

In the period Tn of one revolution of the rotor 20, the output signal SB contains the three position detection signals p3 and the three position detection signals p4. The rotational position P3 is a position at which the edge ea opposes to the position sensor PB, and the position detection signal p3 is generated at this rotational position P3. The rotational position P6 is a position at which the edge eb corresponds to the position sensor PB, and the position detection signal p4 is generated at this rotational position P6. Likewise, the rotational positions P9 and P15 are positions at which the edges ec and ee oppose to the position sensor PB, respectively, and the position detection signals p3 are respectively generated at these rotational positions P9 and P15. Besides, the rotational positions P12 and P18 are positions at which the edges ed and ef oppose to the position sensor PB, respectively, and the position detection signals p4 are respectively generated at these rotational positions P12 and P18.

In the period Tn of one revolution of the rotor 20, the output signal SC contains the three position detection signals p5 and the three position detection signals p6. The rotational position P5 is a position at which the edge ea opposes to the position sensor PC, and the position detection signal p5 is generated at this rotational position P5. The rotational position P8 is a position at which the edge eb corresponds to the position sensor PC, and the position detection signal p6 is generated at this rotational position PB. Likewise, the rotational positions P11 and P17 are positions at which the edges ec and ee oppose to the position sensor PC, respectively, and the position detection signals p5 are respectively generated at these rotational positions P11 and P17. Besides, the rotational positions P14 and P2 are positions at which the edges ed and ef oppose to the position sensor PC, respectively, and the position detection signals p6 are respectively generated at these rotational positions P14 and P2.

The three position detection signals p1 are respectively generated at the rotational positions P1, P7 and P13 at which the respective edges ea, ec and ee changing from the S-poles to the N-poles oppose to the position sensor PA in the rotational direction indicated by the arrow R. The three position detection signals p2 are respectively generated at the rotational positions P4, P10 and P16 at which the respective edges eb, ed and ef changing from the N-poles to the S-poles oppose to the position sensor PA in the rotational direction indicated by the arrow R. The three position detection signals p3 are respectively generated at the rotational positions P3, P9 and P15 at which the respective edges ea, ec and ee changing from the S-poles to the N-poles oppose to the position sensor PB in the rotational direction indicated by the arrow R. The three position detection signals p4 are respectively generated at the rotational positions P6, P12 and P18 at which the respective edges eb, ed and ef changing from the N-poles to the S-poles oppose to the position sensor PB in the rotational direction indicated by the arrow R. The three position detection signals p5 are respectively generated at the rotational positions P5, P11 and P17 at which the respective edges ea, ec and ee changing from the S-poles to the N-poles oppose to the position sensor PC in the rotational direction indicated by the arrow R. The three position detection signals p6 are respectively generated at the rotational positions P8, P14 and P2 at which the respective edges eb, ed and ef changing from the N-poles to the S-poles oppose to the position sensor PC in the rotational direction indicated by the arrow R.

Regarding the rotational positions P1-P18, the angular interval between the two adjacent rotational positions corresponds to the angle $\theta e$. These rotational positions P1-P18 are successively located at the intervals of the angle $\theta e$. In Embodiment 1, the position sensors PA, PB and PC are arranged at the intervals of 40 degrees. Therefore, the output signals SA, SB and SC shift 40 degrees from one another within the period Tn, and each of them repeats three continuous cycles within the period Tn. In the section of the rotational positions P1-P7, the position detection signals p1, p6, p3, p2, p5 and p4 are successively generated at the intervals of the angle $\theta e$ in the order mentioned. Also in the section of the rotational positions P7-P13 and the section between the rotational position P13 and the rotational position P1 of the next period Tn+1, the position detection signals p1, p6, p3, p2 and p5 are successively generated at the intervals of the angle $\theta e$ in the order mentioned, respectively. Sections q exist between the respectively two adjacent position detection signals. The lengths of the sections q are designed to be the same lengths corresponding to the angle $\theta e$. The lengths of the respective sections q, however, deviate on account of the errors of the mounting positions of the position sensors PA, PB and PC, or the errors of the magnetized positions of the permanent magnets m1-m6 or M1-M6.

Next, the control circuit 100 in Embodiment 1 will be described with reference to FIGS. 3 and 4. As shown in FIG. 3, the control circuit 100 includes a switch circuit 110, a PWM control circuit 120 and the arithmetic processing circuit 130.

As shown in FIG. 3, the switch circuit 110 is connected in series with a load current detection resistor DR between DC power source terminals D1 and D2. The DC power source terminal D1 is a positive polarity side power source terminal, while the DC power source terminal D2 is a negative polarity side power source terminal. The DC power source terminal D2 is connected to ground. A DC power source voltage V with its positive polarity at the DC power source terminal D1 is fed between the DC power source terminals D1 and D2. A smoothing capacitor SC is connected between the DC power source terminals D1 and D2.

The switch circuit 110 is connected to the U-terminal, V-terminal and W-terminal of the stator 30 of the three-phase brushless motor 10. The switch circuit 110 includes a U-phase switch electric line 111U which is connected to the U-terminal of the stator 30, a V-phase switch electric line 111V which is connected to the V-terminal of the stator 30, and a W-phase switch electric line 111W which is connected to the W-terminal of the stator 30. The switch electric lines 111U, 111V and 111W are connected in parallel with one another between the DC power source terminal D1 and the load current detection resistor DR. Each of the U-terminal, V-terminal and W-terminal of the stator 30 is connected to one end of the corresponding one of the U-phase coil CU, V-phase coil CV and W-phase coil CW. The other ends of the U-phase coil CU, V-phase coil CV and W-phase coil CW are all connected to a neutral point. As a result, the U-phase coil CU, V-phase coil CV and W-phase coil CW are in a three-phase start connection.

A U-phase switch element UH on a high voltage side and a U-phase switch element UL on a low voltage side are connected in series with the U-phase switch electric line 111U. The mid-connection point of the switch elements UH and UL is connected to the U-terminal of the stator 30. A V-phase switch element VH on the high voltage side and a V-phase switch element VL on the low voltage side are connected in series with the V-phase switch electric line 111V. The mid-connection point of the switch elements VH and VL is connected to the V-terminal of the stator 30. A W-phase switch element WH on the high-voltage side and a W-phase switch element WL on the low voltage side are connected in series with the W-phase switch electric line 111W. The mid-connection point of the switch elements WH and WL is connected to the W-terminal of the stator 30.

Each of the switch elements UH, UL, VH, VL, WH and WL is configured of a semiconductor switch which has a pair of main terminals and a control terminal. Each of these switch elements UH, UL, VH, VL, WH and WL is capable of causing energization currents to flow in both directions between the pair of main terminals and ON/OFF-controlling the energization currents by the control terminal. Such a switch element can be configured using, for example, a power MOSFET.

The PWM control circuit 120 generates switch driving signals SUH, SUL, SVH, SVL, SWH and SWL, and it feeds these switch driving signals to the control terminals of the respective switch elements UH, UL, VH, VL, WH and WL of the switch circuit 110. Each of the switch elements UH, UL, VH, VL, WH and WL enters an ON period in a state where the corresponding switch driving signal has become a high level, and it enters an OFF period in a state where the corresponding switch driving signal has become a low level. Each of the switch elements UH, UL, VH, VL, WH and WL repeats ON and OFF operations at a PWM-controlled pulse repetition frequency in its ON period and OFF period.

The switch driving signals SUH and SUL are respectively fed to the control terminals of the U-phase switch elements UH and UL. The switch driving signals SVH and SVL are respectively fed to the control terminals of the V-phase switch elements VH and VL. The switch driving signals SWH and SWL are respectively fed to the control terminals of the W-phase switch elements WH and WL.

The switch driving signals SUH, SVH and SWH for the switch elements UH, VH and WH on the high voltage side are respectively shown at (d), (e) and (f) in FIG. 5. Besides, the switch driving signals SUL, SVL and SWL for the switch elements UL, VL and WL on the low voltage side are respectively shown at (g), (h) and (i) in FIG. 5. The switch driving signal SUH, SUL, SVH, SVL, SWH or SWL is actually PWM-modulated in the ON period and OFF period of the corresponding switch element so that the pulse thereof may change in a pulse duty per unit time. For the brevity of the drawing, however, each switch driving signal is shown with the PWM control omitted.

The switch driving signal SUH shown at (d) in FIG. 5 is switched from the low level to the high level at respective ones of a plurality of energization switching timings tu1 indicated at (j) in FIG. 5, and it is switched from the high level to the low level at respective ones of a plurality of energization switching timings tu2. The energization switching timings tu1 are respectively set at the middle between the rotational positions P6 and P7, the middle between the rotational positions P12 and P13, and the middle between the rotational position P16 and the rotational position P1 of the next period Tn+1. The energization switching timing tu1 is set also at the middle between the rotational position P18 of the preceding period Tn−1 and the rotational position P1. The energization switching timings tu2 are respectively set at the middle between the rotational positions P3 and P4, the middle between the rotational positions P9 and P10, and the middle between the rotational positions P15 and P16.

The switch driving signal SVH shown at (e) in FIG. 5 is switched from the low level to the high level at respective ones of a plurality of energization switching timings tv1 indicated at (j) in FIG. 5, and it is switched from the high level to the low level at respective ones of a plurality of energization switching timings tv2. The energization switching timings tv1 are respectively set at the middle between the rotational positions P2 and P3, the middle between the rotational positions P8 and P9, and the middle between the rotational positions P14 and P15. The energization switching timings tv2 are respectively set at the middle between the rotational positions P5 and P6, the middle between the rotational positions P11 and P12, and the middle between the rotational positions P17 and P18.

The switch driving signal SWH shown at (f) in FIG. 5 is switched from the low level to the high level at respective ones of a plurality of energization switching timings tw1 indicated at (j) in FIG. 5, and it is switched from the high level to the low level at respective ones of a plurality of energization switching timings tw2. The energization switching timings tw1 are respectively set at the middle between the rotational positions P1 and P2, the middle between the rotational positions P7 and P8, and the middle between the rotational positions P13 and P14. The energization switching timings tw2 are respectively set at the middle between the rotational positions P4 and P5, the middle between the rotational positions P10 and P11, and the middle between the rotational positions P16 and P17.

As shown at (g) in FIG. 5, the switch driving signal SUL is switched from the high level to the low level at the respective ones of the plurality of energization switching timings tu1, and it is switched from the low level to the high level at the respective ones of the plurality of energization switching timings tu2. This switch driving signal SUL is the inverted signal of the switch driving signal SUH. As shown at (h) in FIG. 5, the switch driving signal SVL is switched from the high level to the low level at the respective ones of the plurality of energization switching timings tv1, and it is switched from the low level to the high level at the respective ones of the plurality of energization switching timings tv2. This switch driving signal SVL is the inverted signal of the switch driving signal SVH. As shown at (i) in FIG. 5, the switch driving signal SWL is switched from the high level to the low level at the respective ones of the plurality of energization switching timings tw1, and it is switched from the low level to the high level at the respective ones of the plurality of energization switching timings tw2. This switch driving signal SWL is the inverted signal of the switch driving signal SWH.

Energization states for the U-phase coil CU, V-phase coil CV and W-phase coil CW are switched on the basis of the ON and OFF operations of the respective switch elements UH, UL, VH, VL, WH and WL. Energization currents for the U-phase coil CU, V-phase coil CV and W-phase coil CW are switched, with the result that the three-phase brushless motor 10 generates the driving force in accordance with the rotational position of the rotor 20. The driving force which is bestowed on the three-phase brushless motor 10 is well known, and shall therefore be omitted from detailed description.

As shown in FIG. 4, the PWM control circuit 120 receives energization switching timing signals TUH, TUL, TVH, TVL, TWH and TWL and a rotational speed command RI from the arithmetic processing circuit 130 and also receives a load current detection signal IL from the load current detection resistor DR, thereby to generate the switch driving signals SUH, SUL, SVH, SVL, SWH and SWL. The energization switching timing signals TUH, TUL, TVH, TVL, TWH and TWL determine the pluralities of energization switching timings tu1, tv1, tw1, tu2, tv2 and tw2. The rotational speed command RI and the load current detection signal IL are utilized for PWM-controlling the pulse duties per unit time, of the switch driving signals SUH, SUL, SVH, SVL, SWH and SWL in the ON periods and OFF periods of the respective switch elements UH, UL, VH, VL, WH and WL.

As shown in FIG. 4, the arithmetic processing circuit 130 includes energization-switching-timing calculation means 131, time interval calculation means 133, time-interval-calculation-mode setting means 135 and rotational-speed-command calculation means 137. The rotational-speed-command calculation means 137 outputs the rotational speed command RI for the three-phase brushless motor 10. In Embodiment 1, the three-phase brushless motor 10 is used for controlling the hydraulic pressure so as to afford the assist torque for the steering wheel of the vehicle. Therefore, the rotational-speed-command calculation means 137 is endowed with a vehicle speed signal SV representing the vehicle speed of the vehicle, and a steering angle signal S$\theta$ representing the steering angle of the steering wheel. This rotational-speed-command calculation means 137 calculates the rotational speed command RI for the three-phase brushless motor 10, on the basis of the vehicle speed signal SV and the steering angle signal S$\theta$, so as to output the calculated rotational speed command RI. This rotational speed command RI is fed to the PWM control circuit 120, together with the load current detection signal IL.

In Embodiment 1, as the feature of this invention, the arithmetic processing circuit 130 includes the energization-switching-timing calculation means 131, the time interval calculation means 133 and the time-interval-calculation-mode setting means 135, and the energization-switching-timing calculation means 131 generates the energization switching timing signals TUH, TUL, TVH, TVL, TWH and TWL on the basis of the output signals SA, SB and SC of the position signal generation device 40 and a time interval signal St from the time interval calculation means 133. The time-interval-calculation-mode setting means 135 generates a time interval calculation mode command TQ so as to feed this time interval calculation mode command TQ to the time interval calculation means 133. This time interval calculation means 133 is fed with the time interval calculation mode command TQ, and the output signals SA, SB and SC of the position signal generation device 40.

As stated before, the position detection signals p1, p6, p3, p2, p5 and p4 are successively generated in the order mentioned, and the sections q exist between the respectively two adjacent position detection signals. The time interval calculation means 133 successively selects the two position detection signals px and py which lie both the ends of an addition section Aq that is obtained by adding up Q continuous sections among the position detection signals successively generated in the order of p1, p6, p3, p2, p5 and p4, and it calculates the time interval t between the two selected position detection signals px and py. The time interval calculation mode command TQ sets the number Q of the sections which are contained in the addition section Aq between the selected two position detection signals px and py.

The time-interval-calculation-mode setting means 135 accepts any of the external command TO, rotational speed command RI and load current detection signal IL, and it outputs the time interval calculation mode command TQ. This time-interval-calculation-mode setting means 135 is configured so as to be capable of accepting the output signals SA, SB and SC of the position detection signal generation device 40.

In Embodiment 1, the time-interval-calculation-mode setting means 135 accepts the external command TO so as to generate the time interval calculation mode command TQ on the basis of this external command TO. Concretely, in Embodiment 1, the time-interval-calculation-mode setting means 135 sets the section number Q of the time interval calculation mode command TQ at 2, that is, it sets Q=2, on the basis of the external command TO. In other words, the number Q of the sections q which are contained in the addition section Aq between the two position detection signals px and py is set at 2. In Embodiment 1, the time interval calculation means 133 successively selects the respectively two position detection signals px and py which lie at both the ends of the addition sections Aq each containing the Q=2 sections q, on the basis of the time interval calculation mode command TQ, and it successively calculates the time intervals t between the position detection signals px and py, so as to output the time interval signal St.

Concretely, the time interval calculation means 133 calculates the pluralities of time intervals t21-t26, 18 times repeatedly in each period Tn−1, Tn or Tn+1 of one revolution of the rotor 20, and it outputs these time intervals t21-t26 to the energization-switching-timing calculation means 131 as the time interval signals St. The time intervals t21-t26 will be concretely described.

First, as appended at (a) in FIG. 5, the time intervals t21 are respectively calculated between the position detection signal p1 at the rotational position P1 and the position detection signal p3 at the rotational position P3, between the position detection signal p1 at the rotational position P7 and the position detection signal p3 at the rotational position P9, and between the position detection signal p1 at the rotational position P13 and the position detection signal p3 at the rotational position P15. Each of these time intervals t21 is obtained in such a way that the section number Q=2 and the position detection signals px=p1 and py=p3 are set, that the two position detection signals p1 and p3 which lie at both the ends of the addition section Aq obtained by adding up the two continuous sections q are selected, and that the time interval between the position detection signals p1 and p3 is calculated.

The time intervals t22 are respectively calculated between the position detection signal p2 at the rotational position P4 and the position detection signal p4 at the rotational position P6, between the position detection signal p2 at the rotational position P10 and the position detection signal p4 at the rotational position P12, and between the position detection signal p2 at the rotational position P16 and the position detection signal p4 at the rotational position P18. Each of these time intervals t22 is obtained in such a way that the section number Q=2 and the position detection signals px=p2 and py=p4 are set, that the two position detection signals p2 and p4 which lie at both the ends of the addition section Aq obtained by adding up the two continuous sections q are selected, and that the time interval between the position detection signals p2 and p4 is calculated.

As appended at (b) in FIG. 5, the time intervals t23 are respectively calculated between the position detection signal p3 at the rotational position P3 and the position detection signal p5 at the rotational position P5, between the position detection signal p3 at the rotational position P9 and the position detection signal p5 at the rotational position P11, and between the position detection signal p3 at the rotational position P15 and the position detection signal p5 at the rotational position P17. Each of these time intervals t23 is obtained in such a way that the section number Q=2 and the position detection signals px=p3 and py=p5 are set, that the two position detection signals p3 and p5 which lie at both the ends of the addition section Aq obtained by adding up the two continuous sections q are selected, and that the time interval between the position detection signals p3 and p5 is calculated.

The time intervals t24 are respectively calculated between the position detection signal p4 at the rotational position P18 in the period Tn−1 and the position detection signal p6 at the rotational position P2, between the position detection signal p4 at the rotational position P6 and the position detection signal p6 at the rotational position P8, and between the position detection signal p4 at the rotational position P12 and the position detection signal p6 at the rotational position P14.

Each of these time intervals t24 is obtained in such a way that the section number Q=2 and the position detection signals px=p4 and py=p6 are set, that the two position detection signals p4 and p6 which lie at both the ends of the addition section Aq obtained by adding up the two continuous sections q are selected, and that the time interval between the position detection signals p4 and p6 is calculated.

As appended at (c) in FIG. 5, the time intervals t25 are respectively calculated between the position detection signal p5 at the rotational position P5 and the position detection signal p1 at the rotational position P7, between the position detection signal p5 at the rotational position P11 and the position detection signal p1 at the rotational position P13, and between the position detection signal p5 at the rotational position P17 and the position detection signal p1 at the rotational position P1 in the next period Tn+1. Each of these time intervals t25 is obtained in such a way that the section number Q=2 and the position detection signals px=p5 and py=p1 are set, that the two position detection signals p5 and p1 which lie at both the ends of the addition section Aq obtained by adding up the two continuous sections q are selected, and that the time interval between the position detection signals p5 and p1 is calculated.

The time intervals t26 are respectively calculated between the position detection signal p6 at the rotational position P2 and the position detection signal p2 at the rotational position P4, between the position detection signal p6 at the rotational position P8 and the position detection signal p2 at the rotational position P10, and between the position detection signal p6 at the rotational position P14 and the position detection signal p2 at the rotational position P16. Each of these time intervals t26 is obtained in such a way that the section number Q=2 and the position detection signals px=p6 and py=p2 are set, that the two position detection signals p6 and p2 which lie at both the ends of the addition section Aq obtained by adding up the two continuous sections q are selected, and that the time interval between the position detection signals p6 and p2 is calculated.

Each of the plurality of time intervals t21 is the time interval between the position detection signal p1 and the position detection signal p3, and it depends upon the angle θab between the position sensors PA and PB. Each of the plurality of time intervals t22 is the time interval between the position detection signal p2 and the position detection signal p4, and it also depends upon the angle θab between the position sensors PA and PB. Each of the plurality of time intervals t23 is the time interval between the position detection signal p3 and the position detection signal p5, and it depends upon the angle θbc between the position sensors PB and PC. Each of the plurality of time intervals t24 is the time interval between the position detection signal p4 and the position detection signal p6, and it also depends upon the angle θbc between the position sensors PB and PC. Each of the plurality of time intervals t25 is the time interval between the position detection signal p5 and the position detection signal p1, and it depends upon the angle θca between the position sensors PC and PA. Each of the plurality of time intervals t26 is the time interval between the position detection signal p6 and the position detection signal p2, and it also depends upon the angle θca between the position sensors PC and PA.

The energization-switching-timing calculation means 131 determines the pluralities of energization switching timings tu2, tw2, tv2, tu1, tw1 and tv1 on the basis of the pluralities of time intervals t21-t26 and the pluralities of position detection signals p1-p6, respectively. Concretely, the energization switching timing tu2 at the middle between the rotational positions P3 and P4 is set at a timing which lags an elapsed time $\{(t24/2)+(t21/4)\}$ from the position detection signal p6, with respect to the position detection signal p6 at the rotational position P2. The time period (t24/2) is obtained in such a way that the time interval t24 between the position detection signal p4 at the rotational position P18 in the period Tn−1 and the position detection signal p6 at the rotational position P2 is multiplied by ½. Besides, the time period (t21/4) is obtained in such a way that the time interval t21 between the position detection signal p1 at the rotational position P1 and the position detection signal p3 at the rotational position P3 is multiplied by ¼. Each of the energization switching timings tu2 at the middle between the rotational positions P9 and P10 and at the middle between the rotational positions P15 and P16 is set at a timing which lags the elapsed time $\{(t24/2)+(t21/4)\}$ from the immediately preceding position detection signal p6, by similarly calculating the elapsed time with the immediately preceding time interval t24 and the immediately preceding time interval t21.

The energization switching timing tw2 at the middle between the rotational positions P4 and P5 is set at a timing which lapses an elapsed time $\{(t21/2)+(t26/4)\}$ from the position detection signal p3, with respect to the position detection signal p3 at the rotational position P3. The time period (t21/2) is obtained in such a way that the time interval t21 between the position detection signal p1 at the rotational position P1 and the position detection signal p3 at the rotational position P3 is multiplied by ½. Besides, the time period (t26/4) is obtained in such a way that the time interval t26 between the position detection signal p6 at the rotational position P2 and the position detection signal p2 at the rotational position P4 is multiplied by ¼. Each of the energization switching timings tw2 at the middle between the rotational positions P10 and P11 and at the middle between the rotational positions P16 and P17 is set at a timing which lags the elapsed time $\{(t21/2)+(t26/4)\}$ from the immediately preceding position detection signal p3, by similarly calculating the elapsed time with the immediately preceding time interval t21 and the immediately preceding time interval t26.

The energization switching timing tv2 at the middle between the rotational positions P5 and P6 is set at a timing which lags an elapsed time $\{(t26/2)+(t23/4)\}$ from the position detection signal p2, with respect to the position detection signal p2 at the rotational position P4. The time period (t26/2) is obtained in such a way that the time interval t26 between the position detection signal p6 at the rotational position P2 and the position detection signal p2 at the rotational position P4 is multiplied by ½. Besides, the time period (t23/4) is obtained in such a way that the time interval t23 between the position detection signal p3 at the rotational position P3 and the position detection signal p5 at the rotational position P5 is multiplied by ¼. Each of the energization switching timings tv2 at the middle between the rotational positions P11 and P12 and at the middle between the rotational positions P17 and P18 is set at a timing which lags the elapsed time $\{(t26/2)+(t23/4)\}$ from the immediately preceding position detection signal p2, by similarly calculating the elapsed time with the immediately preceding time interval t26 and the immediately preceding time interval t23.

The energization switching timing tu1 at the middle between the rotational positions P6 and P7 is set at a timing which lags an elapsed time $\{(t23/2)+(t22/4)\}$ from the position detection signal p5, with respect to the position detection signal p5 at the rotational position P5. The time period (t23/2) is obtained in such a way that the time interval t23 between the position detection signal p3 at the rotational position P3 and the position detection signal p5 at the rotational position P5 is multiplied by ½. Besides, the time period (t22/4) is obtained in such a way that the time interval t22 between the position detection signal p2 at the rotational position P4 and the position detection signal p4 at the rotational position P6 is multiplied by ¼. Each of the energization switching timings tu1 at the middle between the rotational positions P12 and P13 and at the middle between the rotational position P18 and the rotational position P1 in the next period Tn+1 is set at a timing which lags the elapsed time {(t23/2)+(t22/4)} from the immediately preceding position detection signal p5, by similarly calculating the elapsed time with the immediately preceding time interval t23 and the immediately preceding time interval t22.

The energization switching timing tw1 at the middle between the rotational positions P7 and P8 is set at a timing which lags an elapsed time {(t22/2)+(t25/4)} from the position detection signal p4, with respect to the position detection signal p4 at the rotational position P6. The time period (t22/2) is obtained in such a way that the time interval t22 between the position detection signal p2 at the rotational position P4 and the position detection signal p4 at the rotational position P6 is multiplied by ½. Besides, the time period (t25/4) is obtained in such a way that the time interval t25 between the position detection signal p5 at the rotational position P5 and the position detection signal p1 at the rotational position P7 is multiplied by ¼. Each of the energization switching timings tw1 at the middle between the rotational positions P13 and P14 and at the middle between the rotational positions P1 and P2 is set at a timing which lags the elapsed time {(t22/2)+(t25/4)} from the immediately preceding position detection signal p4, by similarly calculating the elapsed time with the immediately preceding time interval t22 and the immediately preceding time interval t25.

The energization switching timing tv1 at the middle between the rotational positions P8 and P9 is set at a timing which lags an elapsed time {(t25/2)+(t24/4)} from the position detection signal p1, with respect to the position detection signal p1 at the rotational position P7. The time period (t25/2) is obtained in such a way that the time interval t25 between the position detection signal p5 at the rotational position P5 and the position detection signal p1 at the rotational position P7 is multiplied by ½. Besides, the time period (t24/4) is obtained in such a way that the time interval t24 between the position detection signal p4 at the rotational position P6 and the position detection signal p6 at the rotational position P8 is multiplied by ¼. Each of the energization switching timings tv1 at the middle between the rotational positions P14 and P15 and at the middle between the rotational positions P2 and P3 is set at a timing which lags the elapsed time {(t25/2)+(t24/4)} from the immediately preceding position detection signal p1, by similarly calculating the elapsed time with the immediately preceding time interval t25 and the immediately preceding time interval t24.

In the prior-art control apparatus for the three-phase brushless motor, among the position detection signals successively generated at each of the rotational positions P1-P18, the time interval t0 between the two position detection signals adjacent to each other is calculated, and the energization switching timings are determined using this time interval t0. In other words, merely the two position detection signals lying at both the ends of one section q are successively selected, and the time interval t0 between the position detection signals is calculated, so that the number Q of the section existing between the two selected position detection signals px and py is 1. In the prior art which determines the pluralities of energization switching timings on the basis of the time interval t0, the errors of the mounting positions of the position sensors PA, PB and PC exert great influence on the pluralities of energization switching timings.

In contrast, in Embodiment 1, each of the pluralities of time intervals t21-t26 is set as the time interval between the two position detection signals px and py which lie at both the ends of the addition section Aq obtained by adding up the two continuous sections q, and the pluralities of energization switching timings tu2, tw2, tv2, tu1, tw1 and tv1 are respectively determined on the basis of the pluralities of time intervals t21-t26 and the pluralities of position detection signals p1-p6. Each of the pluralities of time intervals t21-t26 has a time interval which is substantially double the time interval t0. The pluralities of energization switching timings are determined using the values obtained in such a way that the time intervals t21-t26 with the time interval to substantially doubled are respectively multiplied by ½ and ¼. Thus, even in the case where the errors have developed in the mounting positions of the position sensors PA, PB and PC, they are averaged, and hence, their influence is lessened. Besides, regarding the errors of the magnetized positions incurred by the arrangement errors of the permanent magnets m1-m6 of the position detecting rotor 41, the influence thereof can be similarly lessened. Also in the apparatus in which the rotor 20 serves instead of the position detecting rotor 41, the influence of the errors of the magnetized positions incurred by the arrangement errors of the permanent magnets M1-M6 can be similarly lessened.

Figure 6:
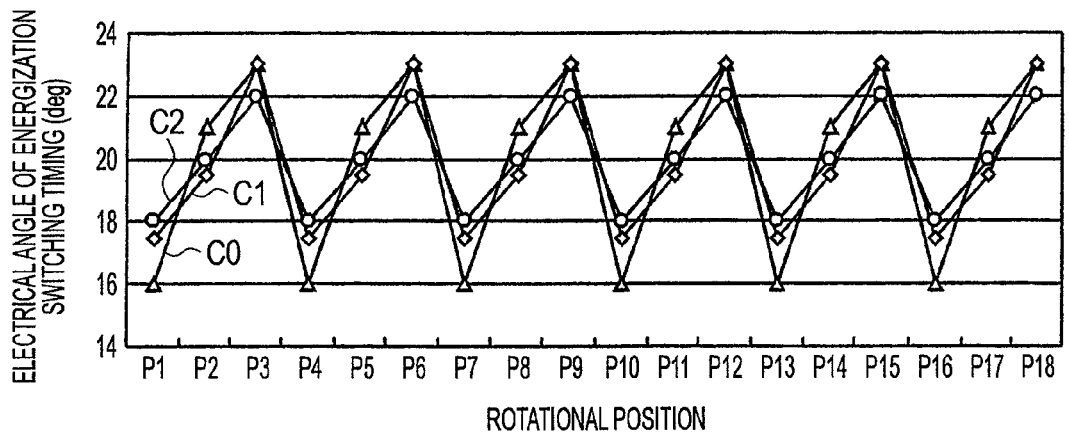
FIG. 6 is a characteristic diagram showing the changes of the electrical angles of energization switching timings as to Embodiment 1 and Embodiment 2.

FIG. 6 is a graph obtained by actually measuring the changes of energization switching timings in the case where, in the three-phase brushless motor 10, an angular error of 2 degrees has developed in the mounting position of one of the position sensors PA, PB and PC. The three-phase brushless motor 10 here is the same three-phase brushless motor of 6 poles and 9 slots as in Embodiment 1. The axis of abscissas in FIG. 6 represents the rotational positions P1-P18, while the axis of ordinates represents the electrical angles of the energization switching timings. In the three-phase brushless motor 10 of the 6 poles and 9 slots, it is ideal that the electrical angles between the energization switching timings corresponding to the rotational positions P1-P18 are kept at 20 degrees. However, the angular error of 2 degrees has developed in the mounting position of one position sensor, with the result that the pluralities of energization switching timings corresponding to the rotational positions P1-P18 have fluctuated with respect to θe=20 degrees.

Referring to FIG. 6, a characteristic C1 indicated by symbol (◇) is a characteristic corresponding to Embodiment 1, and a characteristic C0 indicated by symbol (Δ) is a characteristic corresponding to the prior-art control. In the prior-art control, the pluralities of energization switching timings are determined using the plurality of time intervals t0 and the plurality of position detection signals, and as illustrated by the characteristic C0, the fluctuation width of the energization switching timings is in a range from 16 degrees to 23 degrees. In contrast, in the control of Embodiment 1, the pluralities of energization switching timings are determined on the basis of the time intervals t21-t26 each corresponding substantially to double the time interval to, and the position detection signals p1-p6, and as illustrated by the characteristic C1, the fluctuation width of the energization switching timings is suppressed into a range from about 18 degrees to 23 degrees.

Figure 7:
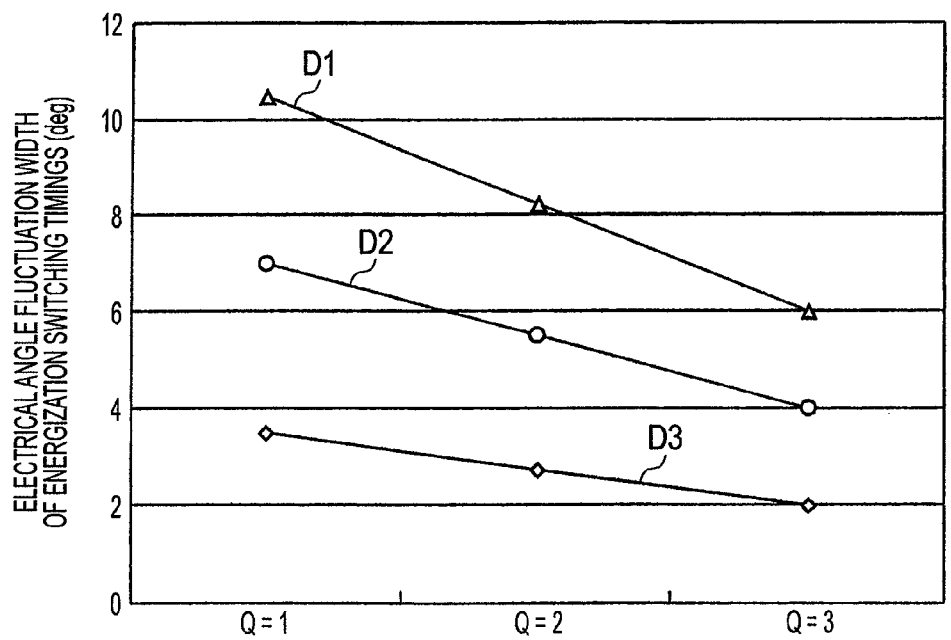
FIG. 7 is a characteristic diagram showing the electrical angle fluctuation widths of the energization switching timings as to Embodiment 1 and Embodiment 2.

FIG. 7 is a graph obtained by actually measuring the relationship between the number Q of the sections between the two position detection signals px and py and the electrical angle fluctuation width of the energization switching timings corresponding to the section number Q. Also in the graph of FIG. 7, the three-phase brushless motor 10 is the same three-phase brushless motor of the 6 poles and 9 slots as in Embodiment 1. The axis of abscissas in FIG. 7 represents the section number Q, and the axis of ordinates represents the electrical angle fluctuation width of the energization switching timings. A characteristic D1 is a characteristic in the case where an angular error of 1 degree has developed in the mounting position of one of the position sensors PA, PB and PC, a characteristic D2 is a characteristic in the case where an angular error of 2 degrees has developed in the mounting position of one position sensor, and a characteristic D3 is a characteristic in the case where an angular error of 3 degrees has developed in the mounting position of one position sensor.

Regarding the characteristic D1, in the prior art corresponding to the section number Q=1, the electrical angle fluctuation width of the energization switching timings becomes about 10.5 degrees, whereas in Embodiment 1 having the section number Q=2, the electrical angle fluctuation width of the energization switching timings is suppressed to about 8.0 degrees. Regarding the characteristic D2, in the prior art corresponding to the section number Q=1, the electrical angle fluctuation width of the energization switching timings becomes about 7 degrees, whereas in Embodiment 1 having the section number Q=2, the electrical angle fluctuation width of the energization switching timings is suppressed to about 5.5 degrees. Regarding the characteristic D3, in the prior art corresponding to the section number Q=1, the electrical angle fluctuation width of the energization switching timings becomes about 3.5 degrees, whereas in Embodiment 1 having the section number Q=2, the electrical angle fluctuation width of the energization switching timings is suppressed to about 3.0 degrees.

Both FIGS. 6 and 7 are the graphs in the cases where the errors have developed in the mounting position of the position sensor. However, similar characteristics are obtained also in a case where errors have developed in the arrangements of the permanent magnets m1-m6 of the position detecting rotor 41, or in a case where errors have developed in the arrangements of the permanent magnets M1-M6 of the rotor 20 which is used also for the position detections, and the fluctuations of the energization switching timings attributed to the errors can be suppressed in Embodiment 1.

In Embodiment 1, the section number Q is 2, and it is an even number. Since the section number Q is the even number, the two position detection signals px and py which determine each of the pluralities of time intervals t21, t23 and t25 are selected from among the position detection signals p1, p3 and p5. All of the position detection signals p1, p3 and p5 are generated when the edges affording the changes of a magnetic flux density in the same polarities, namely, the edges ea, ec and ee changing from the S-poles to the N-poles have opposed to the position sensors PA, PB and PC with the rotation of the rotor 20, so that the time intervals t21, t23 and t25 can be calculated more precisely. Besides, the two position detection signals px and py which determine each of the pluralities of time intervals t22, t24 and t26 are selected from among the position detection signals p2, p4 and p6. All of the position detection signals p2, p4 and p6 are generated when the edges affording the changes of the magnetic flux density in the same polarities, namely, the edges eb, ed and ef changing from the N-poles to the S-poles have opposed to the position sensors PA, PB and PC with the rotation of the rotor 20, so that also the time intervals t22, t24 and t26 can be calculated more precisely.

Figure 8:
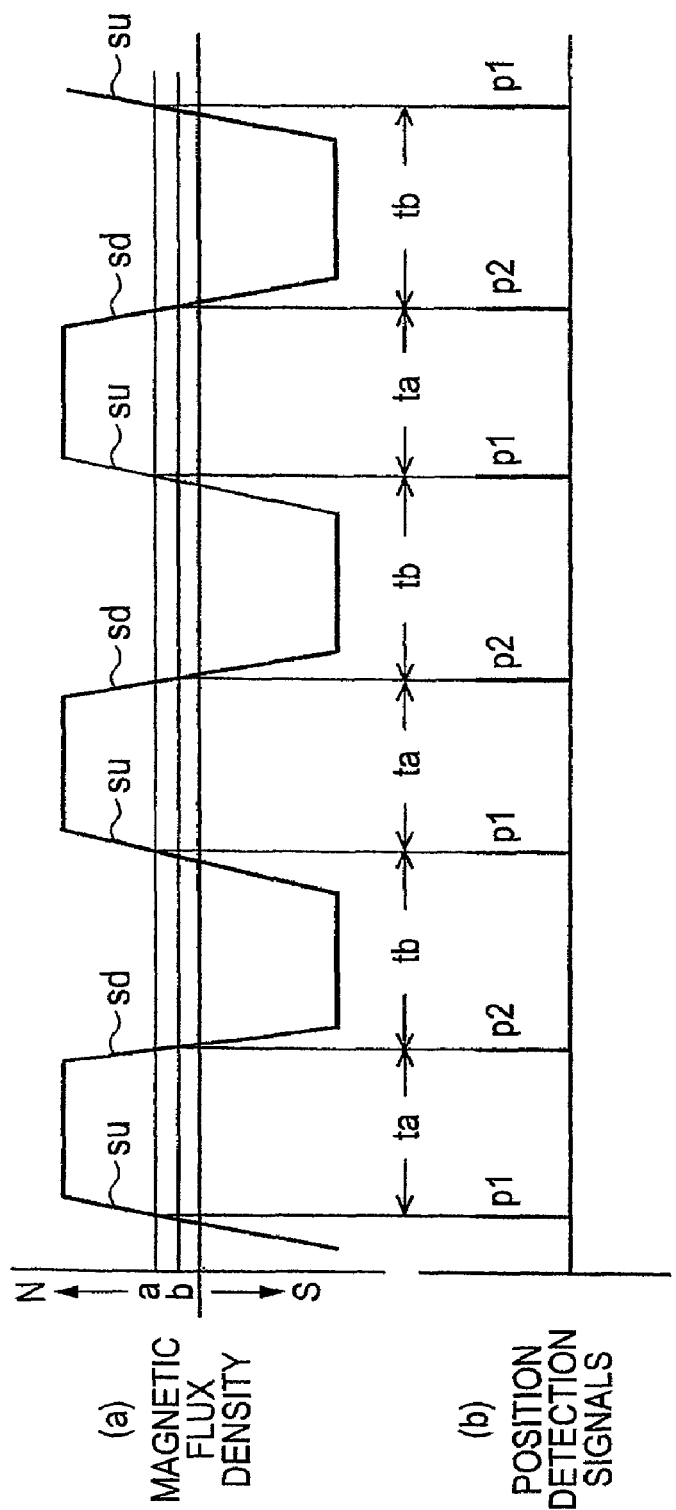
FIG. 8 is an explanatory diagram showing a magnetic flux density change and position detection signals in the position detection signal generation device.

In FIG. 8, (a) exemplifies the output signal SA corresponding to the position sensor PA, and the change of a magnetic flux density corresponding thereto. The same holds true of the output signals SB and SC of the other position sensors PB and PC, respectively. The sensor output pA of the position sensor SA exhibits substantially the same change as the change of the magnetic flux density shown at (a) in FIG. 8. In FIG. 8, (b) shows the position detection signals p1 and p2 which are contained in the output signal SA of the position detection signal generator 42 as corresponds to the position sensor PA. In the change of the magnetic flux density shown at (a) in FIG. 8, the magnetic flux density rises onto an N-pole side with an up-slope su, at positions corresponding to the edges ea, ec and ee, whereas the magnetic flux density lowers onto an S-pole side with a down-slope sd, at positions corresponding to the edges eb, ed and ef. The position detection signal generator 42 has detection levels a and b. In the case where the magnetic flux density rises onto the N-pole side, the generator 42 generates the position detection signal p1 when the magnetic flux density has risen to the level a midway of the up-slope su, and in the case where the magnetic flux density lowers onto the S-pole side, the generator 42 generates the position detection signal p2 when the magnetic flux density has lowered to the level b midway of the down-slope sd. The change of the magnetic flux density has the up-slope su and the down-slope sd, and the position detection signal generator 42 has the detection levels a and b. As a result, the time interval ta between the position detection signal p1 and the next position detection signal p2 differs from the time interval tb between the position detection signal p2 and the next position detection signal p, and the relation of tb>ta holds.

In the prior art, the section number Q is 1, and there coexist the three states of a state where the time interval t0 is calculated between the position detection signal obtained at the up-slope su and the position detection signal obtained at the down-slope sd, a state where the time interval t0 is calculated between two position detection signals obtained at the up-slope su, and a state where the time interval t0 is calculated between two position detection signals obtained at the down-slope sd, with the result that the time interval t0 involves a dispersion incurred by the slopes of the change of the magnetic flux density. In contrast, in Embodiment 1, the section number Q is 2, and each of the pluralities of time intervals t21, t23 and t25 is calculated between the two position detection signals among the position detection signals p1, p3 and p5 obtained at the up-slope su, while each of the pluralities of time intervals t22, t24 and t26 is calculated between the two position detection signals among the position detection signals p2, p4 and p6 obtained at the down-slope sd, so that dispersions incurred by the slopes of the change of the magnetic flux density become small in the time intervals t21-t26, and the fluctuations of the energization switching timings can be suppressed to smaller magnitudes.

Embodiment 2

Embodiment 1 has been so configured that the time-interval-calculation-mode setting means 135 gives the time interval calculation means 133 the time interval calculation mode command TQ of the section number Q=2 on the basis of the external command TO, and that the time interval calculation means 133 calculates each of the time intervals t21-t26, between the two position detection signals px and py lying at both the ends of the two continuous sections q. In Embodiment 2, the time-interval-calculation-mode setting means 135 gives the time interval calculation means 133 a time interval calculation mode command TQ of section number Q=3 on the basis of the external command TO, and the time interval calculation means 133 calculates each of time intervals t31-t36, between two position detection signals px and py lying at both the ends of three continuous sections q. The other configuration of Embodiment 2 is the same as in Embodiment 1.

Figure 9:
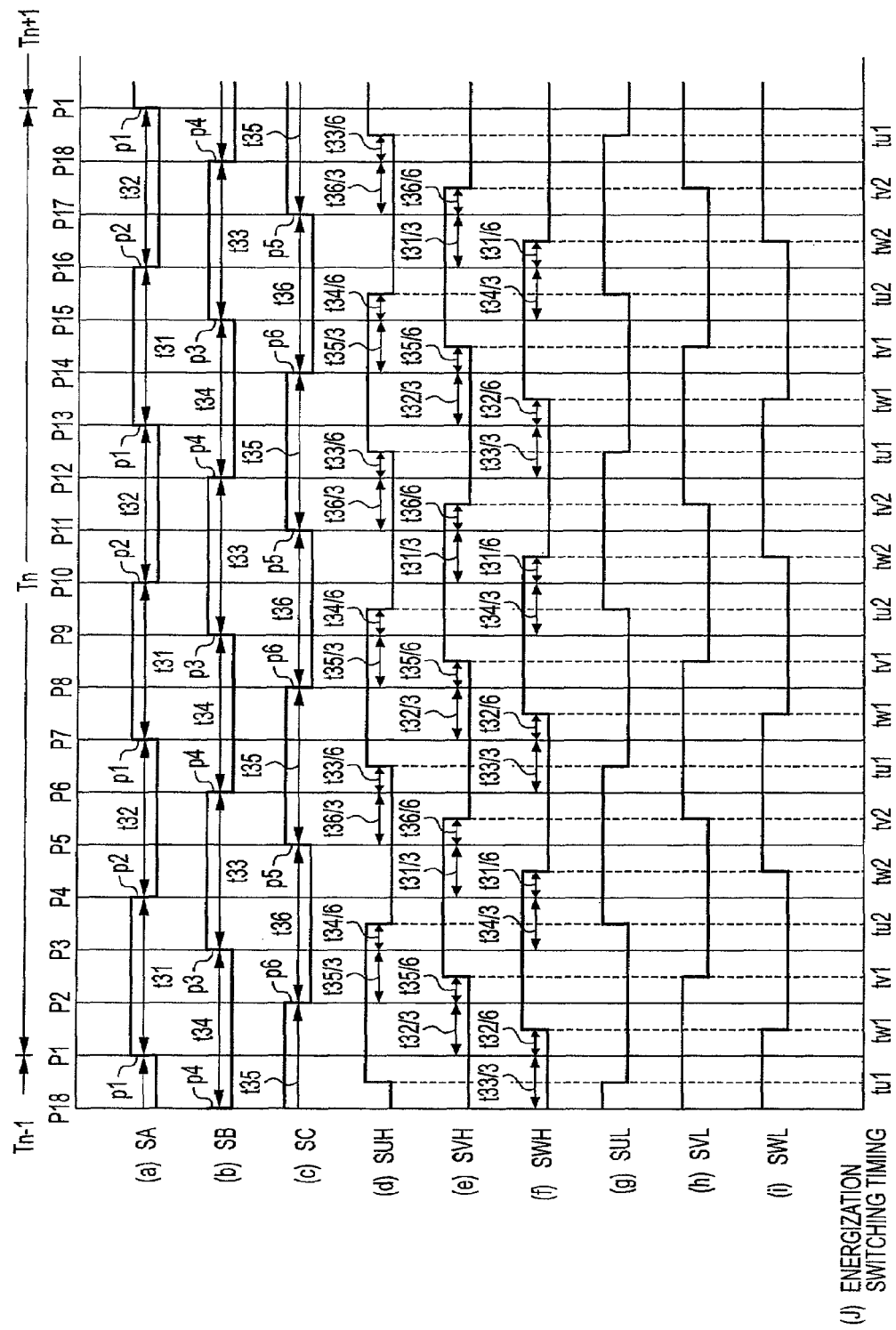
FIG. 9 is a timing chart for explaining the operation of Embodiment 2 of the control device for the three-phase brushless motor according to this invention.

FIG. 9 is a timing chart for explaining the operation of Embodiment 2. Rotational positions P1-P18 on the axis of abscissas in FIG. 9 are the same as in FIG. 5, and respective signal waveforms shown at (a)-(j) in FIG. 9 are also the same as in FIG. 5. In Embodiment 2, the time interval calculation means 133 successively calculates the time intervals t31-t36 appended at (a), (b) and (c) in FIG. 9. These time intervals t31-t36 will be concretely described.

First, the time intervals t31 are respectively calculated between the position detection signal p1 at the rotational position P1 and the position detection signal p2 at the rotational position P4, between the position detection signal p1 at the rotational position P7 and the position detection signal p2 at the rotational position P10, and between the position detection signal p1 at the rotational position P13 and the position detection signal p2 at the rotational position P16. Each of these time intervals t31 is obtained in such a way that the section number Q=3 and the position detection signals px=p1 and py=p2 are set, that the two position detection signals p1 and p2 which lie at both the ends of an addition section Aq obtained by adding up the three continuous sections q are selected, and that the time interval between the position detection signals p1 and p2 is calculated.

The time intervals t32 are respectively calculated between the position detection signal p2 at the rotational position P4 and the position detection signal p1 at the rotational position P7, between the position detection signal p2 at the rotational position P10 and the position detection signal p1 at the rotational position P13, and between the position detection signal p2 at the rotational position P16 and the position detection signal p1 at the rotational position P1 in the next period Tn+1. Each of these time intervals t32 is obtained in such a way that the section number Q=3 and the position detection signals px=p2 and py=p1 are set, that the two position detection signals p2 and p1 which lie at both the ends of the addition section Aq obtained by adding up the three continuous sections q are selected, and that the time interval between the position detection signals p2 and p1 is calculated.

The time intervals t33 are respectively calculated between the position detection signal p3 at the rotational position P3 and the position detection signal p4 at the rotational position P6, between the position detection signal p3 at the rotational position P9 and the position detection signal p4 at the rotational position P12, and between the position detection signal p3 at the rotational position P15 and the position detection signal p4 at the rotational position P18. Each of these time intervals t33 is obtained in such a way that the section number Q=3 and the position detection signals px=p3 and py=p4 are set, that the two position detection signals p3 and p4 which lie at both the ends of the addition section Aq obtained by adding up the three continuous sections q are selected, and that the time interval between the position detection signals p3 and p4 is calculated.

The time intervals t34 are respectively calculated between the position detection signal p4 at the rotational position P18 in the previous period Tn−1 and the position detection signal p3 at the rotational position P3, between the position detection signal p4 at the rotational position P6 and the position detection signal p3 at the rotational position P9, and between the position detection signal p4 at the rotational position P12 and the position detection signal p3 at the rotational position P15. Each of these time intervals t34 is obtained in such a way that the section number Q=3 and the position detection signals px=p4 and py=p3 are set, that the two position detection signals p4 and p3 which lie at both the ends of the addition section Aq obtained by adding up the three continuous sections q are selected, and that the time interval between the position detection signals p4 and p3 is calculated.

The time intervals t35 are respectively calculated between the position detection signal p5 at the rotational position P5 and the position detection signal p6 at the rotational position P8, between the position detection signal p5 at the rotational position P11 and the position detection signal p6 at the rotational position P14, between the position detection signal p5 at the rotational position P17 and the first position detection signal p6 in the next period Tn+1, and between the last position detection signal p5 in the previous period Tn−1 and the position detection signal p6 at the rotational position P2. Each of these time intervals t35 is obtained in such away that the section number Q=3 and the position detection signals px=p5 and py=p6 are set, that the two position detection signals p5 and p6 which lie at both the ends of the addition section Aq obtained by adding up the three continuous sections q are selected, and that the time interval between the position detection signals p5 and p6 is calculated.

The time intervals t36 are respectively calculated between the position detection signal p6 at the rotational position P2 and the position detection signal p5 at the rotational position P5, between the position detection signal p6 at the rotational position P8 and the position detection signal p5 at the rotational position P11, and between the position detection signal p6 at the rotational position P14 and the position detection signal p5 at the rotational position P17. Each of these time intervals t36 is obtained in such a way that the section number Q=3 and the position detection signals px=p6 and py=p5 are set, that the two position detection signals p6 and p5 which lie at both the ends of the addition section Aq obtained by adding up the three continuous sections q are selected, and that the time interval between the position detection signals p6 and p5 is calculated.

In a case where angular errors have developed in the mounting positions of the position sensors PA, PB and PC, or in a case where errors have developed in the magnetized positions of the permanent magnets m1-m6 of the position detecting rotor 41 or the permanent magnets M1-M6 of the rotor 20 which is used also for the position detections, the timings which are generated by the position detection signals p1-p6 deviate, and hence, deviations occur also in the energization switching timings tu1, tu2, tv1, tv2, tw1 and tw2. In Embodiment 2, however, each of the time intervals t31 and t32 is the time interval between the position detection signal p1 and the position detection signal p2, and even when the error has developed in the mounting position of the position sensor PA and when the errors of the magnetized positions have developed in the permanent magnets m1-m6 and M1-M6, these time intervals t31 and t32 are not influenced by the errors. Each of the time intervals t33 and t34 is the time interval between the position detection signal p3 and the position detection signal p4, and each of the time intervals t35 and t36 is the time interval between the position detection signal p5 and the position detection signal p6, and even when the errors have developed in the mounting positions of the position sensors PB and PC and when the errors of the magnetized positions have developed in the permanent magnets m1-m6 and M1-M6, these time intervals t33, t34, t35 and t36 are not influenced by the errors.

The energization-switching-timing calculation means 131 determines the pluralities of energization switching timings tw2, tv2, tu1, tw1, tv1 and tu2 on the basis of the pluralities of position detection signals p1-p6 contained in the output signals SA, SB and SC of the position detection signal generation device 40, and the pluralities of time intervals t31-t36, respectively. Concretely, the energization switching timing tw2 at the middle between the rotational positions P4 and P5 is set at a timing which lags an elapsed time {(t34/3)+(t31/6)} from the position detection signal p3, with respect to the position detection signal p3 at the rotational position P3. The time period (t34/3) is obtained in such a way that the time interval t34 between the position detection signal p4 at the rotational position P18 in the previous period Tn−1 and the position detection signal p3 at the rotational position P3 is multiplied by ⅓. Besides, the time period (t31/6) is obtained in such a way that the time interval t31 between the position detection signal p1 at the rotational position P1 and the position detection signal p2 at the rotational position P4 is multiplied by ⅙. Each of the energization switching timings tw2 at the middle between the rotational positions P10 and P11 and at the middle between the rotational positions P16 and P17 is set at a timing which lags the elapsed time {(t34/3)+(t31/6)} from the immediately preceding position detection signal p3, by similarly calculating the elapsed time with the immediately preceding time interval t34 and the immediately preceding time interval t31.

The energization switching timing tv2 at the middle between the rotational positions P5 and P6 is set at a timing which lags an elapsed time {(t31/3)+(t36/6)} from the position detection signal p2, with respect to the position detection signal p2 at the rotational position P4. The time period (t31/3) is obtained in such a way that the time interval t31 between the position detection signal p1 at the rotational position P1 and the position detection signal p2 at the rotational position P4 is multiplied by ⅓. Besides, the time period (t36/6) is obtained in such a way that the time interval t36 between the position detection signal p6 at the rotational position P2 and the position detection signal p5 at the rotational position P5 is multiplied by ⅙. Each of the energization switching timings tv2 at the middle between the rotational positions P11 and P12 and at the middle between the rotational positions P17 and P18 is set at a timing which lags the elapsed time {(t31/3)+(t36/6)} from the immediately preceding position detection signal p2, by similarly calculating the elapsed time with the immediately preceding time interval t31 and the immediately preceding time interval t36.

The energization switching timing tu1 at the middle between the rotational positions P6 and P7 is set at a timing which lags an elapsed time {(t36/3)+(t33/6)} from the position detection signal p5, with respect to the position detection signal p5 at the rotational position P5. The time period (t36/3) is obtained in such a way that the time interval t36 between the position detection signal p6 at the rotational position P2 and the position detection signal p5 at the rotational position P5 is multiplied by ⅓. Besides, the time period (t33/6) is obtained in such a way that the time interval t33 between the position detection signal p3 at the rotational position P3 and the position detection signal p4 at the rotational position P6 is multiplied by ⅙. Each of the energization switching timings tu1 at the middle between the rotational positions P12 and P13 and at the middle between the rotational position P18 and the rotational position P1 in the next period Tn+1 is set at a timing which lags the elapsed time {(t36/3)+(t33/6)} from the immediately preceding position detection signal p5, by similarly calculating the elapsed time with the immediately preceding time interval t36 and the immediately preceding time interval t33.

The energization switching timing tw1 at the middle between the rotational positions P7 and P8 is set at a timing which lags an elapsed time {(t33/3)+(t32/6)} from the position detection signal p4, with respect to the position detection signal p4 at the rotational position P6. The time period (t33/3) is obtained in such a way that the time interval t33 between the position detection signal p3 at the rotational position P3 and the position detection signal p4 at the rotational position P6 is multiplied by ⅓. Besides, the time period (t32/6) is obtained in such a way that the time interval t32 between the position detection signal p2 at the rotational position P4 and the position detection signal p1 at the rotational position P7 is multiplied by ⅙. Each of the energization switching timings tw1 at the middle between the rotational positions P13 and P14 and at the middle between the rotational positions P1 and P2 is set at a timing which lags the elapsed time {(t33/3)+(t32/6)} from the immediately preceding position detection signal p4, by similarly calculating the elapsed time with the immediately preceding time interval t33 and the immediately preceding time interval t32.

The energization switching timing tv1 at the middle between the rotational positions P8 and P9 is set at a timing which lags an elapsed time {(t32/3)+(t35/6)} from the position detection signal p1, with respect to the position detection signal p1 at the rotational position P7. The time period (t32/3) is obtained in such a way that the time interval t32 between the position detection signal p2 at the rotational position P4 and the position detection signal p1 at the rotational position P7 is multiplied by ⅓. Besides, the time period (t35/6) is obtained in such a way that the time interval t35 between the position detection signal p5 at the rotational position P5 and the position detection signal p6 at the rotational position P8 is multiplied by ⅙. Each of the energization switching timings tv1 at the middle between the rotational positions P14 and P15 and at the middle between the rotational positions P2 and P3 is set at a timing which lags the elapsed time {(t32/3)+(t35/6)} from the immediately preceding position detection signal p1, by similarly calculating the elapsed time with the immediately preceding time interval t32 and the immediately preceding time interval t35.

The energization switching timing tu2 at the middle between the rotational positions P9 and P10 is set at a timing which lags an elapsed time {(t35/3)+(t34/6)} from the position detection signal p6, with respect to the position detection signal p6 at the rotational position P8. The time period (t35/3) is obtained in such a way that the time interval t35 between the position detection signal p5 at the rotational position P5 and the position detection signal p6 at the rotational position P8 is multiplied by ⅓. Besides, the time period (t34/6) is obtained in such a way that the time interval t34 between the position detection signal p4 at the rotational position P6 and the position detection signal p3 at the rotational position P9 is multiplied by ⅙. Each of the energization switching timings tu2 at the middle between the rotational positions P15 and P16 and at the middle between the rotational positions P3 and P4 is set at a timing which lags the elapsed time {(t35/3)+(t34/6)} from the immediately preceding position detection signal p6, by similarly calculating the elapsed time with the immediately preceding time interval t35 and the immediately preceding time interval t34.

In Embodiment 2, the two position detection signals px and py which lie at both the ends of the addition period Aq obtained by adding up the three continuous sections q are selected, each of the pluralities of time intervals t31-t36 is calculated between the signals px and py, and the pluralities of energization switching timings are determined on the basis of the pluralities of time intervals t31-t36 and the pluralities of position detection signals p1-p6. Since the time intervals t31-t36 are not influenced by the angular errors of the mounting positions of the position sensors PA, PB and PC, the pluralities of energization switching timings fluctuate depending upon only the angular errors of the mounting positions of the position sensors PA, PB and PC and the errors of the magnetized positions of the permanent magnets m1-m6 or the permanent magnets M1-M6, and the fluctuations of the energization switching timings can be suppressed to smaller magnitudes.

A characteristic C2 indicated by symbol (○) in FIG. 6, and the section number Q=3 in FIG. 7 correspond to Embodiment 2. In the characteristic C2 in FIG. 6, the electrical angle of each energization switching timing fluctuates between 18 degrees and 22 degrees, and the fluctuation of the electrical angle of each energization switching timing becomes smaller than in the characteristic C0 of the prior-art technique. At the section number Q=3 in FIG. 7, the electrical angle fluctuation width of the energization switching timings in the characteristic D1 is suppressed to 6 degrees, the electrical angle fluctuation width of the energization switching timings in the characteristic D2 is suppressed to 4 degrees, and the electrical angle fluctuation width of the energization switching timings in the characteristic D3 is suppressed to 2 degrees.

Embodiment 3

In Embodiment 3 here, the time-interval-calculation-mode setting means 135 gives the time interval calculation means 133 a time interval calculation mode command TQ of section number Q=4 on the basis of the external command TO, and the time interval calculation means 133 calculates each of time intervals t41-t46, between two position detection signals px and py lying at both the ends of four continuous sections q. The other configuration of Embodiment 3 is the same as in Embodiment 1.

Figure 10:
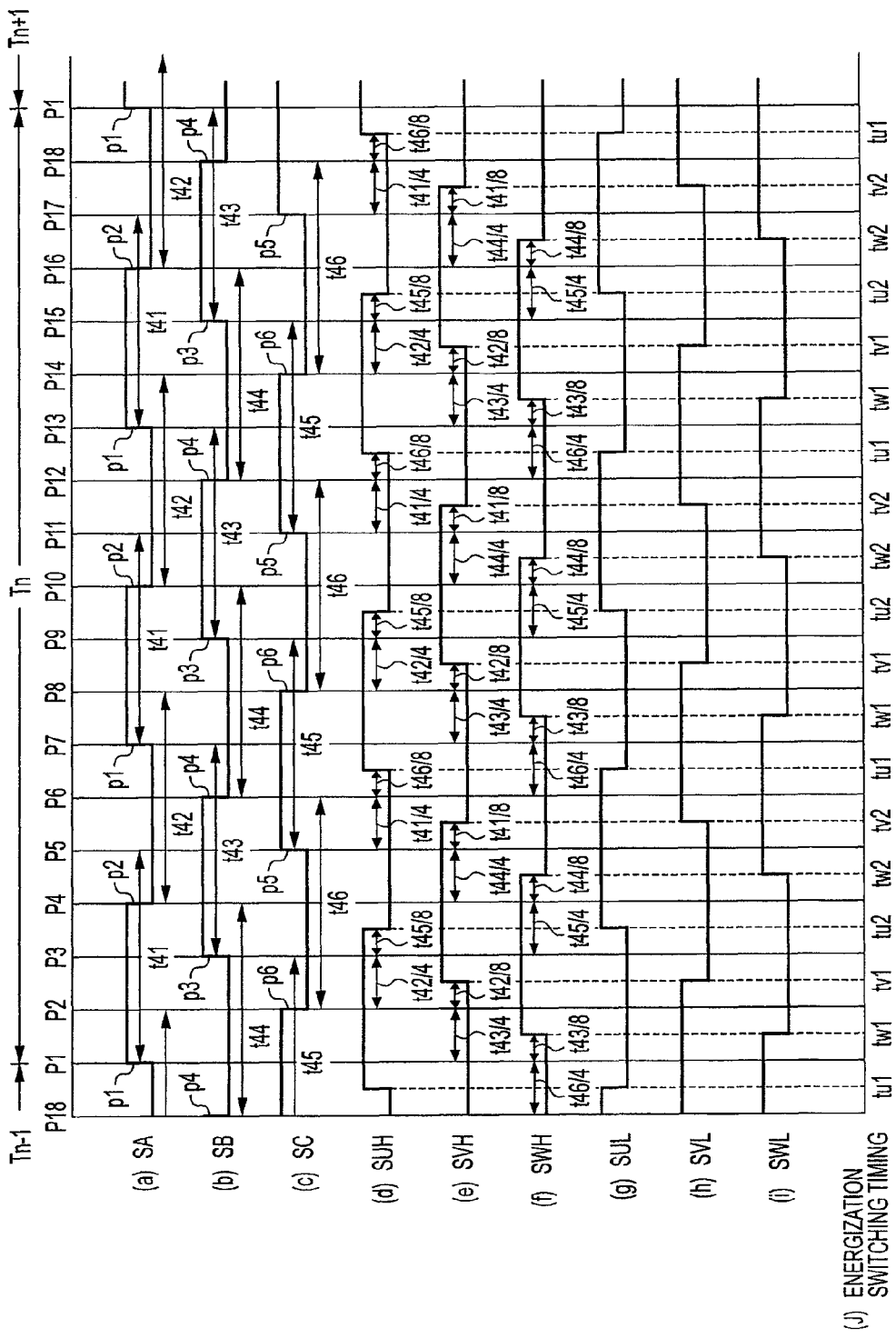
FIG. 10 is a timing chart for explaining the operation of Embodiment 3 of the control device for the three-phase brushless motor according to this invention.

FIG. 10 is a timing chart for explaining the operation of Embodiment 3. Rotational positions P1-P18 on the axis of abscissas in FIG. 10 are the same as in FIG. 5, and respective signal waveforms shown at (a)-(j) in FIG. 10 are also the same as in FIG. 5. The time interval calculation means 133 successively calculates the time intervals t41-t46 appended at (a), (b) and (c) in FIG. 10. These time intervals t41-t46 will be concretely described.

First, the time intervals t41 are respectively calculated between the position detection signal p1 at the rotational position P1 and the position detection signal p5 at the rotational position P5, between the position detection signal p1 at the rotational position P7 and the position detection signal p5 at the rotational position P11, and between the position detection signal p1 at the rotational position P13 and the position detection signal p5 at the rotational position P17. Each of these time intervals t41 is obtained in such a way that the section number Q=4 and the position detection signals px=p1 and py=p5 are set, that the two position detection signals p1 and p5 which lie at both the ends of an addition section Aq obtained by adding up the four continuous sections q are selected, and that the time interval between the position detection signals p1 and p5 is calculated.

The time intervals t42 are respectively calculated between the position detection signal p2 at the rotational position P4 and the position detection signal p6 at the rotational position P8, between the position detection signal p2 at the rotational position P10 and the position detection signal p6 at the rotational position P14, between the position detection signal p2 at the rotational position P16 and the first position detection signal p6 in the next period Tn+1, and between the last position detection signal p2 in the previous period Tn−1 and the position detection signal p6 at the rotational position P2. Each of these time intervals t42 is obtained in such a way that the section number Q=4 and the position detection signals px=p2 and py=p6 are set, that the two position detection signals p2 and p6 which lie at both the ends of the addition section Aq obtained by adding up the four continuous sections q are selected, and that the time interval between the position detection signals p2 and p6 is calculated.

The time intervals t43 are respectively calculated between the position detection signal p3 at the rotational position P3 and the position detection signal p1 at the rotational position P7, between the position detection signal p3 at the rotational position P9 and the position detection signal p1 at the rotational position P13, between the position detection signal p3 at the rotational position P15 and the position detection signal p1 at the rotational position P1 in the next period Tn+1, and between the last position detection signal p3 in the previous period Tn−1 and the position detection signal p1 at the rotational position P1. Each of these time intervals t43 is obtained in such a way that the section number Q=4 and the position detection signals px=p3 and py=p1 are set, that the two position detection signals p3 and p1 which lie at both the ends of the addition section Aq obtained by adding up the four continuous sections q are selected, and that the time interval between the position detection signals p3 and p1 is calculated.

The time intervals t44 are respectively calculated between the position detection signal p4 at the rotational position P18 in the previous period Tn−1 and the position detection signal p2 at the rotational position P4, between the position detection signal p4 at the rotational position P6 and the position detection signal p2 at the rotational position P10, and between the position detection signal p4 at the rotational position P12 and the position detection signal p2 at the rotational position P16. Each of these time intervals t44 is obtained in such a way that the section number Q=4 and the position detection signals px=p4 and py=p2 are set, that the two position detection signals p4 and p2 which lie at both the ends of the addition section Aq obtained by adding up the four continuous sections q are selected, and that the time interval between the position detection signals p4 and p2 is calculated.

The time intervals t45 are respectively calculated between the last position detection signal p5 in the previous period Tn−1 and the position detection signal p3 at the rotational position P3, between the position detection signal p5 at the rotational position P5 and the position detection signal p3 at the rotational position P9, and between the position detection signal p5 at the rotational position P11 and the position detection signal p3 at the rotational position P15. Each of these time intervals t45 is obtained in such a way that the section number Q=4 and the position detection signals px=p5 and py=p3 are set, that the two position detection signals p5 and p3 which lie at both the ends of the addition section Aq obtained by adding up the four continuous sections q are selected, and that the time interval between the position detection signals p5 and p3 is calculated.

The time intervals t46 are respectively calculated between the position detection signal p6 at the rotational position P2 and the position detection signal p4 at the rotational position P6, between the position detection signal p6 at the rotational position P8 and the position detection signal p4 at the rotational position P12, and between the position detection signal p6 at the rotational position P14 and the position detection signal p4 at the rotational position P18. Each of these time intervals t46 is obtained in such a way that the section number Q=4 and the position detection signals px=p6 and py=p4 are set, that the two position detection signals p6 and p4 which lie at both the ends of the addition section Aq obtained by adding up the four continuous sections q are selected, and that the time interval between the position detection signals p6 and p4 is calculated.

In a case where angular errors have developed in the mounting positions of the position sensors PA, PB and PC, or in a case where errors have developed in the magnetized positions of the permanent magnets m1-m6 of the position detecting rotor 41 or the permanent magnets M1-M6 of the rotor 20 which is used also for the position detections, the timings which are generated by the position detection signals p1-p6 deviate, and hence, deviations occur also in the energization switching timings tu1, tu2, tv1, tv2, tw1 and tw2. Besides, each of the plurality of time intervals t41 is the time interval between the position detection signal p1 and the position detection signal p5, and it depends upon the angle θca between the position sensors PC and PA. Each of the plurality of time intervals t42 is the time interval between the position detection signal p2 and the position detection signal p6, and it also depends upon the angle θca between the position sensors PC and PA. Each of the plurality of time intervals t43 is the time interval between the position detection signal p3 and the position detection signal p1, and it depends upon the angle θab between the position sensors PA and PB. Each of the plurality of time intervals t44 is the time interval between the position detection signal p4 and the position detection signal p2, and it also depends upon the angle θab between the position sensors PA and PB. Each of the plurality of time intervals t45 is the time interval between the position detection signal p5 and the position detection signal p3, and it depends upon the angle θbc between the position sensors PB and PC. Each of the plurality of time intervals t46 is the time interval between the position detection signal p6 and the position detection signal p4, and it also depends upon the angle θbc between the position sensors PB and PC.

The energization-switching-timing calculation means 131 determines the pluralities of energization switching timings tu1, tw1, tv1, tu2, tw2 and tv2 on the basis of the pluralities of position detection signals p1-p6 contained in the output signals SA, SB and SC of the position detection signal generation device 40, and the pluralities of time intervals t41-t46, respectively. Concretely, the energization switching timing tu1 at the middle between the rotational positions P6 and P7 is set at a timing which lags an elapsed time $\{(t41/4)+(t46/8)\}$ from the position detection signal p5, with respect to the position detection signal p5 at the rotational position P5. The time period (t41/4) is obtained in such a way that the time interval t41 between the position detection signal p1 at the rotational position P1 and the position detection signal p5 at the rotational position P5 is multiplied by ¼. Besides, the time period (t46/8) is obtained in such a way that the time interval t46 between the position detection signal p6 at the rotational position P2 and the position detection signal p4 at the rotational position P6 is multiplied by ⅛. Each of the energization switching timings tu1 at the middle between the rotational positions P12 and P13 and at the middle between the rotational position P18 and the rotational position P1 in the next period Tn+1 is set at a timing which lags the elapsed time $\{(t41/4)+(t46/8)\}$ from the immediately preceding position detection signal p5, by similarly calculating the elapsed time with the immediately preceding time interval t41 and the immediately preceding time interval t46.

The energization switching timing tw1 at the middle between the rotational positions P7 and P8 is set at a timing which lags an elapsed time $\{(t46/4)+(t43/8)\}$ from the position detection signal p4, with respect to the position detection signal p4 at the rotational position P6. The time period (t46/4) is obtained in such a way that the time interval t46 between the position detection signal p6 at the rotational position P2 and the position detection signal p4 at the rotational position P6 is multiplied by ¼. Besides, the time period (t43/8) is obtained in such a way that the time interval t43 between the position detection signal p3 at the rotational position P3 and the position detection signal p1 at the rotational position P7 is multiplied by ⅛. Each of the energization switching timings tw1 at the middle between the rotational positions P13 and P14 and at the middle between the rotational positions P1 and P2 is set at a timing which lags the elapsed time $\{(t46/4)+(t43/8)\}$ from the immediately preceding position detection signal p4, by similarly calculating the elapsed time with the immediately preceding time interval t46 and the immediately preceding time interval t43.

The energization switching timing tv1 at the middle between the rotational positions P8 and P9 is set at a timing which lags an elapsed time $\{(t43/4)+(t42/8)\}$ from the position detection signal p1, with respect to the position detection signal p1at the rotational position P7. The time period (t43/4) is obtained in such a way that the time interval t43 between the position detection signal p3 at the rotational position P3 and the position detection signal p1 at the rotational position P7 is multiplied by ¼. Besides, the time period (t42/8) is obtained in such a way that the time interval t42 between the position detection signal p2 at the rotational position P4 and the position detection signal p6 at the rotational position P8 is multiplied by ⅛. Each of the energization switching timings tv1 at the middle between the rotational positions P14 and P15 and at the middle between the rotational positions P2 and P3 is set at a timing which lags the elapsed time $\{(t43/4)+(t42/8)\}$ from the immediately preceding position detection signal p1, by similarly calculating the elapsed time with the immediately preceding time interval t43 and the immediately preceding time interval t42.

The energization switching timing tu2 at the middle between the rotational positions P9 and P10 is set at a timing which lags an elapsed time $\{(t42/4)+(t45/8)\}$ from the position detection signal p6, with respect to the position detection signal p6 at the rotational position P8. The time period (t42/4) is obtained in such a way that the time interval t42 between the position detection signal p2 at the rotational position P4 and the position detection signal p6 at the rotational position P8 is multiplied by ¼. Besides, the time period (t45/8) is obtained in such a way that the time interval t45 between the position detection signal p5 at the rotational position P5 and the position detection signal p3 at the rotational position P9 is multiplied by ⅛. Each of the energization switching timings tu2 at the middle between the rotational positions P15 and P16 and at the middle between the rotational positions P3 and P4 is set at a timing which lags the elapsed time $\{(t42/4)+(t45/8)\}$ from the immediately preceding position detection signal p6, by similarly calculating the elapsed time with the immediately preceding time interval t42 and the immediately preceding time interval t45.

The energization switching timing tw2 at the middle between the rotational positions P10 and P11 is set at a timing which lags an elapsed time $\{(t45/4)+(t44/8)\}$ from the position detection signal p3, with respect to the position detection signal p3 at the rotational position P9. The time period (t45/4) is obtained in such a way that the time interval t45 between the position detection signal p5 at the rotational position P5 and the position detection signal p3 at the rotational position P9 is multiplied by ¼. Besides, the time period (t44/8) is obtained in such a way that the time interval t44 between the position detection signal p4 at the rotational position P6 and the position detection signal p2 at the rotational position P10 is multiplied by ⅛. Each of the energization switching timings tw2 at the middle between the rotational positions P16 and P17 and at the middle between the rotational positions P4 and P5 is set at a timing which lags the elapsed time $\{(t45/4)+(t44/$ 8)} from the immediately preceding position detection signal p3, by similarly calculating the elapsed time with the immediately preceding time interval t45 and the immediately preceding time interval t44.

The energization switching timing tv2 at the middle between the rotational positions P11 and P12 is set at a timing which lags an elapsed time {(t44/4)+(t41/8)} from the position detection signal p2, with respect to the position detection signal p2 at the rotational position P10. The time period (t44/4) is obtained in such a way that the time interval t44 between the position detection signal p4 at the rotational position P6 and the position detection signal p2 at the rotational position P10 is multiplied by ¼. Besides, the time period (t41/8) is obtained in such a way that the time interval t41 between the position detection signal p1 at the rotational position P7 and the position detection signal p5 at the rotational position P11 is multiplied by ⅛. Each of the energization switching timings tv2 at the middle between the rotational positions P17 and P18 and at the middle between the rotational positions P5 and P6 is set at a timing which lags the elapsed time {(t44/4)+(t41/8)} from the immediately preceding position detection signal p2, by similarly calculating the elapsed time with the immediately preceding time interval t44 and the immediately preceding time interval t41.

In Embodiment 3, each of the pluralities of time intervals t41-t46 is set as the time interval between the two position detection signals px and py which lie at both the ends of the addition section Aq obtained by adding up the four continuous sections q, and the pluralities of energization switching timings tu2, tw2, tv2, tu1, tw1 and tv1 are respectively determined on the basis of the pluralities of time intervals t41-t46 and the pluralities of position detection signals p1-p6. Each of the pluralities of time intervals t41-t46 has a time interval which is substantially quadruple the time interval t0. The pluralities of energization switching timings are determined using the values obtained in such a way that the time intervals t41-t46 with the time interval t0 substantially quadrupled are respectively multiplied by ¼ and ⅛. Thus, even in the case where the errors have developed in the mounting positions of the position sensors PA, PB and PC, they are averaged, and hence, their influence is lessened. Besides, regarding the errors of the magnetized positions incurred by the arrangement errors of the permanent magnets m1-m6 of the position detecting rotor 41, the influence thereof can be similarly lessened. Also in the apparatus in which the rotor 20 serves instead of the position detecting rotor 41, the influence of the errors of the magnetized positions incurred by the arrangement errors of the permanent magnets M1-M6 can be similarly lessened.

In Embodiment 3, the section number Q is 4, and it is an even number in the same manner as in Embodiment 1. Since the section number Q is the even number, the two position detection signals px and py which determine each of the pluralities of time intervals t41, t43 and t45 are selected from among the position detection signals p1, p3 and p5. All of the position detection signals p1, p3 and p5 are generated when the edges affording the changes of a magnetic flux density in the same polarities, namely, the edges ea, ec and ee changing from the S-poles to the N-poles have opposed to the position sensors PA, PB and PC with the rotation of the rotor 20, so that the time intervals t41, t43 and t45 can be calculated more precisely. Besides, the two position detection signals px and py which determine each of the pluralities of time intervals t42, t44 and t46 are selected from among the position detection signals p2, p4 and p6. All of the position detection signals p2, p4 and p6 are generated when the edges affording the changes of the magnetic flux density in the same polarities, namely, the edges eb, ed and ef changing from the N-poles to the S-poles have opposed to the position sensors PA, PB and PC with the rotation of the rotor 20, so that also the time intervals t42, t44 and t46 can be calculated more precisely.

Embodiment 4

In Embodiment 4 here, the time-interval-calculation-mode setting means 135 gives the time interval calculation means 133 a time interval calculation mode command TQ of section number Q=5 on the basis of the external command TO, and the time interval calculation means 133 calculates each of time intervals t51-t56, between two position detection signals px and py lying at both the ends of five continuous sections q. The other configuration of Embodiment 4 is the same as in Embodiment 1.

Figure 11:
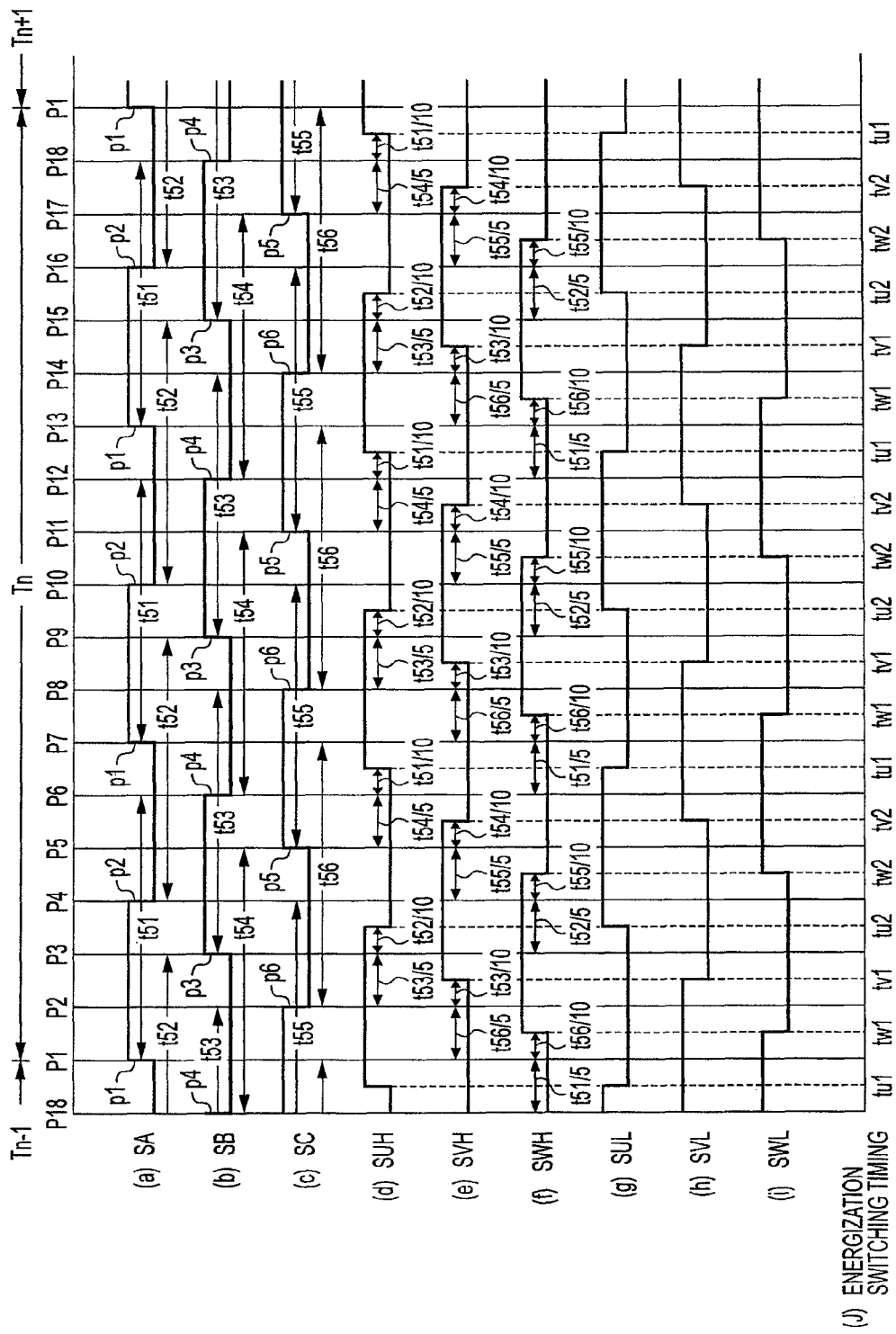
FIG. 11 is a timing chart for explaining the operation of Embodiment 4 of the control device for the three-phase brushless motor according to this invention.

FIG. 11 is a timing chart for explaining the operation of Embodiment 4. Rotational positions P1-P18 on the axis of abscissas in FIG. 11 are the same as in FIG. 5, and respective waveforms shown at (a)-(j) in FIG. 11 are also the same as in FIG. 5. The time interval calculation means 133 successively calculates the time intervals t51-t56 appended at (a), (b) and (c) in FIG. 11. These time intervals t51-t56 will be concretely described.

First, the time intervals t51 are respectively calculated between the position detection signal p1 at the rotational position P1 and the position detection signal p4 at the rotational position P6, between the position detection signal p1 at the rotational position P7 and the position detection signal p4 at the rotational position P12, and between the position detection signal p1 at the rotational position P13 and the position detection signal p4 at the rotational position P18. Each of these time intervals t51 is obtained in such a way that the section number Q=5 and the position detection signals px=p1 and py=p4 are set, that the two position detection signals p1 and p4 which lie at both the ends of an addition section Aq obtained by adding up the five continuous sections q are selected, and that the time interval between the position detection signals p1 and p4 is calculated.

The time intervals t52 are respectively calculated between the position detection signal p2 at the rotational position P4 and the position detection signal p3 at the rotational position P9, between the position detection signal p2 at the rotational position P10 and the position detection signal p3 at the rotational position P15, between the last position detection signal p2 in the previous period Tn−1 and the position detection signal p3 at the rotational position P3, and between the position detection signal p2 at the rotational position P16 and the first position detection signal p3 in the next period Tn+1. Each of these time intervals t52 is obtained in such a way that the section number Q=5 and the position detection signals px=p2 and py=p3 are set, that the two position detection signals p2 and p3 which lie at both the ends of the addition section Aq obtained by adding up the five continuous sections q are selected, and that the time interval between the position detection signals p2 and p3 is calculated.

The time intervals t53 are respectively calculated between the position detection signal p3 at the rotational position P3 and the position detection signal p6 at the rotational position P8, between the position detection signal p3 at the rotational position P9 and the position detection signal p6 at the rotational position P14, between the last position detection signal p3 in the previous period Tn−1 and the position detection signal p6 at the rotational position P2, and between the position detection signal p3 at the rotational position P15 and the first position detection signal p6 in the next period Tn+1. Each of these time intervals t53 is obtained in such a way that the section number Q=5 and the position detection signals px=p3 and py=p6 are set, that the two position detection signals p3 and p6 which lie at both the ends of the addition section Aq obtained by adding up the five continuous sections q are selected, and that the time interval between the position detection signals p3 and p6 is calculated.

The time intervals t54 are respectively calculated between the position detection signal p4 at the rotational position P6 and the position detection signal p5 at the rotational position P11, between the position detection signal p4 at the rotational position P12 and the position detection signal p5 at the rotational position P17, and between the position detection signal p4 at the rotational position P18 in the previous period Tn−1 and the position detection signal p5 at the rotational position P5. Each of these time intervals t54 is obtained in such a way that the section number Q=5 and the position detection signals px=p4 and py=p5 are set, that the two position detection signals p4 and p5 which lie at both the ends of the addition section Aq obtained by adding up the five continuous sections q are selected, and that the time interval between the position detection signals p4 and p5 is calculated.

The time intervals t55 are respectively calculated between the position detection signal p5 at the rotational position P5 and the position detection signal p2 at the rotational position P10, between the position detection signal p5 at the rotational position P11 and the position detection signal p2 at the rotational position P16, between the last position detection signal p5 in the previous period Tn−1 and the position detection signal p2 at the rotational position P4, and between the position detection signal p5 at the rotational position P17 and the first position detection signal p2 in the next period Tn+1. Each of these time intervals t55 is obtained in such a way that the section number Q=5 and the position detection signals px=p5 and py=p2 are set, that the two position detection signals p5 and p2 which lie at both the ends of the addition section Aq obtained by adding up the five continuous sections q are selected, and that the time interval between the position detection signals p5 and p2 is calculated.

The time intervals t56 are respectively calculated between the position detection signal p6 at the rotational position P2 and the position detection signal p1 at the rotational position P7, between the position detection signal p6 at the rotational position P8 and the position detection signal p1 at the rotational position P13, between the last position detection signal p6 in the previous period Tn−1 and the position detection signal p1 at the rotational position P1, and between the position detection signal p6 at the rotational position P14 and the position detection signal p1 at the rotational position P1 in the next period Tn+1. Each of these time intervals t56 is obtained in such a way that the section number Q=5 and the position detection signals px=p6 and py=p1 are set, that the two position detection signals p6 and p1 which lie at both the ends of the addition section Aq obtained by adding up the five continuous sections q are selected, and that the time interval between the position detection signals p6 and p1 is calculated.

In a case where angular errors have developed in the mounting positions of the position sensors PA, PB and PC, or in a case where errors have developed in the magnetized positions of the permanent magnets m1-m6 of the position detecting rotor 41 or the permanent magnets M1-M6 of the rotor 20 which is used also for the position detections, the timings which are generated by the pluralities of position detection signals p1-p6 deviate, and hence, deviations occur also in the pluralities of energization switching timings tu1, tu2, tv1, tv2, tw1 and tw2. Besides, each of the plurality of time intervals t51 is the time interval between the position detection signal p1 and the position detection signal p4, and it depends upon the angle θab between the position sensors PA and PB. Each of the plurality of time intervals t52 is the time interval between the position detection signal p2 and the position detection signal p3, and it also depends upon the angle θab between the position sensors PA and PB. Each of the plurality of time intervals t53 is the time interval between the position detection signal p3 and the position detection signal p6, and it depends upon the angle θbc between the position sensors PB and PC. Each of the plurality of time intervals t54 is the time interval between the position detection signal p4 and the position detection signal p5, and it also depends upon the angle θbc between the position sensors PB and PC. Each of the plurality of time intervals t55 is the time interval between the position detection signal p5 and the position detection signal p2, and it depends upon the angle θca between the position sensors PC and PA. Each of the plurality of time intervals t56 is the time interval between the position detection signal p6 and the position detection signal p1, and it also depends upon the angle θca between the position sensors PC and PA.

The energization-switching-timing calculation means 131 determines the energization switching timings tw1, tv1, tu2, tw2, tv2 and tu1 on the basis of the pluralities of position detection signals p1-p6 contained in the output signals SA, SB and SC of the position detection signal generation device 40, and the pluralities of time intervals t51-t56, respectively. Concretely, the energization switching timing tw1 at the middle between the rotational positions P7 and P8 is set at a timing which lags an elapsed time $\{(t51/5)+(t56/10)\}$ from the position detection signal p4, with respect to the position detection signal p4 at the rotational position P6. The time period (t51/5) is obtained in such a way that the time interval t51 between the position detection signal p1 at the rotational position P1 and the position detection signal p4 at the rotational position P6 is multiplied by ⅕. Besides, the time period (t56/10) is obtained in such a way that the time interval t56 between the position detection signal p6 at the rotational position P2 and the position detection signal p1 at the rotational position P7 is multiplied by ⅒. Each of the energization switching timings tw1 at the middle between the rotational positions P13 and P14 and at the middle between the rotational positions P1 and P2 is set at a timing which lags the elapsed time $\{(t51/5)+(t56/10)\}$ from the immediately preceding position detection signal p4, by similarly calculating the elapsed time with the immediately preceding time interval t51 and the immediately preceding time interval t56.

The energization switching timing tv1 at the middle between the rotational positions P8 and P9 is set at a timing which lags an elapsed time $\{(t56/5)+(t53/10)\}$ from the position detection signal p1, with respect to the position detection signal p1 at the rotational position P7. The time period (t56/5) is obtained in such a way that the time interval t56 between the position detection signal p6 at the rotational position P2 and the position detection signal p1 at the rotational position P7 is multiplied by ⅕. Besides, the time period (t53/10) is obtained in such a way that the time interval t53 between the position detection signal p3 at the rotational position P3 and the position detection signal p6 at the rotational position P8 is multiplied by ⅒. Each of the energization switching timings tv1 at the middle between the rotational positions P14 and P15 and at the middle between the rotational positions P2 and P3 is set at a timing which lags the elapsed time $\{(t56/5)+(t53/10)\}$ from the immediately preceding position detection signal p1, by similarly calculating the elapsed time with the immediately preceding time interval t56 and the immediately preceding time interval t53.

The energization switching timing tu2 at the middle between the rotational positions P9 and P10 is set at a timing which lags an elapsed time {(t53/5)+(t52/10)} from the position detection signal p6, with respect to the position detection signal p6 at the rotational position P8. The time period (t53/5) is obtained in such a way that the time interval t53 between the position detection signal p3 at the rotational position P3 and the position detection signal p6 at the rotational position P8 is multiplied by 1/5. Besides, the time period (t52/10) is obtained in such a way that the time interval t52 between the position detection signal p2 at the rotational position P4 and the position detection signal p3 at the rotational position P9 is multiplied by 1/10. Each of the energization switching timings tu2 at the middle between the rotational positions P15 and P16 and at the middle between the rotational positions P3 and P4 is set at a timing which lags the elapsed time {(t53/5)+(t52/10)} from the immediately preceding position detection signal p6, by similarly calculating the elapsed time with the immediately preceding time interval t53 and the immediately preceding time interval t52.

The energization switching timing tw2 at the middle between the rotational positions P10 and P11 is set at a timing which lags an elapsed time {(t52/5)+(t55/10)} from the position detection signal p3, with respect to the position detection signal p3 at the rotational position P9. The time period (t52/5) is obtained in such a way that the time interval t52 between the position detection signal p2 at the rotational position P4 and the position detection signal p3 at the rotational position P9 is multiplied by 1/5. Besides, the time period (t55/10) is obtained in such a way that the time interval t55 between the position detection signal p5 at the rotational position P5 and the position detection signal p2 at the rotational position P10 is multiplied by 1/10. Each of the energization switching timings tw2 at the middle between the rotational positions P16 and P17 and at the middle between the rotational positions P4 and P5 is set at a timing which lags the elapsed time {(t52/5)+(t55/10)} from the immediately preceding position detection signal p3, by similarly calculating the elapsed time with the immediately preceding time interval t52 and the immediately preceding time interval t55.

The energization switching timing tv2 at the middle between the rotational positions P11 and P12 is set at a timing which lags an elapsed time {(t55/5)+(t54/10)} from the position detection signal p2, with respect to the position detection signal p2 at the rotational position P10. The time period (t55/5) is obtained in such a way that the time interval t55 between the position detection signal p5 at the rotational position P5 and the position detection signal p2 at the rotational position P10 is multiplied by 1/5. Besides, the time period (t54/10) is obtained in such a way that the time interval t54 between the position detection signal p4 at the rotational position P6 and the position detection signal p5 at the rotational position P11 is multiplied by 1/10. Each of the energization switching timings tv2 at the middle between the rotational positions P17 and P18 and at the middle between the rotational positions P5 and P6 is set at a timing which lags the elapsed time {(t55/5)+(t54/10)} from the immediately preceding position detection signal p2, by similarly calculating the elapsed time with the immediately preceding time interval t55 and the immediately preceding time interval t54.

The energization switching timing tu1 at the middle between the rotational positions P12 and P13 is set at a timing which lags an elapsed time {(t54/5)+(t51/10)} from the position detection signal p5, with respect to the position detection signal p5 at the rotational position P11. The time period (t54/5) is obtained in such a way that the time interval t54 between the position detection signal p4 at the rotational position P6 and the position detection signal p5 at the rotational position P11 is multiplied by 1/5. Besides, the time period (t51/10) is obtained in such a way that the time interval t51 between the position detection signal p1 at the rotational position P7 and the position detection signal p4 at the rotational position P12 is multiplied by 1/10. Each of the energization switching timings tu1 at the middle between the rotational position P17 and the rotational position P1 in the next period Tn+1 and at the middle between the rotational positions P6 and P7 is set at a timing which lags the elapsed time {(t54/5)+(t51/10)} from the immediately preceding position detection signal p5, by similarly calculating the elapsed time with the immediately preceding time interval t54 and the immediately preceding time interval t51.

In Embodiment 4, each of the pluralities of time intervals t51-t56 is set as the time interval between the two position detection signals px and py which lie at both the ends of the addition section Aq obtained by adding up the five continuous sections q, and the pluralities of energization switching timings tw1, tv1, tu2, tw2, tv2 and tu1 are respectively determined on the basis of the pluralities of time intervals t51-t56 and the pluralities of position detection signals p1-p6. Each of the pluralities of time intervals t51-t56 has a time interval which is substantially quintuple the time interval t0. The pluralities of energization switching timings are determined using the values obtained in such a way that the time intervals t51-t56 with the time interval t0 substantially quintupled are respectively multiplied by 1/5 and 1/10. Thus, even in the case where the errors have developed in the mounting positions of the position sensors PA, PB and PC, they are averaged, and hence, their influence is lessened. Besides, regarding the errors of the magnetized positions incurred by the arrangement errors of the permanent magnets m1-m6 of the position detecting rotor 41, the influence thereof can be similarly lessened. Also in the apparatus in which the rotor 20 serves instead of the position detecting rotor 41, the influence of the errors of the magnetized positions incurred by the arrangement errors of the permanent magnets M1-M6 can be similarly lessened.

Embodiment 5

In Embodiment 5 here, the time-interval-calculation-mode setting means 135 gives the time interval calculation means 133 a time interval calculation mode command TQ of section number Q=6 on the basis of the external command TO, and the time interval calculation means 133 calculates each of time intervals t61-t66, between two position detection signals px and py lying at both the ends of six continuous sections q. The other configuration of Embodiment 5 is the same as in Embodiment 1.

Figure 12:
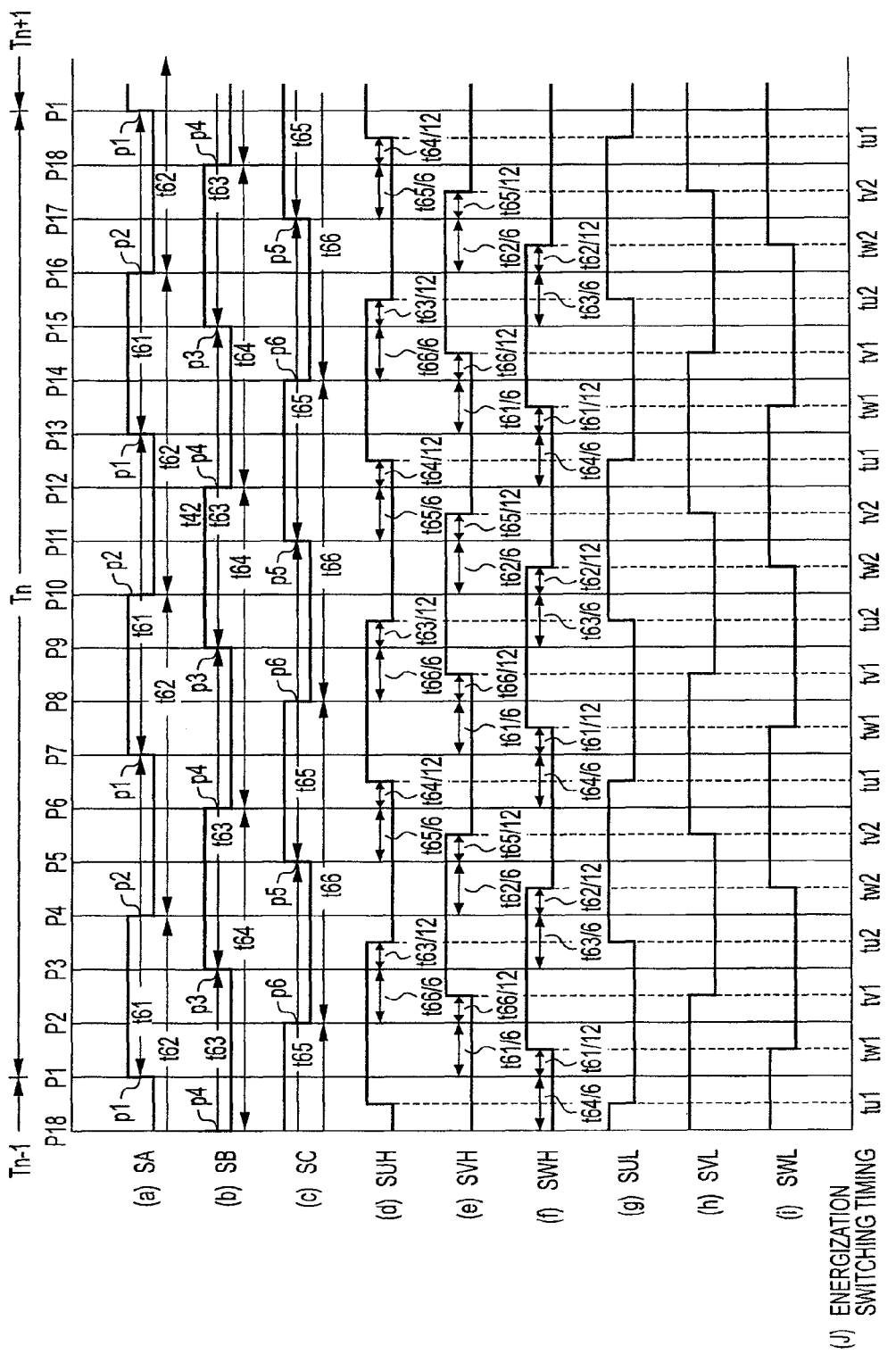
FIG. 12 is a timing chart for explaining the operation of Embodiment 5 of the control device for the three-phase brushless motor according to this invention.

FIG. 12 is a timing chart for explaining the operation of Embodiment 5. Rotational positions P1-P18 on the axis of abscissas in FIG. 12 are the same as in FIG. 5, and respective signal waveforms shown at (a)-(j) in FIG. 12 are also the same as in FIG. 5. In Embodiment 5, the time interval calculation means 133 successively calculates the pluralities of time intervals t61-t66 appended at (a), (b) and (c) in FIG. 12. These time intervals t61-t66 will be concretely described.

First, the time intervals t61 are respectively calculated between the position detection signal p1 at the rotational position P1 and the position detection signal p1 at the rotational position P7, between the position detection signal p1 at the rotational position P7 and the position detection signal p1 at the rotational position P13, and between the position detection signal p1 at the rotational position P13 and the position detection signal p1 at the rotational position P1 in the next period Tn+1. Each of these time intervals t61 is obtained in such a way that the section number Q=6 and the position detection signals px=p1 and py=p1 are set, that the two position detection signals p1 and p1 which lie at both the ends of an addition section Aq obtained by adding up the six continuous sections q are selected, and that the time interval between the position detection signals p1 and p1 is calculated.

The time intervals t62 are respectively calculated between the position detection signal p2 at the rotational position P4 and the position detection signal p2 at the rotational position P10, between the position detection signal p2 at the rotational position P10 and the position detection signal p2 at the rotational position P16, between the last position detection signal p2 in the previous period Tn−1 and the position detection signal p1 at the rotational position P4, and between the position detection signal p2 at the rotational position P16 and the first position detection signal p2 in the next period Tn+1. Each of these time intervals t62 is obtained in such a way that the section number Q=6 and the position detection signals px=p2 and py=p2 are set, that the two position detection signals p2 and p2 which lie at both the ends of the addition section Aq obtained by adding up the six continuous sections q are selected, and that the time interval between the position detection signals p2 and p2 is calculated.

The time intervals t63 are respectively calculated between the position detection signal p3 at the rotational position P3 and the position detection signal p3 at the rotational position P9, between the position detection signal p3 at the rotational position P9 and the position detection signal p3 at the rotational position P15, between the last position detection signal p3 in the previous period Tn−1 and the position detection signal p3 at the rotational position P3, and between the position detection signal p3 at the rotational position P15 and the first position detection signal p3 in the next period Tn+1. Each of these time intervals t63 is obtained in such a way that the section number Q=6 and the position detection signals px=p3 and py=p3 are set, that the two position detection signals p3 and p3 which lie at both the ends of the addition section Aq obtained by adding up the six continuous sections q are selected, and that the time interval between the position detection signals p3 and p3 is calculated.

The time intervals t64 are respectively calculated between the position detection signal p4 at the rotational position P18 in the previous period Tn−1 and the position detection signal p4 at the rotational position P6, between the position detection signal p4 at the rotational position P6 and the position detection signal p4 at the rotational position P12, and between the position detection signal p4 at the rotational position P12 and the position detection signal p4 at the rotational position P18. Each of these time intervals t64 is obtained in such a way that the section number Q=6 and the position detection signals px=p4 and py=p4 are set, that the two position detection signals p4 and p4 which lie at both the ends of the addition section Aq obtained by adding up the six continuous sections q are selected, and that the time interval between the position detection signals p4 and p4 is calculated.

The time intervals t65 are respectively calculated between the position detection signal p5 at the rotational position P5 and the position detection signal p5 at the rotational position P11, between the position detection signal p5 at the rotational position P11 and the position detection signal p5 at the rotational position P17, and between the last position detection signal p5 in the previous period Tn−1 and the position detection signal p5 at the rotational position P5. Each of these time intervals t65 is obtained in such a way that the section number Q=6 and the position detection signals px=p5 and py=p5 are set, that the two position detection signals p5 and p5 which lie at both the ends of the addition section Aq obtained by adding up the six continuous sections q are selected, and that the time interval between the position detection signals p5 and p5 is calculated.

The time intervals t66 are respectively calculated between the position detection signal p6 at the rotational position P2 and the position detection signal p6 at the rotational position P8, between the position detection signal p6 at the rotational position P8 and the position detection signal p6 at the rotational position P14, between the last position detection signal p6 in the previous period Tn−1 and the position detection signal p6 at the rotational position P2, and between the position detection signal p6 at the rotational position P14 and the first position detection signal p6 in the next period Tn+1. Each of these time intervals t66 is obtained in such a way that the section number Q=6 and the position detection signals px=p6 and py=p6 are set, that the two position detection signals p6 and p6 which lie at both the ends of the addition section Aq obtained by adding up the six continuous sections q are selected, and that the time-interval between the position detection signals p6 and p6 is calculated.

In a case where angular errors have developed in the mounting positions of the position sensors PA, PB and PC, or in a case where errors have developed in the magnetized positions of the permanent magnets m1-m6 of the position detecting rotor 41 or the permanent magnets M1-M6 of the rotor 20 which is used also for the position detections, the timings which are generated by the pluralities of position detection signals p1-p6 deviate, and hence, deviations occur also in the pluralities of energization switching timings tu1, tu2, tv1, tv2, tw1 and tw2. In Embodiment 5, however, the pluralities of time intervals t61 and t62 are respectively the time intervals between the position detection signals p1 and between the position detection signals p2, and even when the error has developed in the mounting position of the position sensor PA and when the errors of the magnetized positions have developed in the permanent magnets m1-m6 and M1-M6, these time intervals t61 and t62 are not influenced by the errors. The pluralities of time intervals t63 and t64 are respectively the time intervals between the position detection signals p3 and between the position detection signals p4, and the pluralities of time intervals t65 and t66 are respectively the time intervals between the position detection signals p5 and between the position detection signals p6, and even when the errors have developed in the mounting positions of the position sensors PB and PC and when the errors of the magnetized positions have developed in the permanent magnets m1-m6 and M1-M6, these time intervals t63, t64, t65 and t66 are not influenced by the errors.

The energization-switching-timing calculation means 131 determines the pluralities of energization switching timings tv1, tu2, tw2, tv2, tu1 and tw1 on the basis of the pluralities of position detection signals p1-p6 contained in the output signals SA, SB and SC of the position detection signal generation device 40, and the pluralities of time intervals t61-t66, respectively. Concretely, the energization switching timing tv1 at the middle between the rotational positions P8 and P9 is set at a timing which lags an elapsed time {(t61/6)+(t66/12)} from the position detection signal p1, with respect to the position detection signal p1 at the rotational position P7. The time period (t61/6) is obtained in such a way that the time interval t61 between the position detection signal p1 at the rotational position P1 and the position detection signal p1 at the rotational position P7 is multiplied by ⅙. Besides, the time period (t66/12) is obtained in such a way that the time interval t66 between the position detection signal p6 at the rotational position P2 and the position detection signal p6 at the rotational position P8 is multiplied by 1/12. Each of the energization switching timings tv1 at the middle between the rotational positions P14 and P15 and at the middle between the rotational positions P2 and P3 is set at a timing which lags the elapsed time {(t61/6)+(t66/12)} from the immediately preceding position detection signal p1, by similarly calculating the elapsed time with the immediately preceding time interval t61 and the immediately preceding time interval t66.

The energization switching timing tu2 at the middle between the rotational positions P9 and P10 is set at a timing which lags an elapsed time {(t66/6)+(t63/12)} from the position detection signal p6, with respect to the position detection signal p6 at the rotational position P8. The time period (t66/6) is obtained in such a way that the time interval t66 between the position detection signal p6 at the rotational position P2 and the position detection signal p6 at the rotational position P8 is multiplied by 1/6. Besides, the time period (t63/12) is obtained in such a way that the time interval t63 between the position detection signal p3 at the rotational position P3 and the position detection signal p3 at the rotational position P9 is multiplied by 1/12. Each of the energization switching timings tu2 at the middle between the rotational positions P15 and P16 and at the middle between the rotational positions P3 and P4 is set at a timing which lags the elapsed time {(t66/6)+(t63/12)} from the immediately preceding position detection signal p6, by similarly calculating the elapsed time with the immediately preceding time interval t66 and the immediately preceding time interval t63.

The energization switching timing tw2 at the middle between the rotational positions P10 and P11 is set at a timing which lags an elapsed time {(t63/6)+(t62/12)} from the position detection signal p3, with respect to the position detection signal p3 at the rotational position P9. The time period (t63/6) is obtained in such a way that the time interval t63 between the position detection signal p3 at the rotational position P3 and the position detection signal p3 at the rotational position P9 is multiplied by 1/6. Besides, the time period (t62/12) is obtained in such a way that the time interval t62 between the position detection signal p2 at the rotational position P4 and the position detection signal p2 at the rotational position P10 is multiplied by 1/12. Each of the energization switching timings tw2 at the middle between the rotational positions P16 and P17 and at the middle between the rotational positions P4 and P5 is set at a timing which lags the elapsed time {(t63/6)+(t62/12)} from the immediately preceding position detection signal p3, by similarly calculating the elapsed time with the immediately preceding time interval t63 and the immediately preceding time interval t62.

The energization switching timing tv2 at the middle between the rotational positions P11 and P12 is set at a timing which lags an elapsed time {(t62/6)+(t65/12)} from the position detection signal p2, with respect to the position detection signal p2 at the rotational position P10. The time period (t62/6) is obtained in such a way that the time interval t62 between the position detection signal p2 at the rotational position P4 and the position detection signal p2 at the rotational position P10 is multiplied by 1/6. Besides, the time period (t65/12) is obtained in such a way that the time interval t65 between the position detection signal p5 at the rotational position P5 and the position detection signal p5 at the rotational position P11 is multiplied by 1/12. Each of the energization switching timings tv2 at the middle between the rotational positions P17 and P18 and at the middle between the rotational positions P5 and P6 is set at a timing which lags the elapsed time {(t62/6)+(t65/12)} from the immediately preceding position detection signal p2, by similarly calculating the elapsed time with the immediately preceding time interval t62 and the immediately preceding time interval t65.

The energization switching timing tu1 at the middle between the rotational positions P12 and P13 is set at a timing which lags an elapsed time {(t65/6)+(t64/12)} from the position detection signal p5, with respect to the position detection signal p5 at the rotational position P11. The time period (t65/6) is obtained in such a way that the time interval t65 between the position detection signal p5 at the rotational position P5 and the position detection signal p5 at the rotational position P11 is multiplied by 1/6. Besides, the time period (t64/12) is obtained in such a way that the time interval t64 between the position detection signal p4 at the rotational position P6 and the position detection signal p4 at the rotational position P12 is multiplied by 1/12. Each of the energization switching timings tu1 at the middle between the rotational position P18 and the rotational position P1 in the next period Tn+1 and at the middle between the rotational positions P6 and P7 is set at a timing which lags the elapsed time {(t65/6)+(t64/12)} from the immediately preceding position detection signal p5, by similarly calculating the elapsed time with the immediately preceding time interval t65 and the immediately preceding time interval t64.

The energization switching timing tw1 at the middle between the rotational positions P13 and P14 is set at a timing which lags an elapsed time {(t64/6)+(t61/12)} from the position detection signal p4, with respect to the position detection signal p4 at the rotational position P12. The time period (t64/6) is obtained in such a way that the time interval t64 between the position detection signal p4 at the rotational position P6 and the position detection signal p4 at the rotational position P12 is multiplied by 1/6. Besides, the time period (t61/12) is obtained in such a way that the time interval t61 between the position detection signal p1 at the rotational position P7 and the position detection signal p1 at the rotational position P13 is multiplied by 1/12. Each of the energization switching timings tw1 at the middle between the rotational positions P1 and P2 and at the middle between the rotational positions P7 and P8 is set at a timing which lags the elapsed time {(t64/6)+(t61/12)} from the immediately preceding position detection signal p4, by similarly calculating the elapsed time with the immediately preceding time interval t64 and the immediately preceding time interval t61.

In Embodiment 5, the two position detection signals px and py which lie at both the ends of the addition period Aq obtained by adding up the six continuous sections q are selected, each of the pluralities of time intervals t61-t66 is calculated between the signals px and py, and the pluralities of energization switching timings are determined on the basis of the pluralities of time intervals t61-t66 and the pluralities of position detection signals p1-p6. Since the pluralities of time intervals t61-t66 are not influenced by the angular errors of the mounting positions of the position sensors PA, PB and PC, the pluralities of energization switching timings fluctuate depending upon only the angular errors of the mounting positions of the position sensors PA, PB and PC and the errors of the magnetized positions of the permanent magnets m1-m6 or the permanent magnets M1-M6, and the fluctuations of the energization switching timings can be suppressed to smaller magnitudes.

In Embodiment 5, the section number Q is 6, and it is an even number in the same manner as in Embodiment 1. Since the section number Q is the even number, the two position detection signals px and py which determine each of the pluralities of time intervals t61, t63 and t65 are selected from among the position detection signals p1, p3 and p5. All of the pluralities of position detection signals p1, p3 and p5 are generated when the edges affording the changes of a magnetic flux density in the same polarities, namely, the edges ea, ec and ee changing from the S-poles to the N-poles have opposed to the position sensors PA, PB and PC with the rotation of the rotor 20, so that the time intervals t61, t63 and t65 can be calculated more precisely. Besides, the two position detection signals px and py which determine each of the pluralities of time intervals t62, t64 and t66 are selected from among the position detection signals p2, p4 and p6. All of the pluralities of position detection signals p2, p4 and p6 are generated when the edges affording the changes of the magnetic flux density in the same polarities, namely, the edges eb, ed and ef changing from the N-poles to the S-poles have opposed to the position sensors PA, PB and PC with the rotation of the rotor 20, so that also the time intervals t62, t64 and t66 can be calculated more precisely.

Each of Embodiments 1 to 5 is the control apparatus for the three-phase brushless motor 10 of the 6 poles and 9 slots, and regarding one revolution of the rotor 20, the energization switching timings tu1, tu2, tv1, tv2, tw1 and tw2 totaling 18 times are determined, so as to switch the energizations for the switch elements UH, UL, VH, VL, WH and WL. In the apparatus which switches the energizations 18 times in total, per revolution, the number Q of the continuous sections contained in the addition section Aq has been set at Q=2 to 6 in Embodiments 1 to 5. In case of further enlarging the section number Q, it is unreal to enlarge the section number Q in excess of the number of energization switching times per revolution, and it is effective to enlarge the section number Q within a range up to Q=18 equal to the number 18 of the energization switching times per revolution.

Embodiment 6

In Embodiment 6 here, the time-interval-calculation-mode setting means 135 gives the time interval calculation means 133 a time interval calculation mode command TQ of section number Q=17 on the basis of the external command TO, and the time interval calculation means 133 calculates each of time intervals t171-t176, between two position detection signals px and py lying at both the ends of seventeen continuous sections q. The other configuration of Embodiment 6 is the same as in Embodiment 1.

Figure 13:
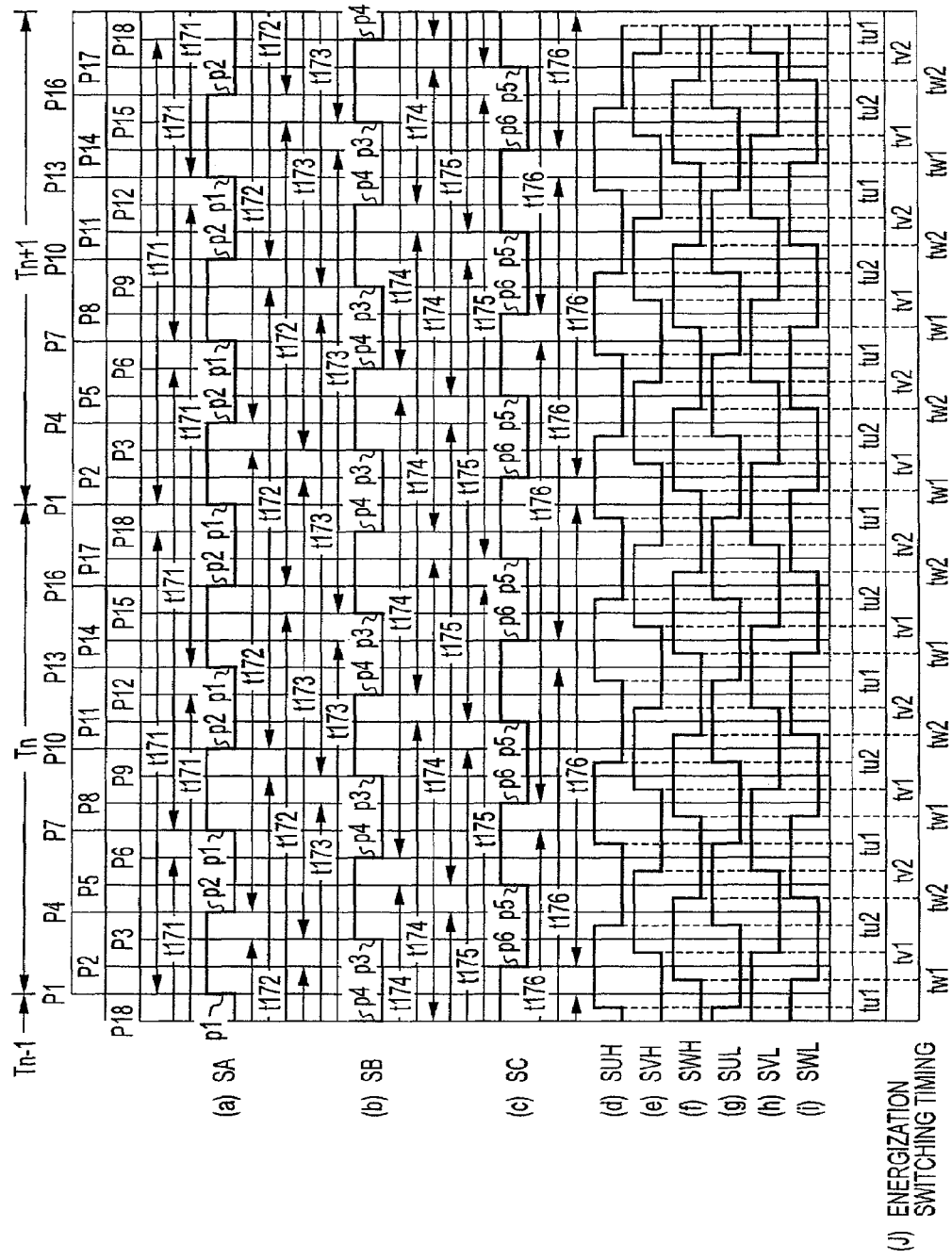
FIG. 13 is a timing chart for explaining the operation of Embodiment 6 of the control device for the three-phase brushless motor according to this invention.

FIG. 13 is a timing chart for explaining the operation of Embodiment 6. Rotational positions P1-P18 on the axis of abscissas in FIG. 13 are basically the same as the axis of abscissas in FIG. 5, but in relation to the section number Q=17, the rotational positions P1-P18 are indicated for each of the period Tn corresponding to one revolution of the rotor 20 and the next period Tn+1 continuous to the period Tn. Besides, waveforms shown at (a)-(j) in FIG. 13 are also basically the same as in FIG. 5, but the respective signal waveforms are shown over the respective periods Tn and Tn+1. The time interval calculation means 133 successively calculates the pluralities of time intervals t171-t176 appended at (a), (b) and (c) in FIG. 13. These time intervals t171-t176 will be concretely described.

First, the time intervals t171 are respectively calculated between the position detection signal p1 at the rotational position P1 in the period Tn and the position detection signal p4 at the rotational position P18 in the period Tn, between the position detection signal p1 at the rotational position P7 in the period Tn and the position detection signal p4 at the rotational position P6 in the period Tn+1, and between the position detection signal p1 at the rotational position P13 in the period Tn and the position detection signal p4 at the rotational position P12 in the period Tn+1. The time intervals t171 are respectively calculated also between the position detection signal p1 at the rotational position P1 in the period Tn+1 and the position detection signal p4 at the rotational position P18 in the period Tn+1, between the position detection signal p1 at the rotational position P7 in the previous period Tn−1 and the position detection signal p4 at the rotational position P6 in the period Tn, and between the last position detection signal p1 in the previous period Tn−1 and the position detection signal p4 at the rotational position P12 in the period Tn. Each of these time intervals t171 is obtained in such a way that the section number Q=17 and the position detection signals px=p1 and py=p4 are set, that the two position detection signals p1 and p4 which lie at both the ends of an addition section Aq obtained by adding up the seventeen continuous sections q are selected, and that the time interval between the position detection signals p1 and p4 is calculated.

The time intervals t172 are respectively calculated between the position detection signal p2 at the rotational position P4 in the period Tn and the position detection signal p3 at the rotational position P3 in the next period Tn+1, between the position detection signal p2 at the rotational position P10 in the period Tn and the position detection signal p3 at the rotational position P9 in the period Tn+1, and between the position detection signal p2 at the rotational position P16 in the period Tn and the position detection signal p3 at the rotational position P15 in the next period Tn+1. The time intervals t172 are respectively calculated also between the position detection signal p2 at the rotational position P4 in the period Tn+1 and the position detection signal p3 at the rotational position P3 in the next period Tn+2, between the position detection signal p2 at the rotational position P10 in the previous period Tn−1 and the position detection signal p3 at the rotational position P9 in the period Tn, and between the last position detection signal p1 at the rotational position P16 in the previous period Tn−1 and the position detection signal p3 at the rotational position P15 in the period Tn. Each of these time intervals t172 is obtained in such a way that the section number Q=17 and the position detection signals px=p2 and py=p3 are set, that the two position detection signals p2 and p3 which lie at both the ends of the addition section Aq obtained by adding up the seventeen continuous sections q are selected, and that the time interval between the position detection signals p2 and p3 is calculated.

The time intervals t173 are respectively calculated between the position detection signal p3 at the rotational position P3 in the period Tn and the position detection signal p6 at the rotational position P2 in the period Tn+1, between the position detection signal p3 at the rotational position P9 in the period Tn and the position detection signal p6 at the rotational position P8 in the next period Tn+1, and between the position detection signal p3 at the rotational position P15 in the period Tn and the position detection signal p6 at the rotational position P14 in the period Tn+1. The time intervals t173 are respectively calculated also between the position detection signal p3 at the rotational position P3 in the period Tn+1 and the position detection signal p6 at the rotational position P2 in the next period Tn+2, between the position detection signal p3 at the rotational position P9 in the previous period Tn−1 and the position detection signal p6 at the rotational position P8 in the period Tn, and between the position detection signal p3 at the rotational position P15 in the previous period Tn−1 and the position detection signal p6 at the rotational position P14 in the period Tn. Each of these time intervals t173 is obtained in such a way that the section number Q=17 and the position detection signals px=p3 and py=p6 are set, that the two position detection signals p3 and p6 which lie at both the ends of the addition section Aq obtained by adding up the seventeen continuous sections q are selected, and that the time interval between the position detection signals p3 and p6 is calculated.

The time intervals t174 are respectively calculated between the position detection signal p4 at the rotational position P6 in the period Tn and the position detection signal p5 at the rotational position P5 in the period Tn+1, between the position detection signal p4 at the rotational position P12 in the period Tn and the position detection signal p5 at the rotational position P11 in the period Tn+1, and between the position detection signal p4 at the rotational position P18 in the period Tn and the position detection signal p5 at the rotational position P17 in the period Tn+1. The time intervals t174 are respectively calculated also between the position detection signal p4 at the rotational position P6 in the period Tn+1 and the position detection signal p5 at the rotational position P5 in the next period Tn+2, between the position detection signal p4 at the rotational position P12 in the previous period Tn−1 and the position detection signal p5 at the rotational position P11 in the period Tn, and between the position detection signal p4 at the rotational position P18 in the previous period Tn−1 and the position detection signal p5 at the rotational position P17 in the period Tn. Each of these time intervals t174 is obtained in such a way that the section number Q=17 and the position detection signals px=p4 and py=p5 are set, that the two position detection signals p4 and p5 which lie at both the ends of the addition section Aq obtained by adding up the seventeen continuous sections q are selected, and that the time interval between the position detection signals p4 and p5 is calculated.

The time intervals t175 are respectively calculated between the position detection signal p5 at the rotational position P5 in the period Tn and the position detection signal p2 at the rotational position P4 in the period Tn+1, between the position detection signal p5 at the rotational position P11 in the period Tn and the position detection signal p2 at the rotational position P10 in the period Tn+1, and between the position detection signal p5 at the rotational position P17 in the period Tn and the position detection signal p2 at the rotational position P16 in the period Tn+1. The time intervals t175 are respectively calculated also between the position detection signal p5 at the rotational position P5 in the period Tn+1 and the position detection signal p2 at the rotational position P4 in the next period Tn+2, between the position detection signal p5 at the rotational position P11 in the previous period Tn−1 and the position detection signal p2 at the rotational position P10 in the period Tn, and between the position detection signal p5 at the rotational position P17 in the previous period Tn−1 and the position detection signal p2 at the rotational position P16 in the period Tn. Each of these time intervals t175 is obtained in such a way that the section number Q=17 and the position detection signals px=p5 and py=p2 are set, that the two position detection signals p5 and p2 which lie at both the ends of the addition section Aq obtained by adding up the seventeen continuous sections q are selected, and that the time interval between the position detection signals p5 and p2 is calculated.

The time intervals t176 are respectively calculated between the position detection signal p6 at the rotational position P8 in the period Tn and the position detection signal p1 at the rotational position P7 in the period Tn+1, between the position detection signal p6 at the rotational position P14 in the period Tn and the position detection signal p1 at the rotational position P13 in the period Tn+1, and between the position detection signal p6 at the rotational position P2 in the period Tn and the position detection signal p1 at the rotational position P1 in the period Tn+2. The time intervals t176 are respec-tively calculated also between the position detection signal p6 at the rotational position P8 in the period Tn+1 and the position detection signal p1 at the rotational position P7 in the next period Tn+2, between the position detection signal p6 at the rotational position P14 in the previous period Tn−1 and the position detection signal p1 at the rotational position P13 in the period Tn, and between the position detection signal p6 at the rotational position P2 in the period Tn+1 and the position detection signal p1 at the rotational position P1 in the next period Tn+2. Each of these time intervals t176 is obtained in such a way that the section number Q=17 and the position detection signals px=p6 and py=p1 are set, that the two position detection signals p6 and p1 which lie at both the ends of the addition section Aq obtained by adding up the seventeen continuous sections q are selected, and that the time interval between the position detection signals p6 and p1 is calculated.

In a case where angular errors have developed in the mounting positions of the position sensors PA, PB and PC, or in a case where the errors of magnetized positions have developed in the permanent magnets m1-m6 of the position detecting rotor 41 or the permanent magnets M1-M6 of the rotor 20 which is used also for the position detections, the timings which are generated by the pluralities of position detection signals p1-p6 deviate, and hence, deviations occur also in the pluralities of energization switching timings tu1, tu2, tv1, tv2, tw1 and tw2. Besides, each of the plurality of time intervals t171 is the time interval between the position detection signal p1 and the position detection signal p4, and it depends upon the angle θab between the position sensors PA and PB. Each of the plurality of time intervals t172 is the time interval between the position detection signal p2 and the position detection signal p3, and it also depends upon the angle θab between the position sensors PA and PB. Each of the plurality of time intervals t173 is the time interval between the position detection signal p3 and the position detection signal p6, and it depends upon the angle θbc between the position sensors PB and PC. Each of the plurality of time intervals t174 is the time interval between the position detection signal p4 and the position detection signal p5, and it also depends upon the angle θbc between the position sensors PB and PC. Each of the plurality of time intervals t175 is the time interval between the position detection signal p5 and the position detection signal p2, and it depends upon the angle θca between the position sensors PC and PA. Each of the plurality of time intervals t176 is the time interval between the position detection signal p6 and the position detection signal p1, and it also depends upon the angle θca between the position sensors PC and PA.

The energization-switching-timing calculation means 131 determines the pluralities of energization switching timings tw1, tv1, tu2, tw2, tv2 and tu1 on the basis of the pluralities of position detection signals p1-p6 contained in the output signals SA, SB and SC of the position detection signal generation device 40, and the pluralities of time intervals t171-t176, respectively. Concretely, the energization switching timing tw1 at the middle between the rotational positions P1 and P2 in the period Tn+1 is set at a timing which lags an elapsed time $\{(t171/34)+(t176/68)\}$ from the position detection signal p4, with respect to the position detection signal p4 at the rotational position P17 in the period Tn. The time period (t171/34) is obtained in such a way that the time interval t171 between the position detection signal p1 at the rotational position P1 in the period Tn and the position detection signal p4 at the rotational position P18 in the period Tn is multiplied by 1/34. Besides, the time period (t176/68) is obtained in such a way that the time interval t176 between the position detection signal p6 at the rotational position P2 in the period Tn and the position detection signal p1 at the rotational position P1 in the period Tn+1 is multiplied by 1/68. Each of the energization switching timings tw1 at the middle between the rotational positions P7 and P8 in the period Tn, at the middle between the rotational positions P13 and P14 in the period Tn, at the middle between the rotational positions P7 and P8 in the period Tn+1, and at the middle between the rotational positions P13 and P14 in the period Tn+1 is set at a timing which lags the elapsed time {(t171/34)+(t176/68)} from the immediately preceding position detection signal p4, by similarly calculating the elapsed time with the immediately preceding time interval t171 and the immediately preceding time interval t176.

The energization switching timing tv1 at the middle between the rotational positions P2 and P3 in the period Tn+1 is set at a timing which lags an elapsed time {(t176/34)+(t173/68)} from the position detection signal p1, with respect to the position detection signal p1 at the rotational position P1 in the period Tn+1. The time period (t176/34) is obtained in such a way that the time interval t176 between the position detection signal p6 at the rotational position P2 in the period Tn and the position detection signal p1 at the rotational position P1 in the period Tn+1 is multiplied by 1/34. Besides, the time period (t173/68) is obtained in such a way that the time interval t173 between the position detection signal p3 at the rotational position P3 in the period Tn and the position detection signal p6 at the rotational position P2 in the period Tn+1 is multiplied by 1/68. Each of the energization switching timings tv1 at the middle between the rotational positions P2 and P3 in the period Tn, at the middle between the rotational positions P8 and P9 in the period Tn, at the middle between the rotational positions P14 and P15 in the period Tn, at the middle between the rotational positions P8 and P9 in the period Tn+1, and at the middle between the rotational positions P14 and P15 in the period Tn+1 is set at a timing which lags the elapsed time {(t176/34)+(t173/68)} from the immediately preceding position detection signal p1, by similarly calculating the elapsed time with the immediately preceding time interval t176 and the immediately preceding time interval t173.

The energization switching timing tu2 at the middle between the rotational positions P3 and P4 in the period Tn+1 is set at a timing which lags an elapsed time {(t173/34)+(t172/68)} from the position detection signal p6, with respect to the position detection signal p6 at the rotational position P2 in the period Tn+1. The time period (t173/34) is obtained in such a way that the time interval t173 between the position detection signal p3 at the rotational position P3 in the period Tn and the position detection signal p6 at the rotational position P2 in the period Tn+1 is multiplied by 1/34. Besides, the time period (t172/68) is obtained in such a way that the time interval t172 between the position detection signal p2 at the rotational position P4 in the period Tn and the position detection signal p3 at the rotational position P3 in the period Tn+1 is multiplied by 1/68. Each of the energization switching timings tu2 at the middle between the rotational positions P3 and P4 in the period Tn, at the middle between the rotational positions P9 and P10 in the period Tn, at the middle between the rotational positions P15 and P16 in the period Tn, at the middle between the rotational positions P9 and P10 in the period Tn+1, and at the middle between the rotational positions P15 and P16 in the period Tn+1 is set at a timing which lags the elapsed time {(t173/34)+(t172/68)} from the immediately preceding position detection signal p6, by similarly calculating the elapsed time with the immediately preceding time interval t173 and the immediately preceding time interval t172.

The energization switching timing tw2 at the middle between the rotational positions P4 and P5 in the period Tn+1 is set at a timing which lags an elapsed time {(t172/34)+(t175/68)} from the position detection signal p3, with respect to the position detection signal p3 at the rotational position P3 in the period Tn+1. The time period (t172/34) is obtained in such a way that the time interval t172 between the position detection signal p2 at the rotational position P4 in the period Tn and the position detection signal p3 at the rotational position P3 in the period Tn+1 is multiplied by 1/34. Besides, the time period (t175/68) is obtained in such a way that the time interval t175 between the position detection signal p5 at the rotational position P5 in the period Tn and the position detection signal p2 at the rotational position P4 in the period Tn+1 is multiplied by 1/68. Each of the energization switching timings tw2 at the middle between the rotational positions P4 and P5 in the period Tn, at the middle between the rotational positions P10 and P11 in the period Tn, at the middle between the rotational positions P16 and P17 in the period Tn, at the middle between the rotational positions P10 and P11 in the period Tn+1, and at the middle between the rotational positions P16 and P17 in the period Tn+1 is set at a timing which lags the elapsed time {(t172/34)+(t175/68)} from the immediately preceding position detection signal p3, by similarly calculating the elapsed time with the immediately preceding time interval t172 and the immediately preceding time interval t175.

The energization switching timing tv2 at the middle between the rotational positions P5 and P6 in the period Tn+1 is set at a timing which lags an elapsed time {(t175/34)+(t174/68)} from the position detection signal p2, with respect to the position detection signal p2 at the rotational position P4 in the period Tn+1. The time period (t175/34) is obtained in such a way that the time interval t175 between the position detection signal p5 at the rotational position P5 in the period Tn and the position detection signal p2 at the rotational position P4 in the period Tn+1 is multiplied by 1/34. Besides, the time period (t174/68) is obtained in such a way that the time interval t174 between the position detection signal p4 at the rotational position P6 in the period Tn and the position detection signal p5 at the rotational position P5 in the period Tn+1 is multiplied by 1/68. Each of the energization switching timings tv2 at the middle between the rotational positions P5 and P6 in the period Tn, at the middle between the rotational positions P11 and P12 in the period Tn, at the middle between the rotational positions P17 and P18 in the period Tn, at the middle between the rotational positions P11 and P12 in the period Tn+1, and at the middle between the rotational positions P17 and P18 in the period Tn+1 is set at a timing which lags the elapsed time {(t175/34)+(t174/68)} from the immediately preceding position detection signal p2, by similarly calculating the elapsed time with the immediately preceding time interval t175 and the immediately preceding time interval t174.

The energization switching timing tu1 at the middle between the rotational positions P6 and P7 in the period Tn+1 is set at a timing which lags an elapsed time {(t174/34)+(t171/68)} from the position detection signal p5, with respect to the position detection signal p5 at the rotational position P5 in the period Tn+1. The time period (t174/34) is obtained in such a way that the time interval t174 between the position detection signal p4 at the rotational position P6 in the period Tn and the position detection signal p5 at the rotational position P5 in the period Tn+1 is multiplied by 1/34. Besides, the time period (t171/68) is obtained in such a way that the time interval t171 between the position detection signal p1 at the rotational position P7 in the period Tn and the position detection signal p4 at the rotational position P6 in the period Tn+1 is multiplied by 1/68. Each of the energization switching timings tu1 at the middle between the rotational positions P6 and P7 in the period Tn, at the middle between the rotational positions P12 and P13 in the period Tn, at the middle between the rotational position P18 in the period Tn and the rotational position P1 in the period Tn+1, and at the middle between the rotational positions P12 and P13 in the period Tn+1 is set at a timing which lags the elapsed time {(t174/34)+(t171/68)} from the immediately preceding position detection signal p5, by similarly calculating the elapsed time with the immediately preceding time interval t174 and the immediately preceding time interval t171.

In Embodiment 6, each of the pluralities of time intervals t171-t176 is set as the time interval between the two position detection signals px and py which lie at both the ends of the addition section Aq obtained by adding up the seventeen continuous sections q, and the pluralities of energization switching timings tw1, tv1, tu2, tw2, tv2 and tu1 are respectively determined on the basis of the pluralities of time intervals t171-t176 and the pluralities of position detection signals p1-p6. Each of the pluralities of time intervals t171-t176 has a time interval which is made substantially seventeen times the time interval t0. The pluralities of energization switching timings are determined using the values obtained in such a way that the time intervals t171-t176 with the time interval t0 increased substantially seventeen times are respectively multiplied by 1/34 and 1/68. Thus, even in the case where the errors have developed in the mounting positions of the position sensors PA, PB and PC, they are averaged, and hence, their influence is lessened. Besides, regarding the errors of the magnetized positions incurred by the arrangement errors of the permanent magnets m1-m6 of the position detecting rotor 41, the influence thereof can be similarly lessened. Also in the apparatus in which the rotor 20 serves instead of the position detecting rotor 41, the influence of the errors of the magnetized positions incurred by the arrangement errors of the permanent magnets M1-M6 can be similarly lessened.

Embodiment 7

In Embodiment 7 here, the time-interval-calculation-mode setting means 135 gives the time interval calculation means 133 at time interval calculation mode command TQ of section number Q=18 on the basis of the external command TO, and the time interval calculation means 133 calculates each of pluralities of time intervals t181-t186, between two position detection signals px and py lying at both the ends of eighteen continuous sections q. The other configuration of Embodiment 7 is the same as in Embodiment 1.

Figure 14:
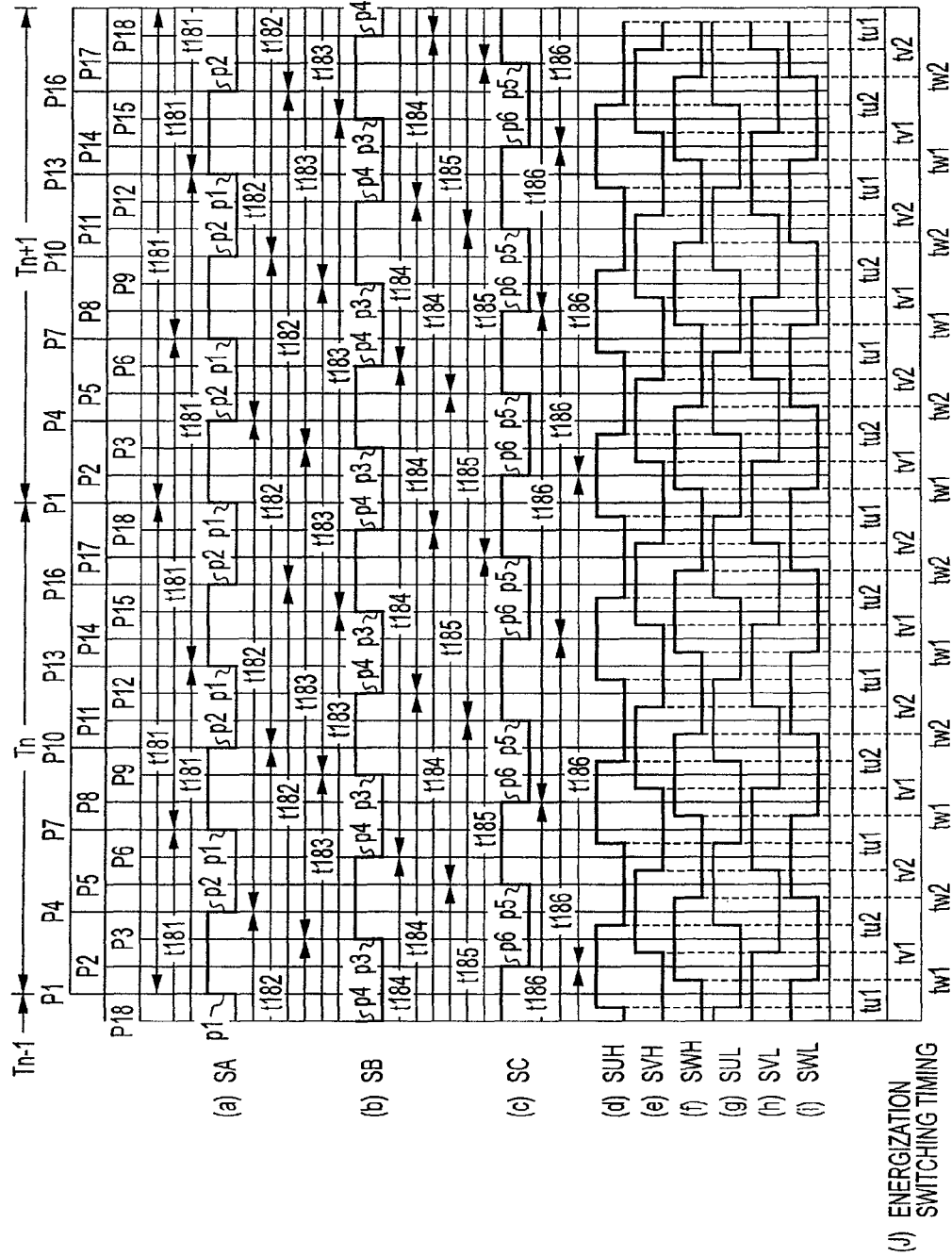
FIG. 14 is a timing chart for explaining the operation of Embodiment 7 of the control device for the three-phase brushless motor according to this invention.

FIG. 14 is a timing chart for explaining the operation of Embodiment 7. Rotational positions P1-P18 on the axis of abscissas in FIG. 14 are basically the same as the axis of abscissas in FIG. 5, but in relation to the section number Q=18, the rotational positions P1-P18 are indicated for each of the period Tn corresponding to one revolution of the rotor 20 and the next period Tn+1 continuous to the period Tn. Besides, waveforms shown at (a)-(j) in FIG. 14 are also basically the same as in FIG. 5, but the respective signal waveforms are shown over the respective periods Tn and Tn+1. The time interval calculation means 133 successively calculates the pluralities of time intervals t181-t186 appended at (a), (b) and (c) in FIG. 14. These time intervals t181-t186 will be concretely described.

First, the time intervals t181 are respectively calculated between the position detection signal p1 at the rotational position P1 in the period Tn and the position detection signal p1 at the rotational position P1 in the period Tn+1, between the position detection signal p1 at the rotational position P7 in the period Tn and the position detection signal p1 at the rotational position P7 in the period Tn+1, and between the position detection signal p1 at the rotational position P13 in the period Tn and the position detection signal p1 at the rotational position P13 in the period Tn+1. The time intervals t181 are respectively calculated also between the position detection signal p1 at the rotational position P1 in the period Tn+1 and the position detection signal p1 at the rotational position P1 in the next period Tn+2, between the position detection signal p1 at the rotational position P13 in the previous period Tn−1 and the position detection signal p1 at the rotational position P7 in the period Tn, and between the position detection signal p1 at the rotational position 13 in the previous period Tn−1 and the position detection signal p1 at the rotational position P13 in the period Tn. Each of these time intervals t181 is obtained in such a way that the section number Q=18 and the position detection signals px=p1 and py=p1 are set, that the two position detection signals p1 and p1 which lie at both the ends of an addition section Aq obtained by adding up the eighteen continuous sections q are selected, and that the time interval between the position detection signals p1 and p1 is calculated.

The time intervals t182 are respectively calculated between the position detection signal p2 at the rotational position P4 in the period Tn and the position detection signal p2 at the rotational position P4 in the next period Tn+1, between the position detection signal p2 at the rotational position P10 in the period Tn and the position detection signal p2 at the rotational position P10 in the period Tn+1, and between the position detection signal p2 at the rotational position P16 in the period Tn and the position detection signal p2 at the rotational position P16 in the next period Tn+1. The time intervals t182 are respectively calculated also between the position detection signal p2 at the rotational position P4 in the period Tn+1 and the position detection signal p2 at the rotational position P4 in the next period Tn+2, between the position detection signal p2 at the rotational position P10 in the previous period Tn−1 and the position detection signal p2 at the rotational position P10 in the period Tn, and between the position detection signal p2 at the rotational position P16 in the previous period Tn−1 and the position detection signal p2 at the rotational position P16 in the period Tn. Each of these time intervals t182 is obtained in such a way that the section number Q=18 and the position detection signals px=p2 and py=p2 are set, that the two position detection signals p2 and p2 which lie at both the ends of the addition section Aq obtained by adding up the eighteen continuous sections q are selected, and that the time interval between the position detection signals p2 and p2 is calculated.

The time intervals t183 are respectively calculated between the position detection signal p3 at the rotational position P3 in the period Tn and the position detection signal p3 at the rotational position P3 in the period Tn+1, between the position detection signal p3 at the rotational position P9 in the period Tn and the position detection signal p3 at the rotational position P9 in the next period Tn+1, and between the position detection signal p3 at the rotational position P15 in the period Tn and the position detection signal p3 at the rotational position P15 in the period Tn+1. The time intervals t183 are respectively calculated also between the position detection signal p3 at the rotational position P3 in the period Tn+1 and the position detection signal p3 at the rotational position P3 in the next period Tn+2, between the position detection signal p3 at the rotational position P9 in the previous period Tn−1 and the position detection signal p3 at the rotational position P9 in the period Tn, and between the position detection signal p3 at the rotational position P15 in the previous period Tn−1 and the position detection signal p3 at the rotational position P15 in the period Tn. Each of these time intervals t183 is obtained in such a way that the section number Q=18 and the position detection signals px=p3 and py=p3 are set, that the two position detection signals p3 and p3 which lie at both the ends of the addition section Aq obtained by adding up the eighteen continuous sections q are selected, and that the time interval between the position detection signals p3 and p3 is calculated.

The time intervals t184 are respectively calculated between the position detection signal p4 at the rotational position P6 in the period Tn and the position detection signal p4 at the rotational position P6 in the period Tn+1, between the position detection signal p4 at the rotational position P12 in the period Tn and the position detection signal p4 at the rotational position P12 in the period Tn+1, and between the position detection signal p4 at the rotational position P18 in the period Tn and the position detection signal p4 at the rotational position P18 in the period Tn+1. The time intervals t184 are respectively calculated also between the position detection signal p4 at the rotational position P6 in the period Tn+1 and the position detection signal p4 at the rotational position P6 in the next period Tn+2, between the position detection signal p4 at the rotational position P12 in the previous period Tn−1 and the position detection signal p4 at the rotational position P12 in the period Tn, and between the position detection signal p4 at the rotational position P18 in the previous period Tn−1 and the position detection signal p4 at the rotational position P18 in the period Tn. Each of these time intervals t184 is obtained in such a way that the section number Q=18 and the position detection signals px=p4 and py=p4 are set, that the two position detection signals p4 and p4 which lie at both the ends of the addition section Aq obtained by adding up the eighteen continuous sections q are selected, and that the time interval between the position detection signals p4 and p4 is calculated.

The time intervals t185 are respectively calculated between the position detection signal p5 at the rotational position P5 in the period Tn and the position detection signal p5 at the rotational position P5 in the period Tn+1, between the position detection signal p5 at the rotational position P11 in the period Tn and the position detection signal p5 at the rotational position P11 in the period Tn+1, and between the position detection signal p5 at the rotational position P17 in the period Tn and the position detection signal p5 at the rotational position P17 in the period Tn+1. The time intervals t185 are respectively calculated also between the position detection signal p5 at the rotational position P5 in the period Tn+1 and the position detection signal p5 at the rotational position P5 in the next period Tn+2, between the position detection signal p5 at the rotational position P11 in the previous period Tn−1 and the position detection signal p5 at the rotational position P11 in the period Tn, and between the position detection signal p5 at the rotational position P17 in the previous period Tn−1 and the position detection signal p5 at the rotational position P17 in the period Tn. Each of these time intervals t185 is obtained in such a way that the section number Q=18 and the position detection signals px=p5 and py=p5 are set, that the two position detection signals p5 and p5 which lie at both the ends of the addition section Aq obtained by adding up the eighteen continuous sections q are selected, and that the time interval between the position detection signals p5 and p5 is calculated.

The time intervals t186 are respectively calculated between the position detection signal p6 at the rotational position P8 in the period Tn and the position detection signal p6 at the rotational position P8 in the period Tn+1, between the position detection signal p6 at the rotational position P14 in the period Tn and the position detection signal p6 at the rotational position P14 in the period Tn+1, and between the position detection signal p6 at the rotational position P2 in the period Tn and the position detection signal p6 at the rotational position P2 in the period Tn+1. The time intervals t186 are respectively calculated also between the position detection signal p6 at the rotational position P8 in the period Tn+1 and the position detection signal p6 at the rotational position P8 in the next period Tn+2, between the position detection signal p6 at the rotational position P14 in the previous period Tn−1 and the position detection signal p6 at the rotational position P14 in the period Tn, and between the position detection signal p6 at the rotational position P2 in the period Tn+1 and the position detection signal p2 at the rotational position P2 in the next period Tn+2. Each of these time intervals t186 is obtained in such a way that the section number Q=18 and the position detection signals px=p6 and py=p6 are set, that the two position detection signals p6 and p6 which lie at both the ends of the addition section Aq obtained by adding up the eighteen continuous sections q are selected, and that the time interval between the position detection signals p6 and p6 is calculated.

In a case where angular errors have developed in the mounting positions of the position sensors PA, PB and PC, or in a case where the errors of magnetized positions have developed in the permanent magnets m1-m6 of the position detecting rotor 41 or the permanent magnets M1-M6 of the rotor 20 which is used also for the position detections, the timings which are generated by the pluralities of position detection signals p1-p6 deviate, and hence, deviations occur also in the pluralities of energization switching timings tu1, tu2, tv1, tv2, tw1 and tw2. In Embodiment 7, however, the pluralities of time intervals t181 and t182 are respectively the time intervals between the position detection signals p1 and between the position detection signals p2, and even when the error has developed in the mounting position of the position sensor PA and when the errors of the magnetized positions have developed in the permanent magnets m1-m6 and M1-M6, these time intervals t181 and t182 are not influenced by the errors. The pluralities of time intervals t183 and t184 are respectively the time intervals between the position detection signals p3 and between the position detection signals p4, and the pluralities of time intervals t185 and t186 are respectively the time intervals between the position detection signals p5 and between the position detection signals p6, and even when the errors have developed in the mounting positions of the position sensors PB and PC and when the errors of the magnetized positions have developed in the permanent magnets m1-m6 and M1-M6, these time intervals t183, t184, t185 and t186 are not influenced by the errors.

The energization-switching-timing calculation means 131 determines the pluralities of energization switching timings tv1, tu2, tw2, tv2, tu1 and tw1 on the basis of the pluralities of position detection signals p1-p6 contained in the output signals SA, SB and SC of the position detection signal generation device 40, and the pluralities of time intervals t181-t186, respectively. Concretely, the energization switching timing tv1 at the middle between the rotational positions P2 and P3 in the period Tn+1 is set at a timing which lags an elapsed time $\{(t181/36)+(t186/72)\}$ from the position detection signal p1, with respect to the position detection signal p1 at the rotational position P1 in the period Tn+1. The time period (t181/36) is obtained in such a way that the time interval t181 between the position detection signal p1 at the rotational position P1 in the period Tn and the position detection signal p1 at the rotational position P1 in the period Tn+1 is multiplied by 1/36. Besides, the time period (t186/72) is obtained in such a way that the time interval t186 between the position detection signal p6 at the rotational position P2 in the period Tn and the position detection signal p6 at the rotational position P2 in the period Tn+1 is multiplied by 1/72. Each of the energization switching timings tv1 at the middle between the rotational positions P2 and P3 in the period Tn, at the middle between the rotational positions P8 and P9 in the period Tn, at the middle between the rotational positions P14 and P15 in the period Tn, at the middle between the rotational positions P8 and P9 in the period Tn+1, and at the middle between the rotational positions P14 and P15 in the period Tn+1 is set at a timing which lags the elapsed time {(t181/36)+(t186/72)} from the immediately preceding position detection signal p1, by similarly calculating the elapsed time with the immediately preceding time interval t181 and the immediately preceding time interval t186.

The energization switching timing tu2 at the middle between the rotational positions P3 and P4 in the period Tn+1 is set at a timing which lags an elapsed time {(t186/36)+(t183/72)} from the position detection signal p6, with respect to the position detection signal p6 at the rotational position P2 in the period Tn+1. The time period (t186/36) is obtained in such a way that the time interval t186 between the position detection signal p6 at the rotational position P2 in the period Tn and the position detection signal p2 at the rotational position P2 in the period Tn+1 is multiplied by 1/36. Besides, the time period (t183/72) is obtained in such a way that the time interval t183 between the position detection signal p3 at the rotational position P3 in the period Tn and the position detection signal p3 at the rotational position P3 in the period Tn+1 is multiplied by 1/72. Each of the energization switching timings tu2 at the middle between the rotational positions P3 and P4 in the period Tn, at the middle between the rotational positions P9 and P10 in the period Tn, at the middle between the rotational positions P15 and P16 in the period Tn, at the middle between the rotational positions P9 and P10 in the period Tn+1, and at the middle between the rotational positions P15 and P16 in the period Tn+1 is set at a timing which lags the elapsed time {(t186/36)+(t183/72)} from the immediately preceding position detection signal p6, by similarly calculating the elapsed time with the immediately preceding time interval t186 and the immediately preceding time interval t183.

The energization switching timing tw2 at the middle between the rotational positions P4 and P5 in the period Tn+1 is set at a timing which lags an elapsed time {(t183/36)+(t182/72)} from the position detection signal p3, with respect to the position detection signal p3 at the rotational position P3 in the period Tn+1. The time period (t183/36) is obtained in such a way that the time interval t183 between the position detection signal p3 at the rotational position P3 in the period Tn and the position detection signal p3 at the rotational position P3 in the period Tn+1 is multiplied by 1/36. Besides, the time period (t182/72) is obtained in such a way that the time interval t182 between the position detection signal p2 at the rotational position P4 in the period Tn and the position detection signal p2 at the rotational position P4 in the period Tn+1 is multiplied by 1/72. Each of the energization switching timings tw2 at the middle between the rotational positions P4 and P5 in the period Tn, at the middle between the rotational positions P10 and P11 in the period Tn, at the middle between the rotational positions P16 and P17 in the period Tn, at the middle between the rotational positions P10 and P11 in the period Tn+1, and at the middle between the rotational positions P16 and P17 in the period Tn+1 is set at a timing which lags the elapsed time {(t183/36)+(t182/72)} from the immediately preceding position detection signal p3, by similarly calculating the elapsed time with the immediately preceding time interval t183 and the immediately preceding time interval t182.

The energization switching timing tv2 at the middle between the rotational positions P5 and P6 in the period Tn+1 is set at a timing which lags an elapsed time {(t182/36)+(t185/72)} from the position detection signal p2, with respect to the position detection signal p2 at the rotational position P4 in the period Tn+1. The time period (t182/36) is obtained in such a way that the time interval t182 between the position detection signal p2 at the rotational position P4 in the period Tn and the position detection signal p2 at the rotational position P4 in the period Tn+1 is multiplied by 1/36. Besides, the time period (t185/72) is obtained in such a way that the time interval t185 between the position detection signal p5 at the rotational position P5 in the period Tn and the position detection signal p5 at the rotational position P5 in the period Tn+1 is multiplied by 1/72. Each of the energization switching timings tv2 at the middle between the rotational positions P5 and P6 in the period Tn, at the middle between the rotational positions P11 and P12 in the period Tn, at the middle between the rotational positions P17 and P18 in the period Tn, at the middle between the rotational positions P11 and P12 in the period Tn+1, and at the middle between the rotational positions P17 and P18 in the period Tn+1 is set at a timing which lags the elapsed time {(t182/36)+(t185/72)} from the immediately preceding position detection signal p2, by similarly calculating the elapsed time with the immediately preceding time interval t182 and the immediately preceding time interval t185.

The energization switching timing tu1 at the middle between the rotational positions P6 and P7 in the period Tn+1 is set at a timing which lags an elapsed time {(t185/36)+(t184/72)} from the position detection signal p5, with respect to the position detection signal p5 at the rotational position P5 in the period Tn+1. The time period (t185/36) is obtained in such a way that the time interval t185 between the position detection signal p5 at the rotational position P5 in the period Tn and the position detection signal p5 at the rotational position P5 in the period Tn+1 is multiplied by 1/36. Besides, the time period (t184/72) is obtained in such a way that the time interval t184 between the position detection signal p4 at the rotational position P6 in the period Tn and the position detection signal p4 at the rotational position P6 in the period Tn+1 is multiplied by 1/72. Each of the energization switching timings tu1 at the middle between the rotational positions P6 and P7 in the period Tn, at the middle between the rotational positions P12 and P13 in the period Tn, at the middle between the rotational position P18 in the period Tn and the rotational position P1 in the period Tn+1, and at the middle between the rotational positions P12 and P13 in the period Tn+1 is set at a timing which lags the elapsed time {(t185/36)+(t184/72)} from the immediately preceding position detection signal p5, by similarly calculating the elapsed time with the immediately preceding time interval t185 and the immediately preceding time interval t184.

The energization switching timing tw1 at the middle between the rotational positions P7 and P8 in the period Tn+1 is set at a timing which lags an elapsed time {(t184/36)+(t181/72)} from the position detection signal p4, with respect to the position detection signal p4 at the rotational position P6 in the period Tn+1. The time period (t184/36) is obtained in such a way that the time interval t184 between the position detection signal p4 at the rotational position P6 in the period Tn and the position detection signal p4 at the rotational position P6 in the period Tn+1 is multiplied by 1/36. Besides, the time period (t181/72) is obtained in such a way that the time interval t181 between the position detection signal p1 at the rotational position P7 in the period Tn and the position detection signal p1 at the rotational position P7 in the period Tn+1 is multiplied by 1/72. Each of the energization switching timings tw1 at the middle between the rotational positions P1 and P2 in the period Tn, at the middle between the rotational positions P7 and P8 in the period Tn, at the middle between the rotational positions P13 and P14 in the period Tn, at the middle between the rotational positions P1 and P2 in the period Tn+1, and at the middle between the rotational positions P13 and P14 in the period Tn+1 is set at a timing which lags the elapsed time {(t184/36)+(t181/72)} from the immediately preceding position detection signal p4, by similarly calculating the elapsed time with the immediately preceding time interval t184 and the immediately preceding time interval t181.

In Embodiment 7, the two position detection signals px and py which lie at both the ends of the addition period Aq obtained by adding up the eighteen continuous sections q are selected, each of the pluralities of time intervals t181-t186 is calculated between the signals px and py, and the pluralities of energization switching timings are determined on the basis of the pluralities of time intervals t181-t186 and the pluralities of position detection signals p1-p6. Since the pluralities of time intervals t181-t186 are not influenced by the angular errors of the mounting positions of the position sensors PA, PB and PC, the energization switching timings fluctuate depending upon only the angular errors of the mounting positions of the position sensors PA, PB and PC and the errors of the magnetized positions of the permanent magnets m1-m6 or the permanent magnets M1-M6, and the fluctuations of the energization switching timings can be suppressed to smaller magnitudes.

In Embodiment 7, the section number Q is 18, and it is an even number in the same manner as in Embodiment 1. Since the section number Q is the even number, the two position detection signals px and py which determine each of the pluralities of time intervals t181, t183 and t185 are selected from among the position detection signals p1, p3 and p5. All of the pluralities of position detection signals p1, p3 and p5 are generated when the edges affording the changes of a magnetic flux density in the same polarities, namely, the edges ea, ec and ee changing from the S-poles to the N-poles have opposed to the position sensors PA, PB and PC with the rotation of the rotor 20, so that the time intervals t181, t183 and t185 can be calculated more precisely. Besides, the two position detection signals px and py which determine each of the pluralities of time intervals t182, t184 and t186 are selected from among the position detection signals p2, p4 and p6. All of the pluralities of position detection signals p2, p4 and p6 are generated when the edges affording the changes of the magnetic flux density in the same polarities, namely, the edges eb, ed and ef changing from the N-poles to the S-poles have opposed to the position sensors PA, PB and PC with the rotation of the rotor 20, so that also the time intervals t182, t184 and t186 can be calculated more precisely.

Embodiment 8

Embodiment 8 changes-over a time interval calculation mode on the basis of the change of the change magnitude of the rotational speed command RI for the three-phase brushless motor 10. In Embodiment 8 here, the time-interval-calculation-mode setting means 135 of the arithmetic processing means 130 is configured so as to set at least two time interval calculation modes MT1 and MT2. In the time interval calculation mode MT2, the time interval calculation mode command TQ sets the section number Q at any number within a range of 2-18. This time interval calculation mode MT2 is the same as in Embodiments 1-7. Besides, in the time interval calculation mode MT1, the time interval calculation mode command TQ sets the section number Q at 1. The other configuration of Embodiment 8 is the same as in Embodiments 1-7.

In Embodiment 8, the rotational speed command calculation means 137 outputs the rotational speed commands RI for the three-phase brushless motor 10, successively at intervals of a predetermined time period, for example, 4 ms. Each of the rotational speed commands RI is fed to the PWM control circuit 120, which controls the pulse duties in the ON-periods of the respective switch elements UH, UL, VH, VL, WH and WL, so as to control the rotational speed of the three-phase brushless motor 10. Now, let's suppose a case where the rotational speed command RI changes from RI(n) to RI(n+1).

Figure 15:
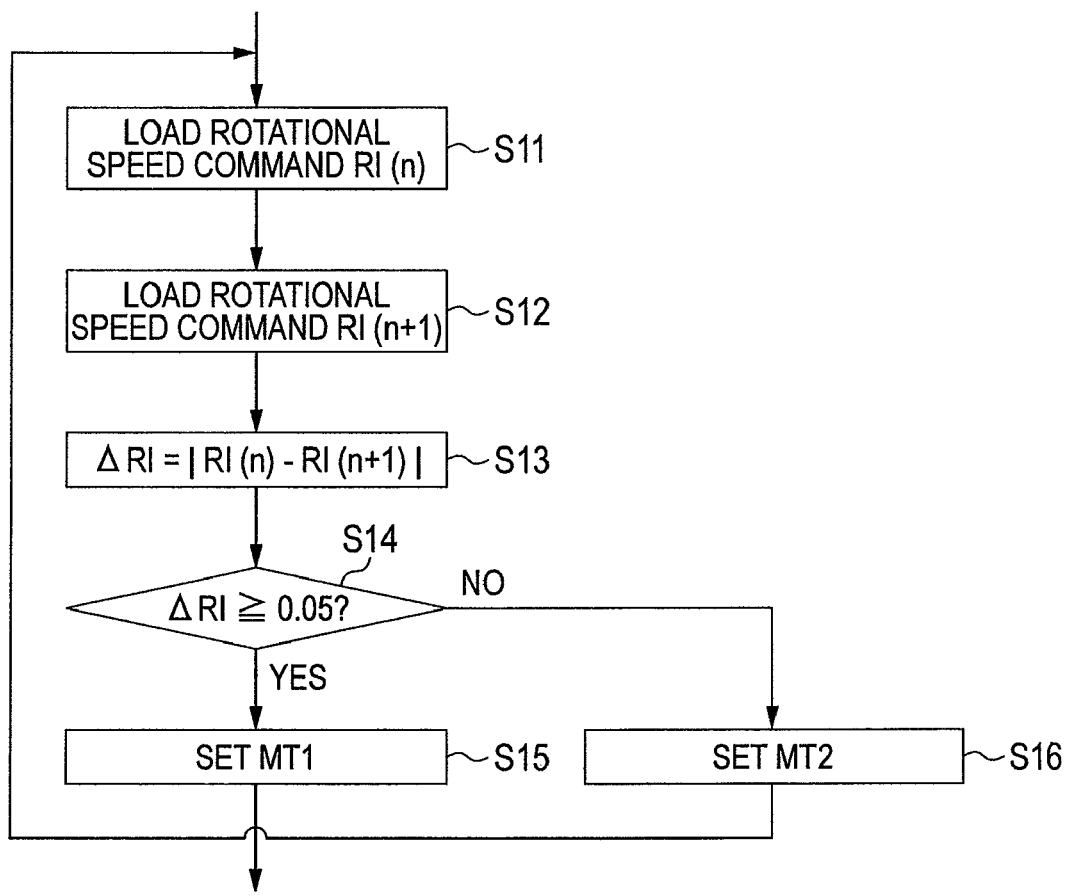
FIG. 15 is a flow chart showing the operation of time-interval-calculation-mode setting means in Embodiment 8 of the control device for the three-phase brushless motor according to this invention.

FIG. 15 is a flow chart showing the operation of the time-interval-calculation-mode setting means 135 in Embodiment 8. In Embodiment 8 here, the time-interval-calculation-mode setting means 135 changes-over the time interval calculation mode between the modes MT1 and MT2 on the basis of the flow chart of FIG. 15 without resorting to the external command TO. The flow chart includes the six steps of steps S11-S16. At the step S11, the time-interval-calculation-mode setting means 135 loads and stores the rotational speed command RI(n). At the next step S12, the means 135 loads the rotational speed command RI(n+1). At the next step S13, the change magnitude ΔRI between the rotational speed command RI (n) and the rotational speed command RI (n+1) is calculated. The change magnitude ΔRI is represented by the following formula (1):

$$\Delta RI = |RI(n) - RI(n+1)| \quad (1)$$

At the next step S14, if the change magnitude ΔRI is, at least, a predetermined value, for example, 0.05 is decided. When the result of the decision at the step S14 is "YES", the routine shifts to the step S15, at which the time interval calculation mode MT1 is set. After the time interval calculation mode MT1 has been set at the step S15, the routine returns to the first step S11. When the result of the decision at the step S14 is "NO", the routine shifts to the step S16, at which the time interval calculation mode MT2 is set. After the time interval calculation mode MT2 has been set at the step S16, the routine returns to the step S11.

In the case where the time interval calculation mode MT2 has been set, the fluctuations of the energization switching timings can be suppressed, but a responsibility to the change of the rotational speed command RI lowers. In Embodiment 8, the time interval calculation mode MT2 is set on the basis of the change of the change magnitude ΔRI of the rotational speed command RT, in other words, unless the change magnitude ΔRI exceeds the predetermined value. On the other hand, the time interval calculation mode MT1 is set when the change magnitude ΔRI has become, at least, the predetermined value, and the prior-art control is performed at that time.

In Embodiment 8, the time interval calculation modes MT1 and MT2 are changed-over in accordance with the change magnitude ΔRI of the rotational speed command RI. Therefore, unless the change magnitude ΔRI exceeds the predetermined value, the changes of the energization switching timings can be suppressed by the time interval calculation mode MT2, and when the change magnitude ΔRI has become, at least, the predetermined value, the responsibility to the rotational speed command RI can be improved by the time interval calculation mode MT1.

In Embodiment 8, when the time-interval-calculation-mode setting means 135 has given the time interval calculation means 133 the time interval calculation mode MT1, this time interval calculation means 133 sets the section number Q at Q=1, it calculates the time intervals t11-t16 between the two position detection signals px and py lying at both the ends of each section q, and it determines the pluralities of energization switching timings tu1, tu2, tv1, tv2, tw1 and tw2 on the basis of the pluralities of time intervals t11-t16 and the pluralities of position detection signals p1-p6. Although this control is the prior-art control, it is used in the time interval calculation mode TM1 in Embodiments 8, 9 and 10, and hence, the determinations of the time intervals t11-t16 and the respective energization switching timings tu1, tu2, tv1, tv2, tw1 and tw2 will be described with reference to FIG. 16. The control in FIG. 16 is the same as in Embodiment 1 except that the section number Q=1 is set.

Figure 16:
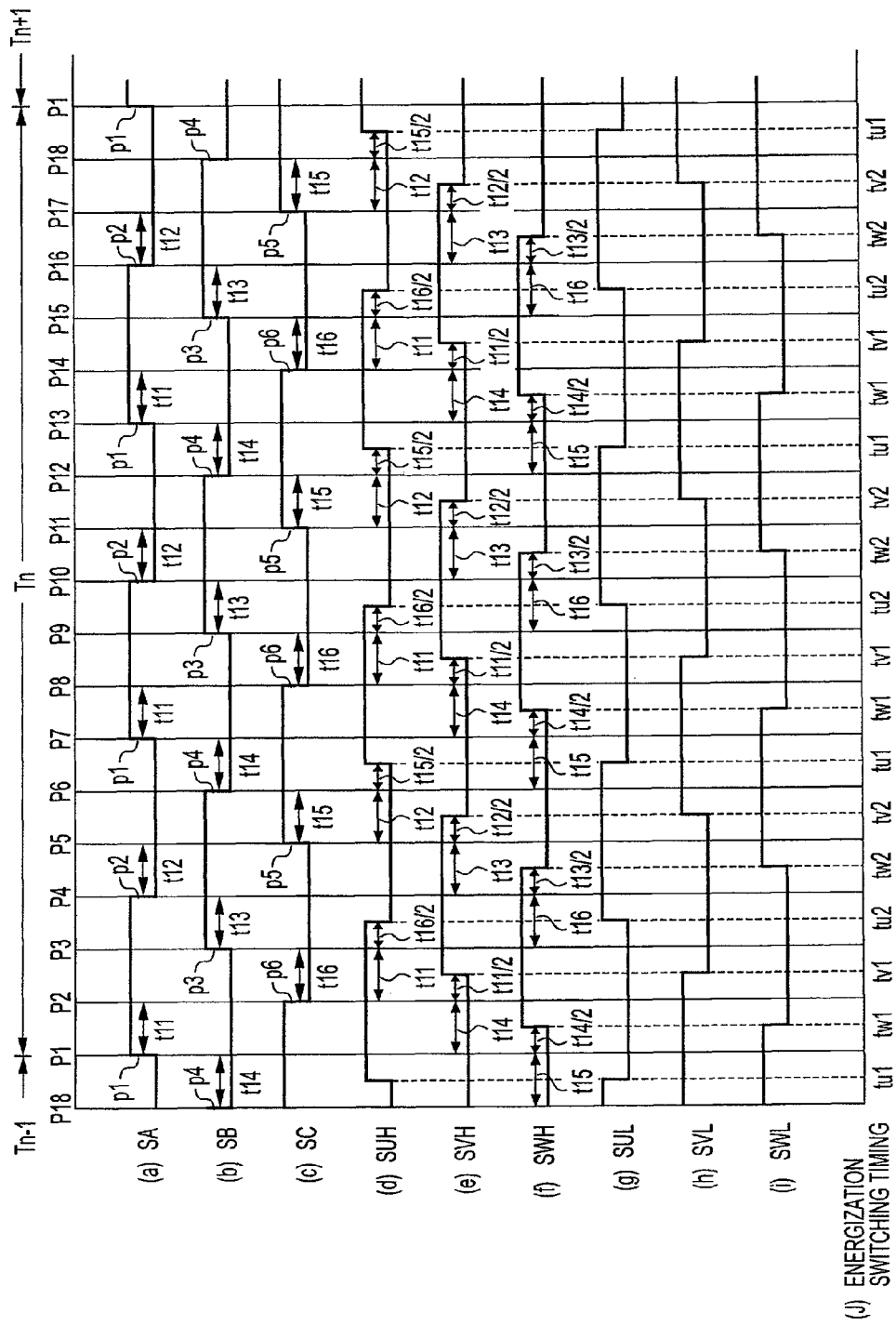
FIG. 16 is a timing chart for explaining a control operation which is based on a time interval calculation mode TM1 for use in Embodiment 8.

Referring to FIG. 16, first of all, the time intervals t11 are respectively calculated between the position detection signal p1 at the rotational position P1 and the position detection signal p6 at the rotational position P2, between the position detection signal p1 at the rotational position P7 and the position detection signal p6 at the rotational position P8, and between the position detection signal p1 at the rotational position P13 and the position detection signal p6 at the rotational position P14. Each of these time intervals t11 is obtained in such a way that the section number Q=1 and the position detection signals px=p1 and py=p6 are set, that the two position detection signals p1 and p6 which lie at both the ends of only one section q are selected, and that the time interval between the position detection signals p1 and p6 is calculated.

The time intervals t12 are respectively calculated between the position detection signal p2 at the rotational position P4 and the position detection signal p5 at the rotational position P5, between the position detection signal p2 at the rotational position P10 and the position detection signal p5 at the rotational position P11, and between the position detection signal p2 at the rotational position P16 and the position detection signal p5 at the rotational position P17. Each of these time intervals t12 is obtained in such a way that the section number Q=1 and the position detection signals px=p2 and py=p5 are set, that the two position detection signals p2 and p5 which lie at both the ends of only one section q are selected, and that the time interval between the position detection signals p2 and p5 is calculated.

The time intervals t13 are respectively calculated between the position detection signal p3 at the rotational position P3 and the position detection signal p2 at the rotational position P4, between the position detection signal p3 at the rotational position P9 and the position detection signal p2 at the rotational position P10, and between the position detection signal p3 at the rotational position P15 and the position detection signal p2 at the rotational position P16. Each of these time intervals t13 is obtained in such a way that the section number Q=1 and the position detection signals px=p3 and py=p2 are set, that the two position detection signals p3 and p2 which lie at both the ends of only one section q are selected, and that the time interval between the position detection signals p3 and p2 is calculated.

The time intervals t14 are respectively calculated between the position detection signal p4 at the rotational position P18 in the previous period Tn−1 and the position detection signal p1 at the rotational position P1, between the position detection signal p4 at the rotational position P6 and the position detection signal p1 at the rotational position P7, between the position detection signal p4 at the rotational position P12 and the position detection signal p1 at the rotational position P13, and between the position detection signal p4 at the rotational position P18 and the position detection signal p1 at the rotational position P1 in the next period Tn+1. Each of these time intervals t14 is obtained in such a way that the section number Q=1 and the position detection signals px=p4 and py=p1 are set, that the two position detection signals p4 and p1 which lie at both the ends of only one section q are selected, and that the time interval between the position detection signals p4 and p1 is calculated.

The time intervals t15 are respectively calculated between the position detection signal p5 at the rotational position P5 and the position detection signal p4 at the rotational position P6, between the position detection signal p5 at the rotational position P11 and the position detection signal p4 at the rotational position P12, and between the position detection signal p5 at the rotational position P17 and the position detection signal p4 at the rotational position P18. Each of these time intervals t15 is obtained in such a way that the section number Q=1 and the position detection signals px=p5 and py=p4 are set, that the two position detection signals p5 and p4 which lie at both the ends of only one section q are selected, and that the time interval between the position detection signals p5 and p4 is calculated.

The time intervals t16 are respectively calculated between the position detection signal p6 at the rotational position P2 and the position detection signal p3 at the rotational position P3, between the position detection signal p6 at the rotational position P8 and the position detection signal p3 at the rotational position P9, and between the position detection signal p6 at the rotational position P14 and the position detection signal p3 at the rotational position P15. Each of these time intervals t16 is obtained in such a way that the section number Q=1 and the position detection signals px=p6 and py=p3 are set, that the two position detection signals p6 and p3 which lie at both the ends of only one section q are selected, and that the time interval between the position detection signals p6 and p3 is calculated.

The energization-switching-timing calculation means 131 determines the pluralities of energization switching timings tu2, tw2, tv2, tu1, tw1 and tv1 on the basis of the pluralities of position detection signals p1-p6 contained in the output signals SA, SB and SC of the position detection signal generation device 40, and the pluralities of time intervals t11-t16, respectively. Concretely, the energization switching timing tu2 at the middle between the rotational positions P3 and P4 is set at a timing which lags an elapsed time $\{t11+(t16/2)\}$ from the position detection signal p6, with respect to the position detection signal p6 at the rotational position P2. The time period t11 is the time interval t11 between the position detection signal p1 at the rotational position P1 and the position detection signal p6 at the rotational position P2. Besides, the time period (t16/2) is obtained in such a way that the time interval t16 between the position detection signal p6 at the rotational position P2 and the position detection signal p3 at the rotational position P3 is multiplied by ½. Each of the energization switching timings tu2 at the middle between the rotational positions P9 and P10 and at the middle between the rotational positions P15 and P16 is set at a timing which lags the elapsed time $\{t11+(t16/2)\}$ from the immediately preceding position detection signal p6, by similarly calculating the elapsed time with the immediately preceding time interval t11 and the immediately preceding time interval t16.

The energization switching timing tw2 at the middle between the rotational positions P4 and P5 is set at a timing which lags an elapsed time $\{t16+(t13/2)\}$ from the position detection signal p3, with respect to the position detection signal p3 at the rotational position P3. The time period t16 is the time interval between the position detection signal p6 at the rotational position P2 and the position detection signal p3 at the rotational position P3. Besides, the time period (t13/2)

is obtained in such a way that the time interval t13 between the position detection signal p3 at the rotational position P3 and the position detection signal p2 at the rotational position P4 is multiplied by ½. Each of the energization switching timings tw2 at the middle between the rotational positions P10 and P11 and at the middle between the rotational positions P16 and P17 is set at a timing which lags the elapsed time {t16+(t13/2)} from the immediately preceding position detection signal p3, by similarly calculating the elapsed time with the immediately preceding time interval t16 and the immediately preceding time interval t13.

The energization switching timing tv2 at the middle between the rotational positions P5 and P6 is set at a timing which lags an elapsed time {t13+(t12/2)} from the position detection signal p2, with respect to the position detection signal p2 at the rotational position P4. The time period t13 is the time interval between the position detection signal p3 at the rotational position P3 and the position detection signal p2 at the rotational position P4. Besides, the time period (t12/2) is obtained in such a way that the time interval t12 between the position detection signal p2 at the rotational position P4 and the position detection signal p5 at the rotational position P5 is multiplied by ½. Each of the energization switching timings tv2 at the middle between the rotational positions P11 and P12 and at the middle between the rotational positions P17 and P18 is set at a timing which lags the elapsed time {t13+(t12/2)} from the immediately preceding position detection signal p2, by similarly calculating the elapsed time with the immediately preceding time interval t13 and the immediately preceding time interval t12.

The energization switching timing tu1 at the middle between the rotational positions P6 and P7 is set at a timing which lags an elapsed time {t12+(t15/2)} from the position detection signal p5, with respect to the position detection signal p5 at the rotational position P5. The time period t12 is the time interval between the position detection signal p2 at the rotational position P4 and the position detection signal p5 at the rotational position P5. Besides, the time period (t15/2) is obtained in such a way that the time interval t15 between the position detection signal p5 at the rotational position P5 and the position detection signal p4 at the rotational position P6 is multiplied by ½. Each of the energization switching timings tu1 at the middle between the rotational positions P12 and P13 and at the middle between the rotational position P18 and the rotational position P1 in the next period Tn+1 is set at a timing which lags the elapsed time {t12+(t15/2)} from the immediately preceding position detection signal p5, by similarly calculating the elapsed time with the immediately preceding time interval t12 and the immediately preceding time interval t15.

The energization switching timing tw1 at the middle between the rotational positions P7 and P8 is set at a timing which lags an elapsed time {t15+(t14/2)} from the position detection signal p4, with respect to the position detection signal p4 at the rotational position P6. The time period t15 is the time interval between the position detection signal p5 at the rotational position P5 and the position detection signal p4 at the rotational position P6. Besides, the time period (t14/2) is obtained in such a way that the time interval t14 between the position detection signal p4 at the rotational position P6 and the position detection signal p1 at the rotational position P7 is multiplied by ½. Each of the energization switching timings tw1 at the middle between the rotational positions P1 and P2 and at the middle between the rotational positions P13 and P14 is set at a timing which lags the elapsed time {t15+(t14/2)} from the immediately preceding position detection signal p4, by similarly calculating the elapsed time with the immediately preceding time interval t15 and the immediately preceding time interval t14.

The energization switching timing tv1 at the middle between the rotational positions P8 and P9 is set at a timing which lags an elapsed time {t14+(t11/2)} from the position detection signal p1, with respect to the position detection signal p1 at the rotational position P7. The time period t14 is the time interval t14 between the position detection signal p4 at the rotational position P6 and the position detection signal p1 at the rotational position P7. Besides, the time period (t11/2) is obtained in such a way that the time interval t11 between the position detection signal p1 at the rotational position P7 and the position detection signal p6 at the rotational position P8 is multiplied by ½. Each of the energization switching timings tv1 at the middle between the rotational positions P2 and P3 and at the middle between the rotational positions P14 and P15 is set at a timing which lags the elapsed time {t14+(t11/2)} from the immediately preceding position detection signal p1, by similarly calculating the elapsed time with the immediately preceding time interval t14 and the immediately preceding time interval t11.

Embodiment 9

Embodiment 9 changes-over a time interval calculation mode on the basis of the change of the difference between the rotational speed command RI for the three-phase brushless motor 10 and the actual rotational speed of the three-phase brushless motor 10. In Embodiment 9 here, the time-interval-calculation-mode setting means 135 of the arithmetic processing means 130 is configured so as to set at least two time interval calculation modes MT1 and MT2. In the time interval calculation mode MT2, the time interval calculation mode command TQ sets the section number Q at any number within a range of 2-18. This time interval calculation mode MT2 is the same as in Embodiments 1-7. Besides, in the time interval calculation mode MT1, the time interval calculation mode command TQ sets the section number Q at 1. The other configuration of Embodiment 9 is the same as in Embodiment 1.

In Embodiment 9, the rotational speed command calculation means 137 outputs the rotational speed command RI to the three-phase brushless motor 10. The rotational speed command RI is fed to the PWM control circuit 120, which controls the pulse duties in the ON-periods of the respective switch elements UH, UL, VH, VL, WH and WL, so as to control the rotational speed of the three-phase brushless motor 10. In Embodiment 9, the time interval calculation modes MT1 and MT2 are changed-over on the basis of the difference ΔR between the rotational speed command RI and the actual rotational speed Ra of the three-phase brushless motor 10.

Figure 17:
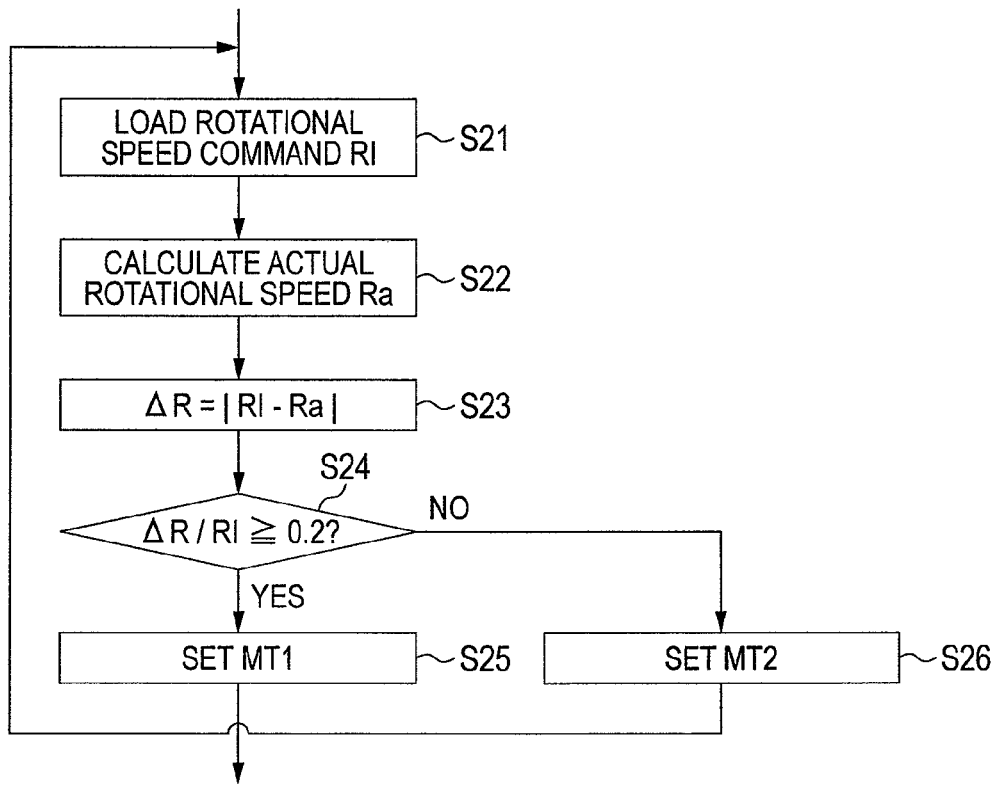
FIG. 17 is a flow chart showing the operation of time-interval-calculation-mode setting means in Embodiment 9 of the control device for the three-phase brushless motor according to this invention.

FIG. 17 is a flow chart showing the operation of the time-interval-calculation-mode setting means 135 in Embodiment 9. In Embodiment 9 here, the time-interval-calculation-mode setting means 135 changes-over the time interval calculation mode between the modes MT1 and MT2 on the basis of the flow chart of FIG. 17 without resorting to the external command TO. The flow chart includes the six steps of steps S21-S26. At the step S21, the time-interval-calculation-mode setting means 135 loads and stores the rotational speed command RI. At the next step S22, the means 135 calculates the actual rotational speed Ra of the three-phase brushless motor 10 by using the output signals SA, SB and SC of the position detection signal generation device 40. At the next step S23, the difference ΔR between the rotational speed command RI and the actual rotational speed Ra is calculated. The difference ΔR is represented by the following formula (2):

$$\Delta R = |RI - Ra| \quad (2)$$

At the next step S24, the time-interval-calculation-mode setting means 135 decides if the ratio of the difference ΔR to the rotational speed command RI, namely, ΔR/RI is, at least, a predetermined value, for example, 0.2. When the result of the decision at the step S24 is "YES", the routine shifts to the step S25, at which the time interval calculation mode MT1 is set. After the time interval calculation mode MT1 has been set at the step S25, the routine returns to the first step S21. When the result of the decision at the step S24 is "NO", the routine shifts to the step S26, at which the time interval calculation mode MT2 is set. After the time interval calculation mode MT2 has been set at the step S26, the routine returns to the step S21.

In the case where the time interval calculation mode MT2 has been set, the fluctuations of the energization switching timings can be suppressed, but a responsibility to the change of the rotational speed command RI lowers. In Embodiment 9, the time interval calculation mode MT2 is set on the basis of the difference ΔR between the rotational speed command RI and the actual rotational speed Ra, in other words, unless the ratio ΔR/RI exceeds the predetermined value. On the other hand, the time interval calculation mode MT1 is set when the ratio ΔR/RI has become, at least, the predetermined value, and the prior-art control is performed at that time.

In Embodiment 9, the time interval calculation modes MT1 and MT2 are changed-over in accordance with the ratio (ΔR/RI) between the difference ΔR and the rotational speed command RI. Therefore, when the ratio (ΔR/RI) is smaller than the predetermined value, the changes of the energization switching timings can be suppressed by the time interval calculation mode MT2, and when the ratio (ΔR/RI) has become, at least, the predetermined value, the responsibility to the rotational speed command RI can be improved by the time interval calculation mode MT1.

Embodiment 10

Embodiment 10 changes-over a time interval calculation mode on the basis of the change of the average load current Ia of the three-phase brushless motor 10. In Embodiment 10 here, the time-interval-calculation-mode setting means 135 of the arithmetic processing means 130 is configured so as to set at least two time interval calculation modes MT1 and MT2. In the time interval calculation mode MT2, the time interval calculation mode command TQ sets the section number Q at any number within a range of 2-18. This time interval calculation mode MT2 is the same as in Embodiments 1-7. Besides, in the time interval calculation mode MT1, the time interval calculation mode command TQ sets the section number Q at 1. The other configuration of Embodiment 10 is the same as in Embodiment 1.

In Embodiment 10, the load current detection resistor DR outputs the load current detection signal IL which represents the load current I of the three-phase brushless motor 10. The load current detection signal IL is fed to the PWM control circuit 120, which controls the pulse duties in the ON-periods of the respective switch elements UH, UL, VH, VL, WH and WL, so as to control the rotational speed of the three-phase brushless motor 10. In Embodiment 10, the time interval calculation mode MT2 is set in a state where the ratio (Ia/Im) between the average load current Ia and rated current Im of the three-phase brushless motor 10 has become, at most, a predetermined value, and the time interval calculation mode MT1 is set in a state where the ratio (Ia/Im) does not reach or exceed the predetermined value.

Figure 18:
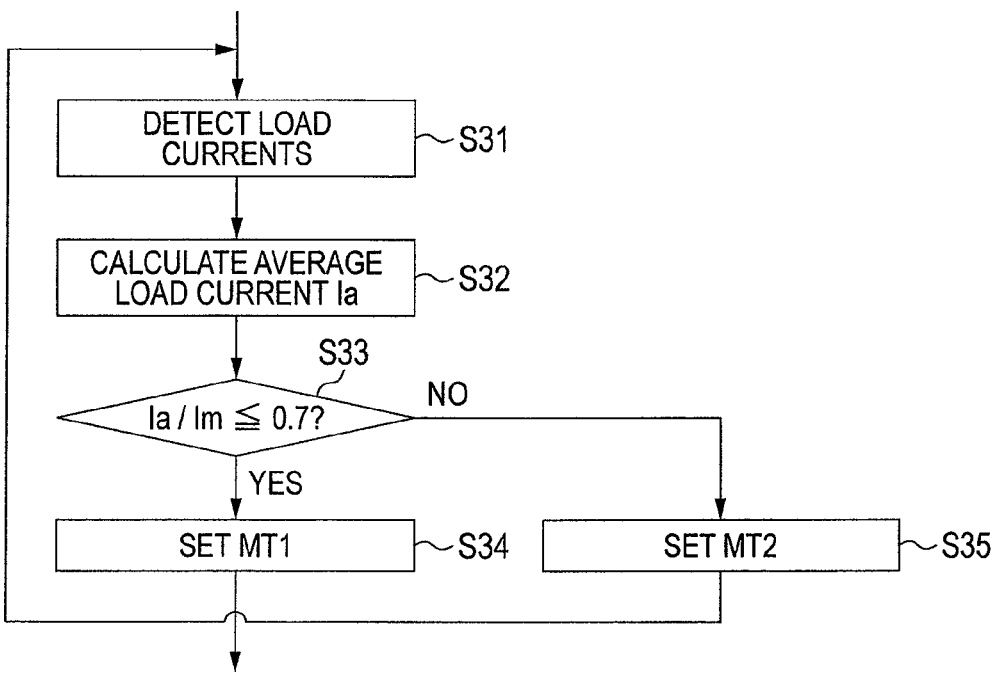
FIG. 18 is a flow chart showing the operation of time-interval-calculation-mode setting means in Embodiment 10 of the control device for the three-phase brushless motor according to this invention.

FIG. 18 is a flow chart showing the operation of the time-interval-calculation-mode setting means 135 in Embodiment 10. In Embodiment 10 here, the time-interval-calculation-mode setting means 135 changes-over the time interval calculation mode between the modes MT1 and MT2 on the basis of the flow chart of FIG. 18 without resorting to the external command TO. The flow chart includes the five steps of steps S31-S35. At the step S31, the time-interval-calculation-mode setting means 135 successively loads and stores the load current detection signals IL. At the next step S32, the means 135 successively calculates the average values per unit time, namely, the average load current Ia on the basis of the stored load current detection signals IL. The "average load current Ia" signifies the effective current of the load current I.

At the next step S33, the time-interval-calculation-mode setting means 135 decides if the ratio (Ia/Im) between the average load current Ia and the rated current Im of the three-phase brushless motor 10 is, at most, the predetermined value, for example, 0.7. When the result of the decision at the step S33 is "YES", the routine shifts to the step S34, at which the time interval calculation mode MT1 is set. After the time interval calculation mode MT1 has been set at the step S34, the routine returns to the first step S31. When the result of the decision at the step S33 is "NO", the routine shifts to the step S35, at which the time interval calculation mode MT2 is set. After the time interval calculation mode MT2 has been set at the step S35, the routine returns to the step S31.

Figure 19:
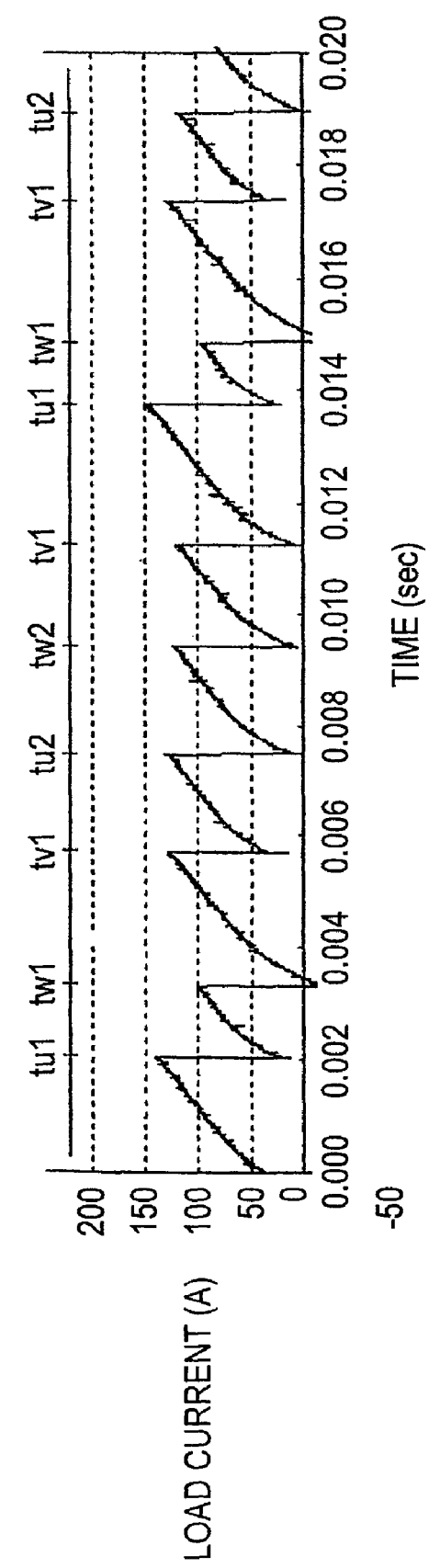
FIG. 19 is a characteristic diagram showing the variation of the load current of a three-phase brushless motor based on a prior-art control.

In the case where the time interval calculation mode MT1 is set and where the prior-art control is performed with the section number Q=1, the peak value of the load current I of the three-phase brushless motor 10 fluctuates greatly as shown in FIG. 19, when angular errors exist in the mounting positions of the position sensors PA, PB and PC by way of example. On this occasion, the risk of the demagnetizations of the permanent magnets M1-M6 of the rotor 20 is high. FIG. 19 shows the fluctuation of the load current I in the case where the pluralities of energization switching timings tu1, tw1, tv1, tu2, tw2 and tv2 are determined by the prior-art control, and where the switch elements UH, UL, VH, VL, WH and WL are respectively changed-over and controlled by these energization switching timings. The axis of abscissas in FIG. 19 represents the time (sec), while the axis of ordinates represents the load current I (A). In the case of FIG. 19, the angular error exists in the mounting position of the position sensor PA, and the time intervals between the energization switching timings tu1 and tw1 are narrow, whereas the time intervals between the energization switching timings tv1 and tu1 and the time intervals between the energization switching timings tw1 and tv1 are wide. In general, in the three-phase brushless motor 10, in order to avoid the demagnetizations of the permanent magnets M1-M6 of the rotor 20, a load current control is performed so as to make the maximum peak value of the load current I a predetermined value or less. In this regard, when the fluctuation of the peak value of the load current I is large, the load current I is limited, and hence, motor characteristics cannot be derived satisfactorily.

In Embodiment 10, in the case where the ratio (Ia/Im) between the load average current Ia and the rated current Im is, at most, the predetermined value of 0.7, the risk of the demagnetizations of the permanent magnets of the rotor 20 is low, and hence, the time interval calculation mode MT1 is set by the time-interval-calculation-mode setting means 135. On the other hand, in the case where the ratio (Ia/Im) has exceeded the predetermined value of 0.7, the risk of the demagnetizations of the permanent magnets of the rotor 20 is high, and hence, the time interval calculation mode MT1 is changed-over to the time interval calculation mode MT2. In the time interval calculation mode MT2, the number Q of the continuous sections within the addition section Aq is set at any number of 2-18, so that the dispersion of the peak current values of the load current I can be suppressed to stably drive the three-phase brushless motor 10. By the way, in the case where the time interval calculation mode MT2 has been set, the responsibility of the three-phase brushless motor 10 lowers. However, in a hydraulic power steering control in which a hydraulic pressure is controlled by the three-phase brushless motor 10, a high responsibility is not required in a high load region of large load current I.

Various alterations and modifications of this invention are possible by those skilled in the art within a scope not departing from the aspects and spirit of this invention, and it should be understood that this invention is not limited to the illustrative embodiments set forth herein.

The control apparatus for the three-phase brushless motor according to this invention is applicable to various control apparatuses for three-phase brushless motors, for example, a hydraulic power steering control apparatus.

What is claimed is:

1. A control device for a three-phase brushless motor, comprising:
    the three-phase brushless motor in which a plurality of stator coils are arranged around a rotor;
    a switch circuit which changes-over energizations for the respective stator coils;
    a position detection signal generation device which comprises at least three position sensors and which successively generates position detection signals in correspondence with rotational positions of the rotor; and
    a control circuit which receives the position detection signals and which calculates a plurality of energization switching timings for the respective stator coils, so as to control said switch circuit,
    wherein:
        the position detection signals are successively generated from the at least three sensors, where the position detection signals have sections in between, where each of the sections is an angular interval between two adjacent position detection signals;
        said control circuit comprises a time interval calculation module which calculates, in a one time interval calculation mode, a plurality of time intervals based on at least two of the position detection signals separated by an addition section obtained by adding at least two contiguous sections; and
        said control circuit determines the plurality of energization switching timings based on the calculated plurality of time intervals.

2. The control device for the three-phase brushless motor as defined in claim 1, wherein said three-phase brushless motor has the stator coils numbering N, around the rotor, and the addition section is obtained by adding between 2 and 2 N of said contiguous sections.

3. The control device for the three-phase brushless motor as defined in claim 1, wherein in the one-time interval calculation mode, said time interval calculation module calculates the pluralities of time intervals based on two position detection signals which correspond to magnetic flux changes having identical polarities.

4. The control device for the three-phase brushless motor as defined in claim 1, wherein in the one-time interval calculation mode, said time interval calculation module calculates the plurality of time intervals based on another two position detection signals obtained from the same position sensor.

5. The control device for the three-phase brushless motor as defined in claim 1, wherein the time interval calculation module, in another time interval calculation mode different from the one-time interval calculation mode, calculates another plurality of time intervals based on two position detection signals at either end of one section, and said control circuit determines the plurality of energization switching timings based on the another plurality of time intervals.

6. The control device for the three-phase brushless motor as defined in claim 5, wherein said control circuit switches between a first state where said time interval calculation module operates in the one-time interval calculation mode and a second state where said time interval calculation module operates in the another time interval calculation mode, based on a change of magnitude of a rotational speed command for said three-phase brushless motor.

7. The control device for the three-phase brushless motor as defined in claim 5, wherein said control circuit switches between a first state where said time interval calculation module operates in the one-time interval calculation mode and a second state where said time interval calculation module operates in the another time interval calculation mode, based on difference between a rotational speed command for said three-phase brushless motor and an actual rotational speed of said three-phase brushless motor.

8. The control device for the three-phase brushless motor as defined in claim 5, wherein said control circuit switches between a first state where said time interval calculation module operates in the one-time interval calculation mode, and a second state where said time interval calculation module operates in the another time interval calculation mode, based on a change of an average load current of said three-phase brushless motor.

9. The control device for the three-phase brushless motor as defined in claim 1, wherein:
    at least first two of the plurality of time intervals are calculated based on two position detection signals obtained at an up-slope and at least second two of the plurality of time intervals are calculated based on another two position detection signals obtained at a down slope,
    the up-slope is when magnetic flux density rises onto N-pole side of edges and wherein the down-slope is when the magnetic flux density lowers onto S-pole side of edges, and
    the edges are formed between adjacent permanent magnets.

10. The control device for the three-phase brushless motor as defined in claim 9, wherein the first two time intervals are even time intervals and the second two time intervals are odd time intervals.

11. The control device for the three-phase brushless motor as defined in claim 1, wherein the plurality of energization switching timings fluctuates less than 10 degrees.

12. The control device for the three-phase brushless motor as defined in claim 1, wherein said control circuit switches between a first state where said time interval calculation module receives the one-time interval calculation mode in which the addition section is obtained by adding a first predetermined number of contiguous sections and a second state where said time interval calculation module receives another time interval calculation mode in which the addition section is obtained by adding a different number of contiguous sections from the first predetermined number of contiguous sections.

13. A control device for a three-phase brushless motor, comprising:
   the three-phase brushless motor in which a plurality of stator coils are arranged around a rotor;
   a switch circuit which changes-over energizations for the respective stator coils;
   at least three position sensors which generate position detection signals in correspondence with rotation of the rotor, where the position detection signals are generated from the at least three position sensors, the position detection signals are separated by sections, where each of the sections is an angular interval between two adjacent position detection signals; and
   a control circuit which, calculates, in a one-time interval calculation mode, a plurality of time intervals based on at least two position detection signals separated by an addition section obtained by adding at least two contiguous sections; and which determines a plurality of energization switching timings for the respective stator coils based on the calculated plurality of time intervals.

* * * * *